(12) United States Patent
Durham et al.

(10) Patent No.: US 11,954,045 B2
(45) Date of Patent: Apr. 9, 2024

(54) OBJECT AND CACHELINE GRANULARITY CRYPTOGRAPHIC MEMORY INTEGRITY

(71) Applicant: Intel Corporation, Santa Clara, CA (US)

(72) Inventors: David M. Durham, Beaverton, OR (US); Michael LeMay, Hillsboro, OR (US); Santosh Ghosh, Hillsboro, OR (US); Sergej Deutsch, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/485,213

(22) Filed: Sep. 24, 2021

(65) Prior Publication Data

US 2022/0012188 A1   Jan. 13, 2022

(51) Int. Cl.
*G06F 12/14* (2006.01)
*G06F 12/0802* (2016.01)
(Continued)

(52) U.S. Cl.
CPC ...... *G06F 12/1408* (2013.01); *G06F 12/0802* (2013.01); *G06F 21/554* (2013.01); *G06F 2212/466* (2013.01)

(58) Field of Classification Search
CPC ............. G06F 12/1408; G06F 12/0802; G06F 2212/466
(Continued)

(56) References Cited

U.S. PATENT DOCUMENTS 9,015,824 B1   4/2015   Drewry et al.
9,135,450 B2   9/2015   Grobman et al.
(Continued)

FOREIGN PATENT DOCUMENTS

EP   3745273 A1   12/2020
KR   101754518 B1   7/2017
(Continued)

OTHER PUBLICATIONS

Chen, Tony et al., "Pointer Tagging for Memory Safety." Microsoft. Retrieved from https://www.microsoft.com/en-us/research/uploads/prod/2019/07/Pointer-Tagging-for-Memory-Safety.pdf, 23 pages.
(Continued)

*Primary Examiner* — Arpan P. Savla
*Assistant Examiner* — Sidney Li
(74) *Attorney, Agent, or Firm* — Alliance IP, LLC

(57) ABSTRACT

Technologies disclosed herein provide one example of a system that includes processor circuitry and integrity circuitry. The processor circuitry is to receive a first request associated with an application to perform a memory access operation for an address range in a memory allocation of memory circuitry. The integrity circuitry is to determine a location of a metadata region within a cacheline that includes at least some of the address range, identify a first portion of the cacheline based at least in part on a first data bounds value stored in the metadata region, generate a first integrity value based on the first portion of the cacheline, and prevent the memory access operation in response to determining that the first integrity value does not correspond to a second integrity value stored in the metadata region.

25 Claims, 20 Drawing Sheets

(51) Int. Cl.
*G06F 21/55* (2013.01)
*G06F 21/56* (2013.01)
*G06F 21/79* (2013.01)

(58) Field of Classification Search
USPC .......................................................... 711/163
See application file for complete search history.

(56) References Cited

U.S. PATENT DOCUMENTS

| | | |
|---|---|---|
| 9,390,268 B1 | 7/2016 | Martini et al. |
| 9,436,847 B2 | 9/2016 | Durham et al. |
| 9,753,754 B2 | 9/2017 | Howell et al. |
| 9,830,162 B2 | 11/2017 | LeMay |
| 9,954,950 B2 | 4/2018 | LeMay et al. |
| 10,326,744 B1 | 6/2019 | Nossik et al. |
| 10,706,164 B2 | 7/2020 | LeMay et al. |
| 10,785,028 B2 | 9/2020 | Girkar et al. |
| 10,860,709 B2 | 12/2020 | LeMay et al. |
| 11,216,366 B2 | 1/2022 | Durham et al. |
| 11,403,234 B2 | 8/2022 | Durham et al. |
| 11,416,624 B2 | 8/2022 | Durham et al. |
| 2002/0065993 A1 | 5/2002 | Chauvel |
| 2005/0010804 A1 | 1/2005 | Bruening et al. |
| 2006/0080553 A1* | 4/2006 | Hall .................... G06F 21/6227 713/193 |
| 2007/0192592 A1 | 8/2007 | Goettfert et al. |
| 2007/0220500 A1 | 9/2007 | Saunier |
| 2008/0205651 A1 | 8/2008 | Goto et al. |
| 2008/0229425 A1 | 9/2008 | Perrin et al. |
| 2008/0288785 A1 | 11/2008 | Rao et al. |
| 2008/0320601 A1 | 12/2008 | Linsley |
| 2009/0249064 A1 | 10/2009 | Atley et al. |
| 2010/0122088 A1 | 5/2010 | Oxford |
| 2010/0281273 A1* | 11/2010 | Lee ........................ G06F 21/72 713/193 |
| 2013/0191649 A1 | 7/2013 | Muff et al. |
| 2013/0232507 A1 | 9/2013 | Farrugia et al. |
| 2013/0283396 A1 | 10/2013 | Langer et al. |
| 2014/0020092 A1 | 1/2014 | Davidov |
| 2014/0149730 A1 | 5/2014 | Joshi et al. |
| 2015/0032996 A1 | 1/2015 | Koeberl et al. |
| 2015/0381358 A1 | 12/2015 | Grobman et al. |
| 2016/0092702 A1 | 3/2016 | Durham et al. |
| 2016/0292422 A1 | 10/2016 | Hayashi et al. |
| 2016/0335187 A1 | 11/2016 | Greenspan et al. |
| 2016/0364341 A1 | 12/2016 | Banginwar et al. |
| 2016/0371496 A1 | 12/2016 | Sell |
| 2016/0380772 A1 | 12/2016 | Gopal et al. |
| 2017/0063547 A1 | 3/2017 | Brandt et al. |
| 2017/0093567 A1 | 3/2017 | Gopal et al. |
| 2017/0235957 A1 | 8/2017 | Maletsky |
| 2017/0237560 A1 | 8/2017 | Mueller et al. |
| 2017/0249260 A1 | 8/2017 | Sahita et al. |
| 2017/0300425 A1 | 10/2017 | Meredith et al. |
| 2017/0308297 A1 | 10/2017 | Roberts et al. |
| 2017/0344297 A1 | 11/2017 | Woolman et al. |
| 2017/0364704 A1 | 12/2017 | Wright et al. |
| 2018/0046576 A1 | 2/2018 | Lesartre et al. |
| 2018/0082057 A1 | 3/2018 | LeMay et al. |
| 2018/0268170 A1 | 9/2018 | Li et al. |
| 2019/0044927 A1 | 2/2019 | Sood et al. |
| 2019/0102322 A1 | 4/2019 | Chhabra et al. |
| 2019/0227951 A1 | 7/2019 | Durham et al. |
| 2019/0339978 A1 | 11/2019 | Wallach |
| 2019/0377574 A1 | 12/2019 | Weimer |
| 2020/0050553 A1 | 2/2020 | Hajj et al. |
| 2020/0089430 A1 | 3/2020 | Kanno |
| 2020/0125501 A1 | 4/2020 | Durham et al. |
| 2020/0125770 A1 | 4/2020 | LeMay et al. |
| 2020/0159676 A1 | 5/2020 | Durham et al. |
| 2020/0201789 A1* | 6/2020 | Durham ................ G06F 21/602 |
| 2020/0241775 A1 | 7/2020 | Breslow |
| 2020/0249995 A1 | 8/2020 | Wong et al. |
| 2020/0379902 A1* | 12/2020 | Durham .............. G06F 12/1408 |
| 2020/0380140 A1 | 12/2020 | Medwed et al. |
| 2020/0382303 A1 | 12/2020 | Girkar et al. |
| 2021/0200673 A1 | 7/2021 | Gupta et al. |
| 2021/0240638 A1* | 8/2021 | Deutsch .............. G06F 12/1408 |
| 2021/0405896 A1 | 12/2021 | Durham et al. |
| 2022/0156180 A1 | 5/2022 | Durham et al. |
| 2022/0206958 A1 | 6/2022 | LeMay et al. |
| 2022/0382885 A1 | 12/2022 | Durham et al. |

FOREIGN PATENT DOCUMENTS

| | | |
|---|---|---|
| WO | 2013147794 A1 | 10/2013 |
| WO | 2014059438 A2 | 4/2014 |
| WO | 2021162792 A1 | 8/2021 |
| WO | 2022139850 | 6/2022 |

OTHER PUBLICATIONS

Durham, David M. et al; U.S. Appl. No. 17/539,933, filed Dec. 1, 2021.
EPO; Extended European Search Report issued in EP Patent Application No. 20210029.3, dated May 20, 2021; 8 pages.
Haraken@; "CheckedPtr2 and CheckedPtr3," retrieved from the Internet at https://docs.google.com/document/d/14TsvTgswPUOQuQol9TmkFQnuSaFD8ZLHRvzapNwl5vs; published Apr. 4, 2020; 8 pages.
Kim, Yonghae, et al.; "Hardware-based Always-On Heap Memory Safety," 2020 53rd Annual IEEE/ACM International Symposium on Microarchitecture (MICRO); Athens, Greece; 14 pages.
Myoung Jin Nam, Periklis Akritidis, and David J Greaves. 2019. FRAMER: a tagged-pointer capability system with memory safety applications. In Proceedings of the 35th Annual Computer Security Applications Conference (ACSAC '19), Association for Computing Machinery, New York, NY, USA, 612-626, https://doi.org/10.1145/3359789.3359799.
PCT International Search Report and Written Opinion issued in PCT/US2020/067072, dated May 26, 2021; 13 pages.
PCT International Search Report and Written Opinion issued in PCT/US2020/067076, dated Sep. 9, 2021; 11 pages.
USPTO Non-Final Office Action for U.S. Appl. No. 17/539,933, filed Dec. 1, 2021 entitled, Security Check Systems and Methods for Memory Allocations (5 pages).
EPO; Extended European Search Report issued in EP Patent Application No. 22153425.8, dated Jul. 18, 2022; 8 pages.
PCT International Preliminary Report on Patentability issued in PCT/US2020/067072, dated Aug. 25, 2022; 8 pages.
Ainsworth, Sam et al., "MarkUs: Drop-in use-after-free prevention for low-level languages," 2020 IEEE Symposium on Security and Privacy, Cambridge, UK (14 pages).
Carlini, Nicholas, et al.; "Control-Flow Bending: On the Effectiveness of Control-Flow Integrity," Proceedings of the 24th USENIX Security Symposium; Washington, D.C.; Aug. 2015; 16 pages.
Carr, Scott A. et al., "DataShield: Configurable Data Confidentiality and Integrity," Purdue University, ASIA CCS, '17, Apr. 2-6, 2017, Abu Dhabi, United Arab Emirates (12 pages).
Durham, David M., et al.; U.S. Appl. No. 17/791,000, filed Jul. 6, 2022.
EPO; Office Action issued in EP Patent Application No. 20210029.3, dated Mar. 16, 2022; 4 pages.
Filardo, Nathaniel Wesley et al., "Cornucopia: Temporal Safety for CHERI Heaps;" Cambridge, UK. (18 pages).
GitHub.com; "V8 Garbage Collector," Oct. 23, 2018 (13 pages).
Haraken@, et al.,; "MTECheckedPtr" Last updated Jul. 9, 2020; Accessed Jul. 19, 2022; Retrieved from https://docs.google.com/document/d/1ph7iOorkGqTuETFZp-xvHV4L2rYootuz1ThzAAoGe30/edit#heading=h.b57m9s7iv7yr; 9 pages.
Hong, H. et al., "Data-Oriented Programming: On the Expressiveness of Non-Control Data Attacks," IEEE S&P, 18 pages, 2016.
Intel; "Intel 64 and IA-32 Architectures Software Developer's Manual," vol. 1: Basic Architecture, Chapter 3: Basic Execution Environment; Oct. 2019; 57 pages.

(56) References Cited

OTHER PUBLICATIONS

Intel; "Intel 64 and IA-32 Architectures Software Developer's Manual," vol. 1: Basic Architecture, Chapter 6: Procedure Calls, Interrupts, and Exceptions; Oct. 2019; 48 pages.
Intel; "Intel 64 and IA-32 Architectures Software Developer's Manual," vol. 3: System Programming Guide, Chapter 6; Oct. 2019; 110 pages.
L. Muscariello et al., "Hybrid Information-Centric Networking draft-muscariello-intarea-hicn-00," Cisco Systems, Inc., Jun. 7, 2018 (21 pages).
Mohamed et al., "A scheme for implementing address translation storage buffers," Proceedings of the 2002 IEEE Canadian Conference on Electrical and Computer Engineering, 2002, pp. 626-632.
Notice of Allowance, U.S. Appl. No. 16/024,259, dated May 20, 2020, 20 pages.
Notice of Allowance, U.S. Appl. No. 16/728,928, dated Feb. 22, 2021, 10 pages.
Notice of Allowance, U.S. Appl. No. 17/321,087, dated Apr. 13, 2022, 13 pages.
Notice of Allowance, U.S. Appl. No. 17/321,087, dated May 4, 2022, 9 pages.
Watson et al., Capability Hardware Enhanced RISC Instructions (CHERI): Notes on the Meltdown and Spectre Attacks, University of Campbridge Computer Laboratory, Feb. 2018, 16 pages.
Watson, Robert N.M., et al., "Capability Hardware Enhanced RISC Instructions: CHERI Instruction-Set Architecture (Version 8)," University of Cambridge Computer Laboratory Technical Report No. 951, Cambridge, UK; Oct. 2020 (590 pages).
Xia, Hongyan et al., "CHERIvoke: Characterising Pointer Revocation using CHERI Capabilities for Temporal Memory Safety," MICRO-52, Oct. 2019, Columbus, OH, US (13 pages).
Yan, Z., et al., "Hardware translation coherence for virtualized systems," 2017 3 ACM/IEEE 44th Annual International Symposium on Computer Architecture (ISCA), 2017, pp. 430-443, doi: 10.1145/3079856.3080211. {Year: 2017).
International Preliminary Report on Patentability for International Patent Application No. PCT/US2020/067076, dated Jul. 6, 2023; 7 pages.
Kroes et al., Fast and Generic Metadata Management with Mid-Fat Pointers, 2017, ACM, 6 pages (Year: 2017).
Non-Final Office Action received in U.S. Appl. No. 17/472,272, dated Jul. 7, 2023, 11 pages.
Dutch Office Action received in Application No. 2029792, dated Mar. 22, 2023, with Statement of Relevance, 15 pages.
L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008, doi: 10.1109/TC.2008.69; 14 pages.
USPTO Notice of Allowance for U.S. Appl. No. 17/539,933 entitled, Security Check Systems and Methods for Memory Allocations (7 pages).
France Intellectual Property Office; Search Report issued in FR2114288, dated Jan. 12, 2023; 18 pages with English translation.
Non-Final Office Action received in U.S. Appl. No. 16/998,913, dated Jan. 25, 2023, 13 pages.
USPTO Non-Final Office Action for U.S. Appl. No. 17/481,405, entitled, Cryptographic Computing Including Enhanced Cryptographic Addresses (19 pages).
USPTO Final Office Action for U.S. Appl. No. 17/481,405, entitled, Cryptographic Computing Including Enhanced Cryptographic Addresses (21 pages).
USPTO Notice of Allowance for U.S. Appl. No. 16/998,913 (13 pages).
France Intellectual Property Office; Office Action issued in FR2114288, dated Nov. 28, 2023; 4 pages with English translation.
USPTO; Notice of Allowance issued in U.S. Appl. No. 17/472,272, dated Jan. 9, 2024, 9 pages.

* cited by examiner

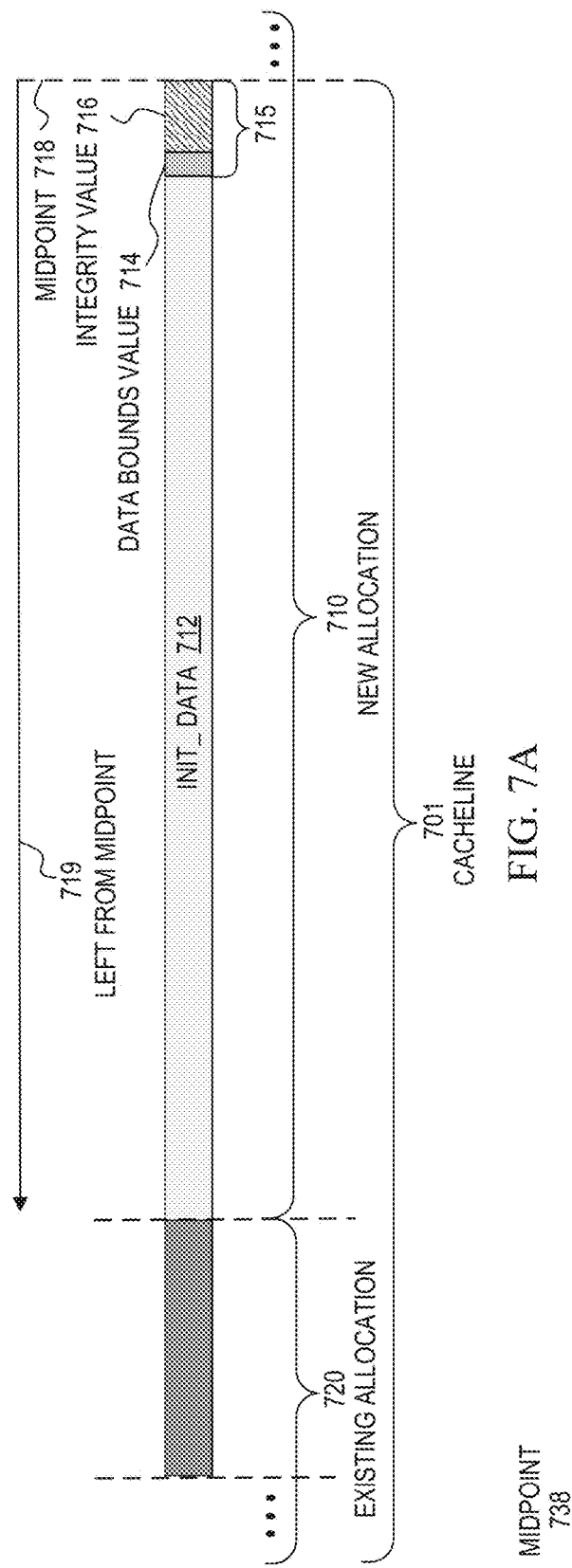
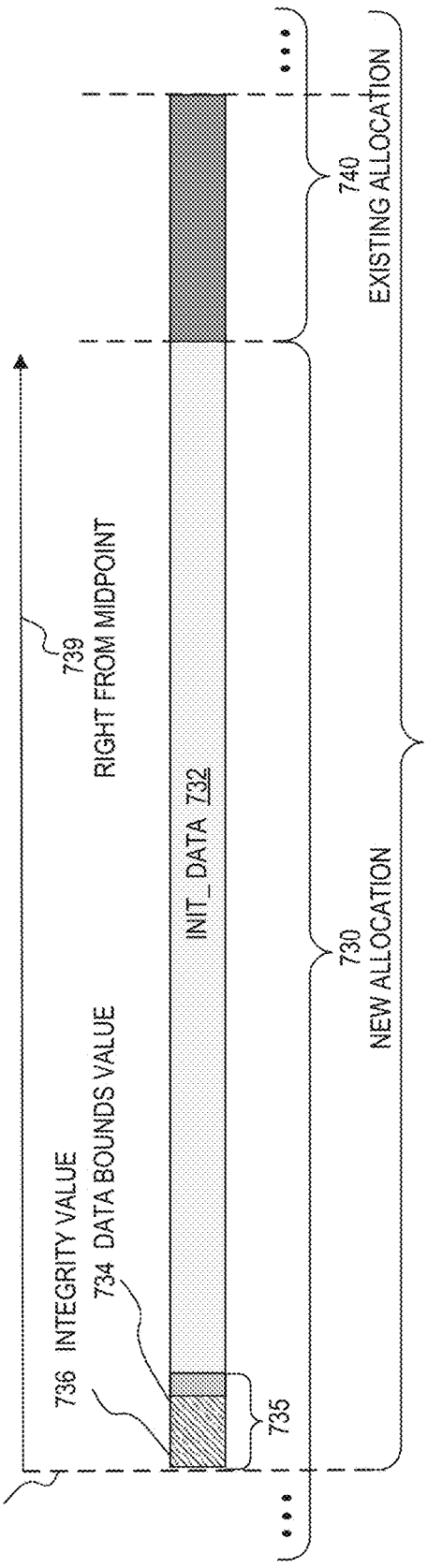
FIG. 7A
FIG. 7B

OBJECT AND CACHELINE GRANULARITY CRYPTOGRAPHIC MEMORY INTEGRITY

TECHNICAL FIELD

This disclosure relates in general to the field of computer systems, more particularly, to object and cacheline granularity cryptographic memory integrity.

BACKGROUND

Memory corruption is a memory safety violation that occurs when memory is modified by an unintentional access or a malicious attack. Software can cause some memory safety vulnerabilities such as buffer overflows and Use-After-Free (UAF), which generally occur as a result of memory pointer mismanagement. Such memory corruption can lead to unpredictable program behavior that includes generating incorrect results or causing operating system exceptions that can lead to a program crash. Other software exploits, viruses, malware, and software vulnerabilities may also cause or enable unauthorized changes to data or code in memory. Additionally, physical attacks on memory present significant and persistent memory safety problems in computer systems. Accordingly, memory integrity techniques are needed to detect memory corruption resulting from either unintentional memory accesses or malicious memory accesses, which can be caused by software or by physical attacks.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 7A-7C are schematic illustrations of example cachelines with inline integrity metadata at different locations according to an embodiment;

DETAILED DESCRIPTION

Figure 1:
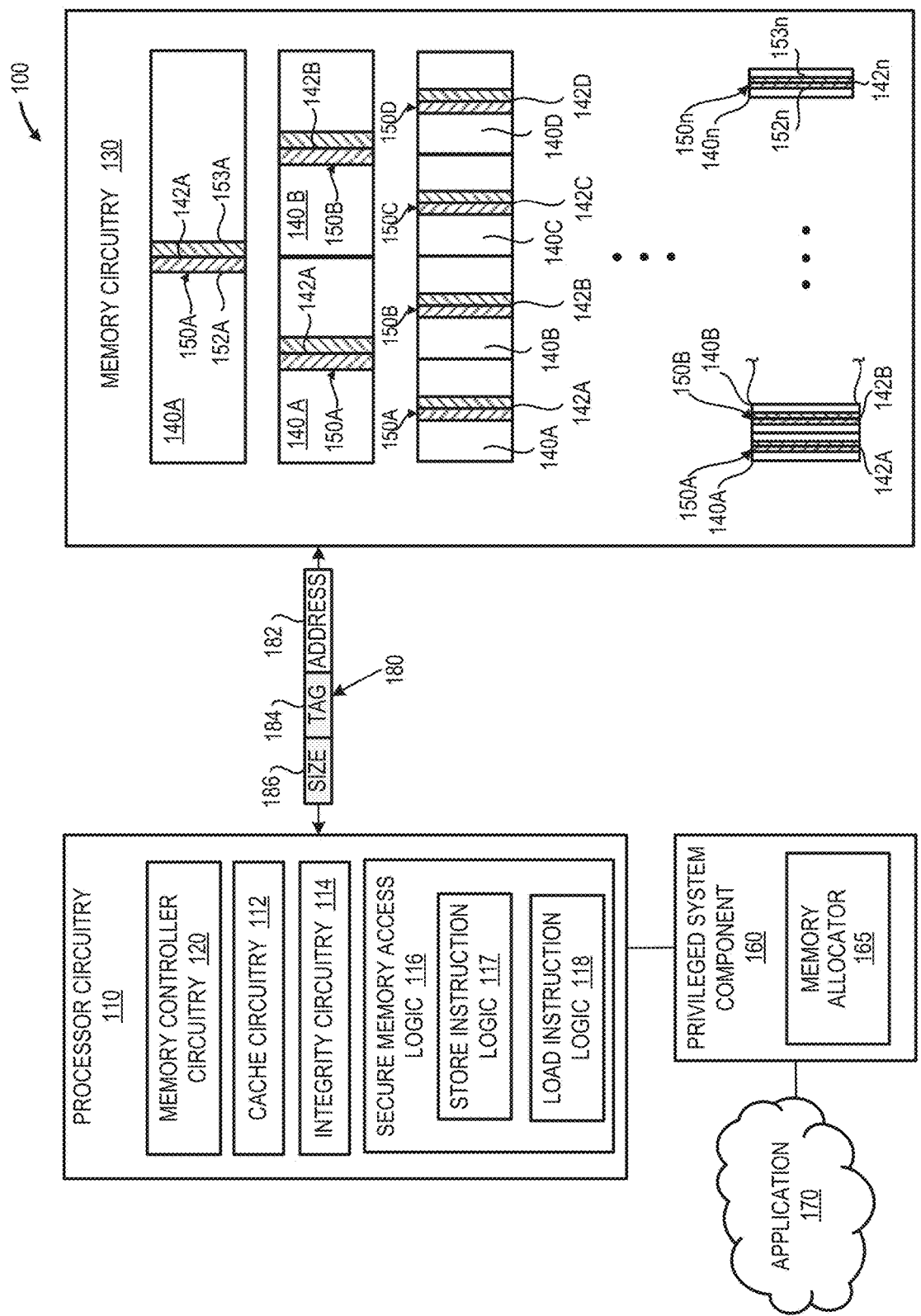
FIG. 1 is a schematic diagram of an illustrative system for performing integrity checks for objects in memory allocations, in accordance with at least one embodiment described herein.

The systems and methods described herein provide systems, apparatuses, methods, and computer readable media containing instructions that provide memory access and allocation using inline integrity metadata to achieve memory integrity. The inline integrity metadata includes one or more integrity values for per-object memory integrity. Every memory allocation can include a hardware verified and hidden integrity value per cacheline. Per cacheline integrity values for data (or code) in a heap or stack allocation enable the processor to quickly detect whether the data (or code) in a particular cacheline is corrupted or inappropriately modified or accessed. Accordingly, a multitude of software security issues, such as overflows, use-after-free, malware, viruses, software exploits, and even physical attacks on the system can be detected. The various embodiments described herein are applicable to integrity protection for both data and code that may be stored in memory. Although the description of various embodiments may refer only to data for simplicity, the embodiments are also applicable to any other contents of memory, including code (e.g., any type of programming instructions).

In one or more embodiments, integrity values for a memory allocation can be calculated using a suitable cryptographic technique (e.g., encryption, hashing) based on the contents of the memory allocation contained in a cacheline and at least a portion of an encoded pointer that references the memory allocation. The encoded pointer may include an encrypted portion of a linear memory address of the memory allocation and potentially other encoded metadata in the pointer, such that every object can be uniquely protected from every other object in the system. Thus, integrity values can be bound to an encoded pointer for an allocation and can enable detection of corruption or inappropriate access or modification of an object (or other contents such as stack parameters and return addresses, etc.).

For purposes of illustrating the several embodiments of systems using inline integrity metadata, it is important to first understand the operations and activities associated with systems using inline integrity metadata for memory. Accordingly, the following foundational information may be viewed as a basis from which the present disclosure may be properly explained. One beneficial technique for storing metadata associated with an allocation (e.g., allocation bounds, tag or version data) is to store a single copy of metadata inline with the associated allocation for favorable cache locality and constant-time metadata updates. A metadata region containing the single copy of metadata can be located at a memory address within a memory allocation, and the data that is displaced by the metadata can be shifted to accommodate the metadata region. The metadata is hidden from software by the system processor circuitry, providing an appearance to an application that the data is still arranged in contiguous memory (e.g., logical addresses) when incrementing the linear/virtual address or index across the extent of the memory allocation. The processor redirects attempted software accesses to the metadata locations so that they instead access the displaced memory that has been shifted or that has been relocated to an end of the allocation or to another location in memory. When memory is being allocated, the requested memory allocation size can be increased to provide sufficient memory for contents to be shifted.

The middle or center of a memory allocation slot (which can also be referred to as a "bounding box") is determined by the memory controller circuitry (or processor circuitry) using a best-fit power of two pointer encoding. Some metadata may be encoded only once per memory allocation, located at the midpoint of the allocation's slot (or bounding box), and hidden by the processor circuitry such that the memory appears as a contiguous allocation to software using an encoded pointer (for example, a data array would only see data, and no metadata, at each indexed location into the array).

The systems and methods disclosed herein use pointer encoding, such as a power of two size and a memory address of a memory allocation's slot, to determine the midpoint of the memory allocation's power of two slot. Each memory allocation of a particular size plus its metadata and location is assigned to exactly one slot of the smallest size that fits the allocation, and the allocation will always contain the midpoint of such slot, as will be further described herein. Metadata associated with the entire memory allocation, such as tag metadata and allocation bounds information can be stored about the determined slot midpoint. In some embodiments, the C++ New or C malloc function (or similar functions in other programming languages) of a memory allocator library takes the metadata size into account and adjusts (increases) the memory allocation accordingly to accommodate the metadata size and any additional metadata such as the allocation's true size, an integrity value, or any other metadata that may be stored in a metadata region of the memory allocation (e.g. context identifier, privileges, secret, message authentication code, etc.). Because the metadata is stored in the middle of the allocation's slot, in some systems the processor circuitry can hide the existence of the metadata (e.g., allocation bounds) when loading data from the memory allocation by skipping over the metadata region when data has been shifted to accommodate the metadata region, or by replacing that metadata with data that was relocated, for example, to the end of the allocation. Meanwhile, the processor can directly determine the location of the metadata in memory (the corresponding midpoint of the allocation's assigned slot) for the allocation based on the pointer encoding. Specifically, the metadata location is compactly specified in the upper pointer bits that are unneeded for addressing (e.g., in a power size field). This allows the midpoint and corresponding metadata to be located directly from a pointer in one step regardless of the pointer's offset within an allocation. No updates to that metadata location information are needed even when the pointer address is updated to reference different parts of an allocation.

The systems and methods disclosed herein benefit from the realization that a power of two encoding of the allocation size will have a best fit slot (bounding box) midpoint value that is always located within the memory allocation including the metadata. Beneficially, multiple memory allocations may overlap within a larger memory allocation's power of two size slot, but each of the smaller memory allocations will have different midpoint addresses and each of the smaller memory allocation slot midpoint values will differ from the larger memory allocation slot's midpoint value. The pointer may include a number of bits (e.g., 6-bits for a 64 bit pointer, 7-bits for a 128 bit pointer, and so on) to identify the power of two encoding of the allocation size and optionally, a tag value for versioning, which can prevent use-after-free (UAF).

In some systems, actual allocated memory bounds (e.g., offset and array size, or actual allocation size to the left and allocation size to the right of the slot midpoint, or any other information that indicates the actual beginning and end of the allocation) may be encoded into the midpoint metadata and checked by the processor circuitry to ensure a given memory access is performed only within the boundary addresses of the current memory allocation. These allocation bounds may be sized according to the power of two slot size identified by the pointer's power size field value to optimize memory use, with smaller slots requiring fewer bytes to encode the allocation's true bounds verses larger allocations requiring additional bytes to encode the larger allocations' true bounds.

When allocating memory (e.g., by an operating system, in the heap or in the stack), memory allocation operations can be invoked by instructions such as MALLOC( )/ALLOC/ NEW for example, or implicitly via a loader, or statically allocating memory by a compiler, etc. The memory allocation operations can simply account for the metadata in the middle of the memory allocation's power of two slot, increase the allocation size (e.g., by one byte, or two bytes, or more depending on the size of the power of two slot and associated metadata size), and set the metadata in the middle of the memory allocation's power of two slot. The memory allocation operations can return a pointer encoded with metadata such as the same tag value in a metadata field and size metadata (e.g., a power of two size of the slot) in the power size field. In this specification, the middle of the memory allocation's power of two slot where metadata may be stored inline with data stored in the memory allocation is referred to herein as a 'midpoint storage location' or a 'midpoint metadata region.' In one or more embodiments disclosed herein, where the allocation size is increased to accommodate inline integrity metadata, the data displaced by the metadata stored in the midpoint region, along with the rest of the data after the displaced data, can be shifted to the right to accommodate metadata being stored in the midpoint metadata region.

When accessing memory (e.g., by a program, in the heap or in the stack), memory access operations to read or load data associated with an address range in memory, can be invoked by instructions such as a "MOV" or "LOAD"

instruction or any other instruction that causes data to be read, copied, or otherwise accessed at one storage location, e.g., memory, and moved into another storage location, e.g., registers (where "memory" may refer to main memory or cache, e.g., a form of random access memory, and "register" may refer to a processor register, e.g., hardware), or any instruction that accesses or manipulates memory. As used herein, a "memory read request" may be embodied as one or more of these possible instructions that, when executed, invoke a memory operation to read, load, fetch, move, or otherwise obtain data or code from an address range associated with one storage location such as main memory or cache, and move the data or code into another storage location such as a register.

Memory access operations to store data can be invoked by instructions such as a "MOV" or "STORE" instruction or any other instruction that causes data to be read, copied, or otherwise accessed at one storage location, e.g., register, and moved into another storage location, e.g., memory or cache, or any instruction that accesses or manipulates memory. As used herein, a "memory store request" that may be embodied as one or more of these possible instructions that, when executed, invoke a memory operation to store, write, move, etc. data or code from one storage location such as a register and move into a particular address range associated with of another storage location such as main memory or cache. As used herein, "memory access requests" may be embodied as one or more of any of the aforementioned instructions that, when executed, invoke the appropriate memory access operations.

When the processor is accessing a memory allocation with an encoded pointer format as previously described (e.g., encoded with a tag value and a power of two size of the allocation's assigned slot), the processor circuitry looks up the tag value from the middle of the allocation's power of two slot and compares with the pointer tag value, allowing memory access if they match, triggering a fault or exception if they don't match. Memory deallocation (or free) operations, invoked by an instruction such as FREE( ) for example, will then reset the memory tag and other metadata values. The processor may also use allocation bounds information in the metadata verifying the memory access is within the correct allocation bounds, for example, is within X1 bytes (or other unit of minimum allocation size) from the left of the slot midpoint and X2 bytes (or other unit of minimum allocation size) from the right of the midpoint of the slot, where tag, X1 and X2 are separate fields of the midpoint metadata.

In some approaches, data from the midpoint to the end of the allocation is shifted to the right in a memory allocation. In memory access operations, a processor skips over the metadata and adjusts the physical address accordingly. Thus, data can be accessed by adding the size of the metadata to memory accesses of physical addresses past the midpoint based on the pointer encoding.

Memory integrity techniques are also used in various systems to detect memory corruption and prevent physical attacks on memory. Generally, a memory integrity technique can include a process that uses some type of integrity value associated with some data to be protected to ensure the validity of the data during its lifecycle. Each time data in memory is accessed, a data integrity check can be performed to ensure that the data has not changed since its previous validation. One example integrity technique uses an integrity value in the form of a message authentication code (MAC). A MAC is a value derived by applying a MAC algorithm and a key to data to be protected. The MAC can be attached to the data and, when the data is subsequently accessed or otherwise obtained, the same MAC algorithm and key may be applied to the data. A comparison between the attached MAC and the newly generated MAC can reveal whether the data has been changed. Thus, any unauthorized modifications can be detected.

Another memory integrity technique includes a cryptographic hash function and is referred to as a hash message authentication code (HMAC). An HMAC can be derived using a key and a cryptographic hash function. Generally, a cryptographic hash function is an algorithm that converts an input value and returns a fixed-length output value in a different size. A hash algorithm may or may not use a key. Examples of hash algorithms include, but are not limited to, a Secure Hash Algorithm (e.g., SHA1, SHA2, SHA3) or a Message Digest 5 (MD5). Other memory integrity techniques can include, but are not necessarily limited to, error correction codes (ECCs) and integrity check values (ICVs).

Currently, the integrity techniques that implement integrity checking for data in memory is not consistent or necessarily efficient. For example, some secure memory environments implement integrity checking only to address physical attacks such as row hammer, where specially designed memory access patterns in dynamic random-access memory (DRAM) rapidly activate the same memory rows repeatedly so that the memory cells interact electrically by leaking their charges and potentially changing the contents of other memory rows. Additionally, integrity techniques using integrity values are not available across all memory types. For example, the error correction code (ECC) based integrity mechanism is incompatible with many memory types such as compute express link (CXL) attached memory, one-level memory (1LM) where operating system memory and application direct regions are two separate memory spaces, and two-level memory (2LM) where DRAM is a cache to the operating system main memory.

For systems using power of two encodings of memory allocation sizes, encoding a MAC (or HMAC) or other integrity value at a slot midpoint (in a midpoint metadata region) of a memory allocation, could result in inefficiencies. With integrity techniques such as MAC or HMAC, integrity is evaluated over an entire allocation. A bit anywhere in the contents of the allocation can indicate corruption. Accordingly, to read/load contents from an allocation, all of the cachelines in the allocation would have to be fetched to validate the MAC, even if fulfilling the read request requires only a small number of bytes from the allocation. Similarly, to store/write contents to an allocation, all of the cachelines in the allocation would have to be read in order to write the new contents to the appropriate cacheline(s) and then to recalculate the MAC over the entire allocation. Consequently, writing a single byte to a 1-Gigabyte array may result in reading the entire 1 GB array and calculating a MAC over the entire 1 GB array to replace a single byte. It should be noted that placing any other data dependent code at a slot midpoint of an allocation could cause similar inefficiencies in a system A memory allocation and access system for providing memory integrity with inline integrity metadata, as disclosed herein, can resolve these issues (and more). In one or more embodiments, a memory allocation and access system for providing memory integrity with inline integrity metadata includes hardware checked integrity values at the linear address space level as part of individual heap object allocations and stack frame allocations. An integrity value can be computed for each cacheline containing an object (or frame) or a portion of an object (or frame) of a memory allocation. Thus, one integrity value is computed per allocation per cacheline. Examples of integrity values can include, but are not necessarily limited to, message authentication codes (MACS), hashed message authentication codes (HMACs), error correction codes (ECCs), or integrity check values (ICVs). Integrity values may be computed per-cacheline and each stored in a metadata region of its corresponding cacheline. The size of cachelines may vary depending on particular architectures (e.g., 32B, 64B, etc.). Memory allocators (or shims) reserve additional space during a memory allocation operation for the integrity values. The memory allocation operation may be initiated using instructions of programming languages such as C programming language (e.g., malloc, new, realloc, calloc, etc.), C++ programming language (e.g., new), or any other suitable programming language instructions that allocate memory. The memory allocators (or shims) can also generate an encoded pointer to the memory allocation. The encoded pointer may be encoded with a linear address and a portion of the address may be encrypted. The processor can use the encoded pointer to locate the integrity values in the metadata regions within the allocation and to hide the integrity values from software. Thus, arrays and data structures appear to software to be contiguous in linear memory. In at least some embodiments, the processor uses the encoded pointer (or at least the encrypted portion of the linear address) and the allocation data in each cacheline to calculate the integrity value for the allocation data in that cacheline and to detect incorrect memory accesses or modifications.

Embodiments of a memory allocation and access system for providing memory integrity with inline integrity metadata offer numerous advantages. Embodiments disclosed herein provide granular integrity protections for each individual object on the heap, regardless of the allocation size, and for each individual stack frame. Embodiments are compatible with all types of memory and, accordingly, work seamlessly with any type of physical memory while also protecting contents of the memory from physical corruption within cache. In addition to preventing physical attacks (even in cache), embodiments also address a myriad of software exploits, viruses, malware, and software vulnerabilities.

Embodiments disclosed herein enable more efficient, and granular (e.g., sub-page) protection domains, such as microservices. The per-object and cacheline (and per-stack frame and cacheline) nature of the integrity values enables hardware detection of using the wrong cryptographic pointer to access the wrong object. Such detection mitigates stack and heap buffer overflows and/or underflows, use-after-free (UAF), and return oriented programming. The detection accommodates cryptographic isolation for microservices. Furthermore, integrity values as disclosed herein can also be used for error correction for memories that do not support error correction code (ECC).

Additionally, storing integrity metadata on the same cacheline as its associated data, as provided in one or more embodiments herein, offers significant cache coherency advantages. Such embodiments afford the same locks and memory consistency rules as data accesses to a cacheline and ensure that modified data is always consistent with the inline integrity value. For example, typically locks used in software are performed at a cacheline granularity and various associated operations are performed in hardware. For example, after the processor fetches the data, it might have to wait for the integrity metadata to be fetched, or other race conditions or side channels may be present. In embodiments using inline integrity metadata per cacheline, however, such complicated memory ordering issues that might otherwise occur when you separate metadata from data are avoided. Instead, the integrity metadata can be accessed by the processor concurrently with the data protected by the integrity value, which avoids additional memory loads and stores to access integrity metadata.

Note that in the following discussion specific components are designated using an alphanumeric item designator. For example, a first element may be designated 110A and a second element may be designated 110B. For ease of discussion and conciseness, when describing a feature common to both elements, the alphanumeric designator is omitted. Thus, when such a generic (i.e., non-alphanumeric) designator is used, the described feature should be understood as applicable to all elements sharing a common numeric designator. For example, a feature described with respect to "element 110" would apply to all elements 110A-110n. On the other hand, a feature described with respect to "element 110A" would apply specifically to the element designated 110A and not to elements designated 1108 through 110n.

FIG. 1 is a schematic diagram of an illustrative system 100 for performing integrity checks on memory allocations and in which the system 100 includes processor circuitry 110, memory controller circuitry 120, and memory circuitry 130, with memory apportioned into one or more power of two (i.e., $2^0$ to $2^n$) memory allocation slots 140A-140n, in which respective midpoint metadata regions 150A-150n may be defined across respective midpoints 142A-142n of the slots. In at least one embodiment, memory allocations obtained by an executing application 170 are assigned to one of the memory allocation slots 140A-140n. The encoding of a virtual/linear address (pointer) for a memory allocation identifies a memory allocation slot to which the memory allocation is assigned and optionally, may include unique tag data that is associated with the memory allocation.

For any given memory allocation slot 140 to which a memory allocation is assigned, one or two integrity values can be stored in a midpoint metadata region 150 defined in the given memory allocation slot 140. The size and placement of the midpoint metadata region 150 may vary depending on the size of the allocation slot, as will be further described herein. In one or more embodiments, the metadata stored in midpoint metadata region 150 depends on the size of the slot to which an allocation is assigned and the size of the cachelines used in system 100. For an allocation assigned to a slot sized to include two or more cachelines, the midpoint is located between two cachelines in the slot. In this case, the midpoint metadata region 150 can include a lower metadata region (e.g., 152A) defined on the left side of (or before) the midpoint in a cacheline that precedes the midpoint, and an upper metadata region (e.g., 153A) defined on the right side of (or after) the midpoint in a cacheline that follows the midpoint. Thus, the lower metadata region is defined at the end of a cacheline while the upper metadata region is defined at the beginning of a cacheline.

An integrity value for the allocation data in a cacheline immediately preceding the midpoint can be stored in the lower metadata region (e.g., 152A), and an integrity value for the allocation data in a cacheline immediately following the midpoint can be stored in the upper metadata region (e.g., 153A). Other integrity metadata can include a data bounds value that indicates the amount of data in the cacheline that is part of the allocation, which is integrity-protected. In a lower metadata region (e.g., 152A), the data bounds value can indicate the amount of data in the cacheline that is part of the allocation, which is integrity-protected upper metadata region (e.g., 153B), the data bounds value can indicate the amount of data in the cacheline immediately following the midpoint that was included in the integrity value computation.

For an allocation assigned to a slot that is sized to include one cacheline or less, the midpoint metadata region 150 may contain a single integrity value for the entire allocation. Furthermore, the midpoint metadata region 150 in this scenario may be defined entirely on the left side of (or before) the midpoint, entirely on the right side of (or after) the midpoint, or partially on each side of the midpoint. Other metadata that may be stored in the midpoint metadata region with an integrity value can include lower and upper data bounds values that indicate the amount of data in the cacheline included in the integrity value computation. A lower data bounds value can indicate the amount of data immediately preceding the midpoint that is integrity-protected. An upper data bounds value can indicate the amount of data immediately following the midpoint that is integrity-protected.

FIG. 1 depicts the memory circuitry 130 allocated into a number of sample memory allocation slots 140A-140n. In embodiments, an instruction that causes the processor circuitry 110 to perform a memory operation causes the memory controller circuitry 120 to access the memory circuitry 130 using an encoded pointer 180 that includes at least data representative of the memory address 182 of the memory operation and metadata, such as data representative of a power size (e.g., size data 186) of a memory allocation slot to which a memory allocation is assigned. The metadata may also include tag (or version) data 184 associated with the memory allocation assigned to a memory allocation slot 140 containing memory address 182. To prevent use-after-free (UAF) violations, tag data 184 can be compared to the tag data in the metadata region 150 defined at the midpoint of the respective memory allocation slot 140. If the pointer tag data 184 matches the stored tag data in the metadata region 150 within the memory allocation slot 140, the operation at the designated memory address 182 is permitted. If the pointer tag data 184 fails to match the stored tag data in the midpoint metadata region 150 within the memory allocation slot 140, an exception is returned to the processor circuitry 110. In one or more embodiments herein, however, tag (or version) data 184 can be bound to the integrity value computed for each cacheline loaded or stored for an allocation, as will be further explained herein. Therefore, storing tag data in midpoint metadata region 150 and performing a comparison with the tag data in the pointer may be omitted in at least some embodiments.

The processor circuitry 110 includes any number and/or combination of electrical components, optical components, quantum components, semiconductor devices, and/or logic elements capable of executing machine-readable instructions, such as provided by one or more applications 170. In embodiments, the processor circuitry 110 may include a plurality of processor core circuits. In embodiments, each of processor core circuits may provide one or more physical and/or virtual processor threads. The processor circuitry 110 may include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples, the processor circuitry 110 may also be an application specific integrated circuit (ASIC) and at least some modules of processor core circuits may be implemented as hardware elements of the ASIC.

Processor circuitry 110 may include additional circuitry and logic. Processor circuitry 110 may include all or a part of memory controller circuitry 120 (memory management unit (MMU), address generation unit (AGU), cache, load buffer, store buffer, etc.) and may also include cache circuitry 112. In other hardware configurations, memory controller circuitry could be communicatively coupled with, but separate from processor circuitry. Memory controller circuitry 120 can include any number and/or combination of electrical components, optical components, quantum components, semiconductor devices, and/or logic elements capable of performing read and/or write operations to the cache circuitry 112 and/or the memory circuitry 130. For example, processor circuitry 110 may further include secure memory access logic 116, which includes store instruction logic 117 for performing memory access operations to store/write data or code to memory and load instruction logic 118 for performing memory access operations to read/load data or code from memory. It should be apparent, however, that read and/or write operations may access the requested data in cache circuitry 112, for example, if the appropriate cachelines were previously loaded into cache circuitry and not yet moved back to memory circuitry 130. In some embodiments, the processor circuitry 110 and/or the memory controller circuitry 120 may include memory management unit (MMU) circuitry to store information and/or data used to provide paginated (e.g., via 4 KB pages) address translations.

Processor circuitry 110 may also include integrity circuitry 114, which is configured to compute integrity value(s) and perform integrity checks on contents of an allocation that is accessed via memory access operations (e.g., read/load, store/write, etc.). Integrity circuit 114 may be added to the backend processor pipeline to compute inline integrity values from loaded cachelines and from buffers before storing modified cachelines to a data cache unit. During memory access operations, integrity circuit 114 can compute an integrity value by performing, for example, one or more cryptographic algorithms on a portion of a cacheline that contains contents (e.g., data or code) targeted by the memory access operation and by comparing the computed integrity value with a previously-computed integrity value stored in the cacheline. Integrity circuitry 114 may also be capable of computing a new integrity value for contents in an allocation by performing, for example, the cryptographic algorithm(s) on a portion of a cacheline that contains the contents to be stored in the memory allocation. Integrity circuitry 114 can include any number and/or combination of electrical components, optical components, quantum components, semiconductor devices, and/or logic elements capable of performing integrity check operations and integrity value calculations.

In some embodiments, a privileged system component 160, such as an operating system kernel or virtual machine monitor, or instruction set emulator, may facilitate communication between applications, such as application 170 and hardware components such as processor circuitry 110 and/or memory controller circuitry 120, for example. Furthermore, privileged system component 160 may be part of a trusted execution environment (TEE), virtual machine, processor circuitry 110, a co-processor (not shown), or any other suitable hardware, firmware, or software of a computing device or securely connected to computing device. A memory allocator 165 may be part of privileged system component 160 and may be embodied as software, firmware, or hardware, or any combination thereof. Memory allocator may be configured to allocate portions of memory circuitry (e.g., based on instructions such as malloc, realloc, calloc, etc.) to the various processes running on the computing device, to deallocate memory (e.g., based on instructions such as delete, free, etc.) or reallocate memory (e.g., based on instructions such as realloc, etc.) for various processes running on the computing device. The memory allocator 165 could be embodied as, for example, a loader, memory manager service, or a heap management service.

In response to execution of an instruction causing a memory access operation, the processor circuitry 110 generates an encoded pointer 180 that includes at least data representative of the memory address 182 involved in the operation, data representative of the size data 186 (e.g., based on a power of two) of a slot to which the memory allocation is assigned, and optionally, data representative of the tag (or version) data 184 associated with the memory allocation slot 140 containing the memory address 182. The encoded pointer 180 may include additional information, such as pointer arithmetic as described below in detail with regard to FIG. 2.

The memory circuitry 130 includes any number and/or combination of electrical components, semiconductor devices, optical storage devices, quantum storage devices, molecular storage devices, atomic storage devices, and/or logic elements capable of storing information and/or data. All or a portion of the memory circuitry 130 may include transitory memory circuitry. All or a portion of the memory circuitry 130 may include non-transitory memory circuitry. Memory circuitry 130 may also be referred to as system memory or main memory. The memory circuitry 130 may include one or more storage devices having any storage capacity. For example, the memory circuitry 130 may include one or more storage devices having a storage capacity of about: 512 kilobytes or greater; 1 megabyte (MB) or greater; 100 MB or greater; 1 gigabyte (GB) or greater; 100 GB or greater; 1 tera byte (TB) or greater; or about 100 TB or greater.

In some embodiments, an instruction that causes the processor circuitry 110 to perform a memory allocation operation causes the processor circuitry 110 to apportion the memory circuitry 130 into any power of two number of memory allocation slots 140A-140n. As depicted in FIG. 1, in some embodiments, the processor circuitry 110 may apportion the memory circuitry 130 into a single memory allocation slot 140A (i.e., a power of two=$2^m$, for a value of m that results in the entire system memory being covered). As depicted in another example apportionment in FIG. 1, in other embodiments, the processor circuitry 110 may apportion the memory circuitry 130 into two memory allocation slots 140A, 140B (i.e., a power of two=$2^{m-1}$). As depicted in another example apportionment in FIG. 1, in other embodiments, the processor circuitry 110 may apportion the memory circuitry 130 into four memory allocation slots 140A-140D (i.e., a power of two=$2^{m-2}$). As depicted in another example apportionment in FIG. 1, in other embodiments, the processor circuitry may apportion the memory circuitry 130 into "n" memory allocation slots 140A-140n (i.e., a power of two=$2^k$ for a value k that results in dividing the system memory into "n" memory allocations).

Importantly, note that the midpoint 142A-142n in each of the memory allocation slots 140 does not align with the midpoint in other memory allocation slots, thereby permitting the storage of metadata (e.g., integrity values, data bounds values, and optionally, allocation bounds information) in metadata regions 150A-150n. In embodiments, for an allocation assigned to a slot sized to include one cacheline or less, an integrity value and upper and lower data bounds value can be stored in a single midpoint metadata region 150. In this scenario, the upper and lower data bounds value may indicate the amount of the allocation's data stored after (to the right of) the midpoint and the amount of the allocation's data stored before (to the left of) the midpoint, respectively. The data stored after the midpoint and the data stored before the midpoint in the cacheline form the object of the allocation for which an integrity value is computed. In addition to the object in the cacheline, the upper and lower data bounds values may also be included in the integrity value computation.

For an allocation assigned to a slot sized to include two or more cachelines, a lower metadata region 152A before (to the left of) the midpoint and an upper metadata region 153A after (to the right of) the midpoint are defined in respective, consecutive cachelines. Cacheline-specific integrity values for the consecutive cachelines can be stored in lower metadata region 152A and upper metadata region 153A. A cacheline-specific data bounds value may be stored in the lower metadata region 152A and indicate the amount of the allocation's data that is contained in the cacheline immediately preceding the midpoint and included in the integrity value computation for that cacheline. Another cacheline-specific data bounds value may be stored in the upper metadata region 153A indicating the amount of the allocation's data that is in the cacheline immediately following the midpoint and included in the integrity value computation for that cacheline. For allocations that span more than two cachelines, respective cacheline-specific integrity values and data bounds values may be stored in a metadata region defined in each cacheline, as will be further described herein.

Integrity values may include any number of bits. For example, an integrity value may include 1-bit or more; 16-bits or more; 32-bits or more; 64-bits or more; 128-bits or more; and so on. The size of the integrity value may vary depending on the architecture and cacheline size. The size of an integrity value may also be dependent on the strength of the security desired and/or needed, as the security provided by the integrity value increases as the number of bits in the integrity value increases. Data bounds values may also include any number of bits, and may depend on the size of the cachelines used by the system and on the block size used for memory allocations. For example, for 64B cachelines, a 16B block size would need 2 bits to indicate how many 16B blocks in a cacheline are to be included in an integrity value computation, while an 8B block size would need 3 bits to indicate how many 8B blocks in a cacheline are to be included in an integrity value computation. Also, the optional upper and lower allocation bounds information stored in the midpoint metadata regions 150A-150n may include any number of bits. The midpoint metadata regions 150A-150n may be sized accordingly to accommodate integrity values and data bounds value. The midpoint metadata regions 150A-150n may be further sized to accommodate allocation bounds information. For example purposes, one or more embodiments herein describe integrity metadata for a 64B cacheline as including a 61-bit integrity value and a 3-bit data bounds value (or two 3-bit data bounds values for upper and lower data bounds when an object is contained in a single cacheline).

Although the description herein describes metadata regions 150A-150n in each of the memory allocation slots 140A-140n as containing integrity value(s), data bounds values, and optionally, allocation bounds information, in other embodiments, other types of metadata may be stored in metadata regions 150A-150n. In some embodiments, other metadata may include but is not limited to: tag data to be compared with tag data in a pointer to the allocation, permission bits, a compartment identifier (ID), privilege level, accessed and/or dirty bits, identifier for code authorized to access the data such as a hash value, key, Key Identifier (keyID), tweak value or IV/counter value used by the processor circuitry 110 to encrypt/decrypt data (and/or other metadata) within the respective memory allocation slot 140. For example, a keyID stored as metadata may be used to select a memory encryption key used to encrypt the data within the bounded allocation using AES (Advanced Encryption Standard) XTS (XEX-based tweaked-codebook mode with ciphertext stealing) mode (or equivalent) using the memory address for the current data load/store operation and/or tag metadata as a tweak. Although various embodiments may provide for the above-described other metadata to be stored in the midpoint metadata regions in addition to the integrity value(s) and data bounds values, for ease of explanation, generally, the embodiments will be described assuming that only integrity value(s) and data bounds values are stored in midpoint metadata regions 150A-150n. Some embodiments will be described with reference to optional allocation bounds information being stored in midpoint metadata regions 150A-150n.

The encoded pointer 180 includes the memory address 182 to perform a memory operation (fetch, store, etc.). The memory address 182 may include any number of bits. For example, the memory address 182 may include: 8-bits or more; 16-bits or more, 32-bits or more; 48-bits or more; or 64-bits or more; 128-bits or more. In embodiments, the size data 186 carried by the encoded pointer 180 may include any number of bits. For example, the size data 186 may include 4-bits or more, 8-bits or more, 16-bits or more, or 32-bits or more. In embodiments, the tag data 184 carried by the encoded pointer 180 may include any number of bits. For example, the tag data 184 may include 4-bits or more, 8-bits or more, 16-bits or more, or 32-bits or more. In one or more embodiments, all or a portion of the address and/or tag data carried by the encoded pointer 180 may be encrypted. Additionally, in one or more embodiments, the encoded pointer or a portion thereof may be used as input to an encryption algorithm (e.g., as a tweak to a counter mode block cipher) to encrypt data stored in the memory allocation.

For an allocation assigned to a slot sized to include one cacheline or less, the integrity metadata (e.g., integrity value, upper and lower data bounds values) stored in a midpoint metadata region 150 may be loaded in a cache line (e.g., a 32-byte block, 64-byte block, or 128-byte block) into the cache circuitry 112. In performing memory operations on the data stored in the cache circuitry 112, the integrity circuitry 114 or other logic, e.g., in processor circuitry 110 or cache circuitry 112, can use upper and lower data bounds values to identify the entire object in the cacheline and compute an integrity value for the object (which may include the upper and lower data bounds values) and then compare the computed integrity value with the integrity value stored in the midpoint metadata region 150 in the cacheline.

For an allocation assigned to a slot sized to include two or more cachelines, integrity metadata (e.g., integrity value and data bounds value) stored in a lower metadata region 152 and integrity metadata (e.g., integrity value and data bounds value) stored in an upper metadata region 153 may be loaded in respective, consecutive cachelines (e.g., a 32-byte block, 64-byte block, or 128-byte block) into the cache circuitry 112. If the allocation spans one or more additional cachelines, each of the additional cachelines can include its own metadata region with an integrity value and a data bounds value per cacheline. In performing memory operations on data of the allocation stored in a particular cacheline in the cache circuitry 112, the integrity circuitry 114 or other logic, e.g., in processor circuitry 110 or cache circuitry 112, can use the data bounds value for the cacheline to identify the amount of the allocation's data in the cacheline, which is used to compute an integrity value for the cacheline. The computed integrity value can then be compared to the integrity value stored in the metadata region of that cacheline. The data bounds value for that cacheline may be included integrity value computation.

In some embodiments, the memory accesses are performed upon successful verification of the integrity values stored in metadata regions of cachelines containing the data targeted in the memory access operation. Also in some embodiments, memory accesses are not performed unless the targeted address range is determined to be within the bounds of the allocation, which may be performed by evaluating each cacheline corresponding to the targeted data of the memory access, or by evaluating (optional) upper and lower allocation bounds information stored in the midpoint metadata region 150.

Additionally, the processor knows where the integrity metadata (and other optional metadata, if any) is located in an allocation, and can skip over the integrity metadata (and other optional metadata, if any). Thus, the presence of the integrity metadata and other optional metadata stored in the midpoint metadata region 150, and in other metadata regions of other cachelines, if any is "hidden" by the processor circuitry from software having access to the metadata using the encoded pointer 180.

Figure 2:
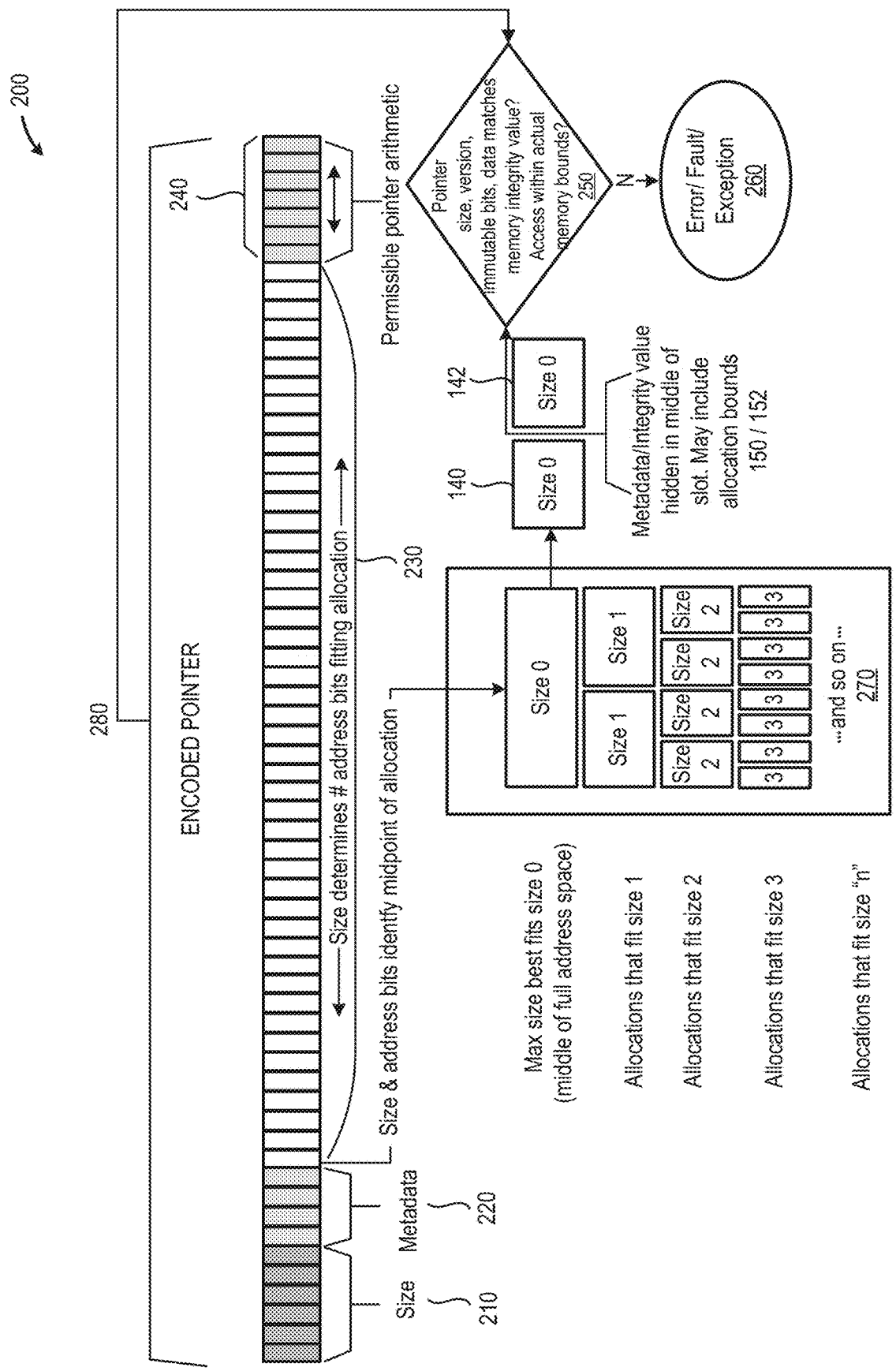
FIG. 2 is a schematic diagram of an illustrative encoded pointer architecture according to at least one embodiment.

FIG. 2 is a schematic diagram of an illustrative encoded pointer architecture 200 in which the encoded pointer 180 includes a multi-bit memory allocation power size field 210, a multi-bit optional metadata field 220 (such as a tag field), a multi-bit address field 230, and a multi-bit pointer arithmetic field 240. As depicted in FIG. 2, the encoded pointer 180 may include any size pointer, such as, for example, a 64-bit pointer, or a 128-bit pointer, or a pointer that is larger than 128-bits. The encoded pointer, in one embodiment, may include an x86 architecture 64-bit pointer. The encoded pointer 180 may include a greater (e.g., 128 bits, 256 bits) or lesser (e.g., 16 bits, 32 bits) number of bits. In embodiments, the number of bits used in the address field 230 may be based on the size of the respective memory allocation slot 140 as expressed in the power size field 210. For example, in general, a larger memory allocation ($2^0$) requires a lesser number of address bits than a smaller memory allocation ($2^1$ to $2^n$). The address field 230 may include any number of bits. For example, the address field 230 may accommodate memory addresses having: 8-bits or more; 16-bits or more, 32-bits or more; 48-bits or more; or 64-bits or more.

A graphical representation of a memory circuitry 270 (which may be similar to memory circuitry 130 of FIG. 1) illustrates possible memory slots to which memory allocations for various encodings in the power size field 210 of encoded pointer 280 can be assigned. Each address space portion of memory, covered by a given value of the bits in address field 230, contains a certain number of allocation slots (e.g., one Size 0 slot, two Size 1 slots, four Size 2 slots, etc.) depending on the power size field 210.

Referring still to FIG. 2, the power size field 210, in combination with the information in the address field 230, will allow the processor to find the midpoint of a given slot. The specific address bits in the address field 230 are determined by the size indicated in the power size field. In one example of a power of two scheme, the value in the power size field determines the number of bits in the pointer arithmetic field 240, and the number of bits in address field 230 can be adjusted accordingly. Thus, for a power of two scheme, where the power size field includes size exponent information, as the size exponent becomes larger (for larger slots), fewer address bits are needed to identify a particular slot (since with larger slots, there will be fewer slots to identify). In such a case, more of the bits at the end of the pointer, in the pointer arithmetic field 240, can be used to range within a given slot. The latter leads to a shrinking of the address field. This compact power encoding enables constant-time lookups of non-duplicated metadata, and the encoding scales to the full linear/virtual address space.

Use of metadata field 220 and of tag data therein is optional. Tag data in a pointer allows multiple versions of a pointer to be used pointing to the same slot, while still ensuring that the pointer version being used to access the slot is in fact the pointer with the right to access that slot. The use of tag data can be useful for mitigating UAF attacks for example. Where a dangling pointer is involved, but where tag data is used, changing tags with each version of the pointer would result in a mismatch with an allocation sought to be accessed by a dangling pointer, leading to errors, and thus protecting the new allocation from unauthorized access by the dangling pointer.

In embodiments, the power size field 210 may include any number of bits. For example, the size data may include: 2-bits or more; 4-bits or more; 6-bits or more; or 8-bits or more. The power size field 210 provides an indication of the size of the memory allocation slot 140. The metadata field 220, when present (it is to be noted that a tag field is optional according to an embodiment but other metadata may be present) may include any number of bits. For example, the power size field 210 may include: 4-bits or more, 6-bits or more; 8-bits or more, 16-bits or more, or 32-bits or more. The encoded pointer 280 also includes a pointer arithmetic field 240. The pointer arithmetic field 240 may include any number of bits. For example, the pointer arithmetic field 240 may include: 4-bits or more, 6-bits or more; 8-bits or more, 16-bits or more, or 32-bits or more.

As depicted in FIG. 2, in one example, upon execution of an instruction that includes a memory operation, at 250, the integrity circuitry 114 or other logic, processor circuitry 110 and/or the memory controller circuitry 120 compares the metadata (such as tag data 184) included in the metadata field 220 with the metadata stored in a midpoint metadata region 150 of a memory allocation slot 140. If the metadata (e.g., tag data 184) included in the metadata field 220 fails to match the metadata stored in the midpoint metadata region 150 of the memory allocation slot 140, the memory controller circuitry 120 reports an error, fault, or exception 260 to the processor circuitry 110.

As depicted in FIG. 2, in one example, upon execution of an instruction that includes a memory operation, at 250, the integrity circuitry 114 or other logic, e.g., processor circuitry 110, performs an integrity check. If the memory allocation is assigned to a sub-cacheline slot (i.e., a slot sized to include one cacheline or less), then midpoint metadata region may contain a single integrity value for the allocation, which is fully contained in the cacheline. In this case, the processor circuitry 110 and/or the integrity circuitry 114 uses upper and lower data bounds values stored in the midpoint metadata region 150 to identify data in the cacheline on each size of the midpoint that forms the object stored in the memory allocation. The integrity value can be computed using the identified object in the cacheline and possibly the upper and lower data bounds values in the midpoint metadata region. The computed integrity value can be compared to the stored integrity value in the midpoint metadata region 150. If the computed integrity value fails to match the integrity value stored in the midpoint metadata region 150 of the memory allocation slot 140, the memory controller circuitry 120 or integrity circuitry 114 reports an error, fault, or exception 260 to the processor circuitry 110. Otherwise, if the computed integrity value matches or otherwise corresponds to the integrity value stored in the midpoint metadata region 150 of the memory allocation slot 140, the processor circuitry 110 and/or the memory controller circuitry 120 completes the requested memory operation in the memory circuitry 130.

If the allocation is assigned to a slot that is sized to include two or more cachelines, then the integrity circuit 114 or other logic, e.g., processor circuitry 110, performs an integrity check for each cacheline containing at least a portion of the data targeted for access (e.g., read/load, store/write, etc.). Each cacheline contains a metadata region storing an integrity value for the allocation's data in the cacheline and a data bounds value that indicates the extent of the allocation's data in the cacheline. The processor circuitry 110 and/or the integrity circuitry 114 uses the data bounds value to identify the amount of the allocation's data in the cacheline to use in computing an integrity value for the cacheline. Optionally, the data bounds value may be included in the integrity value computation. The computed integrity value can be compared to the stored integrity value in the metadata region of the cacheline. If the computed integrity value fails to match the stored integrity value, the memory controller circuitry 120 or integrity circuitry 114 reports an error, fault, or exception 260 to the processor circuitry 110. Otherwise, if the computed integrity value matches or otherwise corresponds to the stored integrity value, the processor circuitry 110 and/or the memory controller circuitry 120 completes the requested memory operation in the memory circuitry 270.

It should be noted that, in at least one example, the integrity value computation can include a cryptographic algorithm (e.g., a tweakable counter mode block cipher) that uses at least a portion of the encoded pointer 280 as a tweak input. Thus, the integrity value check can be bound to tag data (e.g., in metadata field 220) to prevent UAF violations without requiring tag data to be stored in the midpoint metadata region to enable a separate check of the pointer tag data to the stored tag data. Additionally, the integrity value may be bound to the power of two slot size if the power size bits are included in the tweak.

Allocation bounds metadata may also be included in a midpoint metadata region 150. In some embodiments, the processor circuitry 110 and/or memory controller circuitry 120, or other logic, may also check, at 250, whether the memory access is within the specified allocation bounds and allow access if the memory access is within the specified allocation bounds and the integrity checks are successful, and deny access if the memory access is outside the specified allocation bounds. The allocation bounds information may include coordinates of a memory allocation—e.g., offset and array size, or actual allocation size to the left and allocation size to the right of a slot midpoint, or any other information that indicates the actual beginning and end of the allocation.

Figure 3:
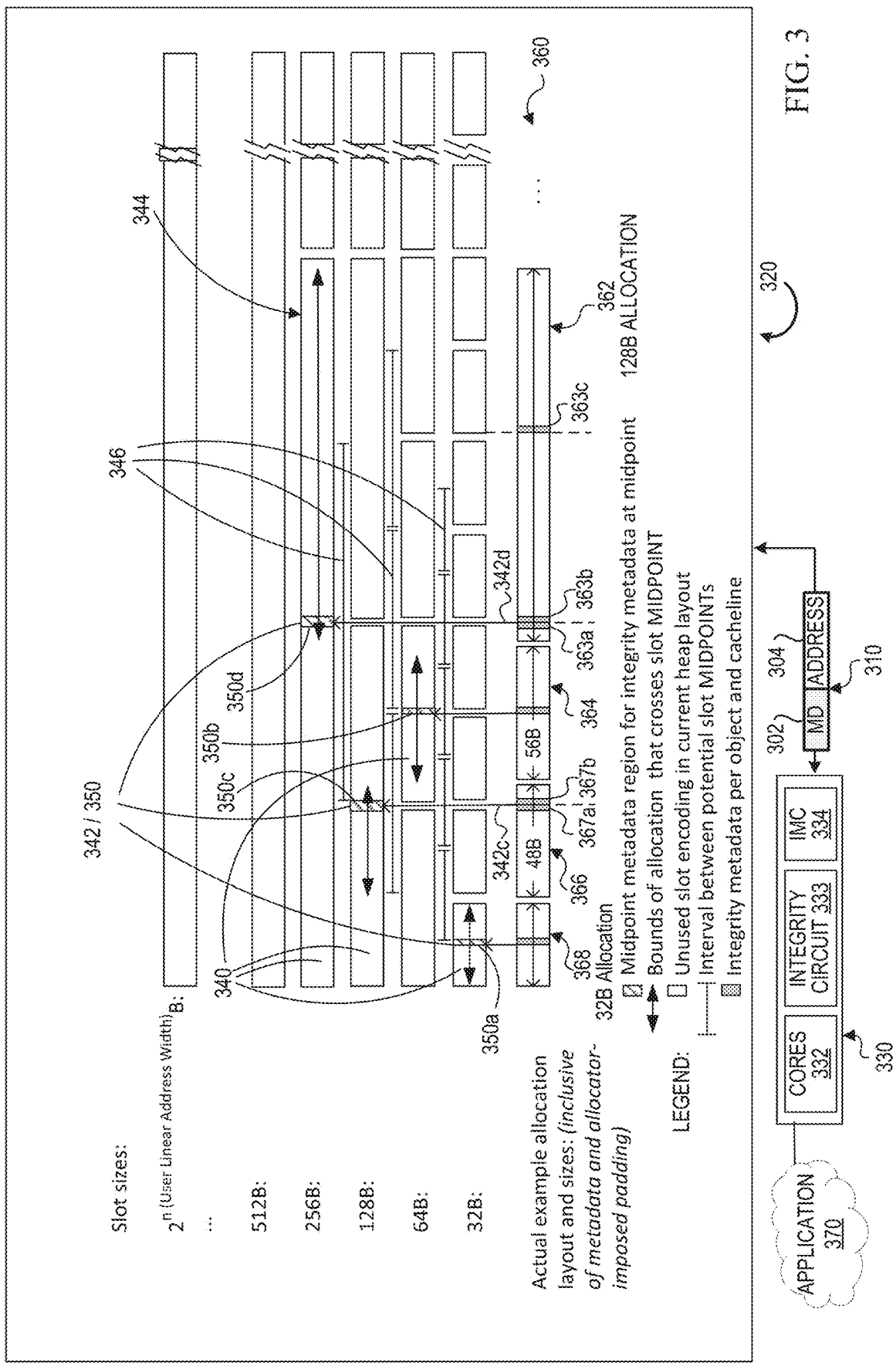
FIG. 3 is a schematic illustration of a memory allocation and access system with inline integrity metadata according to an embodiment.

FIG. 3 is a schematic diagram of an illustrative memory/cache 320 (e.g., similar to memory circuitry 130 and/or 270) to allow integrity checks using inline integrity metadata in memory allocations accessed by an encoded pointer 310 (e.g., similar to encoded pointers 180, 280). The schematic diagram also shows processor circuitry 330 (e.g., similar to processor circuitry 110) including cores 332, integrity circuit 333, and memory controller circuitry 334 (e.g., memory controller (MC), integrated memory controller (IMC), memory management unit (MMU)), which are communicatively coupled to memory/cache 320. Although embodiments are not so limited, in the shown embodiment of FIG. 3 the memory/cache 320 may be apportioned into one or more power of two (i.e., $2^0$ to $2^n$) slots 340 in which, at each respective midpoint of a slot to which one of the memory allocations 360 is assigned, a midpoint metadata region 350 is defined depending on the size of the slot (e.g., a single metadata region for a sub-cacheline, two consecutive metadata regions for two or more cachelines), in accordance with at least one embodiment described herein. Uniform intervals 346 are defined between potential midpoint metadata regions in consecutive power-of-two slots. Additionally, "allocation" and "memory allocation" are intended to refer to an addressable portion of memory in which an object, such as data or code, or a portion of the object, is stored. As used herein, "slot" is intended to refer to a unit of memory having a power-of-two size and each slot of the same size is defined consecutively in memory. For example, 32B slots are defined consecutively in memory and are superimposed over other consecutive power-of-two slots, 64B slots are defined consecutively in memory and are superimposed over other consecutive power-of-two slots, etc.

In some embodiments, an instruction that causes the processor circuitry 330 to allocate memory causes encoded pointer 310 to be generated. The encoded pointer may include at least data representative of the linear address associated with the targeted memory allocation 360 and metadata 302 (such as a power of two encoding of the allocation size in power size field 210 and optionally tag data in metadata field 220) associated with the respective memory allocation 360 corresponding to memory address 304. Also, an instruction that causes the processor circuitry 330 to perform a memory operation (e.g., LOAD, MOV) that targets a particular memory allocation (e.g., 128B memory allocation 362) causes the memory controller circuitry 334 to access that memory allocation, which is assigned to a particular slot (e.g., 256B slot 344) in memory/cache 320 using the encoded pointer 310. The instruction that causes processor circuitry 330 to perform the memory operation can also cause the integrity circuitry 114 to perform integrity check(s) for cachelines containing the targeted contents of the allocation. A separate integrity check may be performed for each cacheline holding at least a portion of the allocation's data that is being targeted. The specific processing of the integrity checks will be further described herein with respect to FIGS. 4-11, for example.

In the embodiments of the memory/cache 320 of FIG. 3, each memory allocation 360 is fully assigned to a given slot (i.e., one memory allocation per slot and one slot per memory allocation), in this way ensuring that the midpoint metadata region 350 at the midpoint of a slot can be easily associated with the memory allocation to which it pertains. Embodiments, however, are not so limited, and include within their scope the provision of at least some metadata (e.g., integrity values and data bounds values)) within a slot that includes none, some, or all of the memory allocation to which the metadata pertains. The memory allocations 360 are shown in FIG. 3 once at the bottom of the figure and represented correspondingly by double pointed arrows within the respective slots 340 to which the memory allocations are assigned. Even though the memory allocations 360 may be assigned to slots larger than the allocations themselves, the allocations may, according to one embodiment, not need padding in order to be placed within the larger slots.

According to some embodiments, a memory allocation may be assigned to a slot that most tightly fits the allocation, given the set of available slots and allocations. In the shown embodiment of FIG. 3, for example, a 32B allocation 368 is assigned to a 32B slot, a 48B allocation 366 to a 128B slot, a 56B allocation 364 to a 64B slot, and a 128B allocation 362 to a 256B slot. In the shown example of FIG. 3, because the 48B allocation 366 would have crossed an alignment boundary within two slots, it is assigned to the larger 128B slot, and because the 128B allocation 362 would have crossed an alignment boundary within two slots, it is assigned to the larger 256B slot. Although the example of FIG. 3 shows the memory allocations as spanning through the slots in a contiguous fashion (tightly packed), clearly, embodiments are not so limited, and include within their scope a scheme of memory allocations to respective, dedicated memory slots as long as a midpoint address of the slot is crossed by the allocation, where some slots may be free, especially for example in UAF scenario where a dangling pointer is involved. According to some embodiments, memory allocation sizes may be no smaller than half the width of a smallest slot in order for them to cross (i.e., to at least partially cover) the midpoint when assigned to a slot. Additionally, it is noted that each allocation is free to span possible metadata regions for smaller powers. Those possible metadata regions can simply store the allocation's data. As shown in FIG. 3 for example, the 128B allocation 362 (which is assigned to 256B-aligned slot) spans possible metadata regions in four 32B-aligned slots, two 64B-aligned slots, and one 128B-aligned slot. Also in this example, the 56B allocation 364 spans possible metadata regions in two 32B-aligned slots, and the 48B allocation 366 spans a possible metadata region in one 32B-aligned slot.

Based on the above allocation scheme, where each memory allocation is uniquely assigned to a dedicated slot, and crosses the slot midpoint, the midpoint metadata region 350 may be located at the midpoint (e.g., at an address immediately following the midpoint and/or at an address before the midpoint that is offset from the midpoint based on the size of the metadata) so that the processor is able to find the midpoint metadata region for a particular slot quickly and it is ensured to be at least partially contained within the memory allocation that is assigned to that particular slot, without having to go to a separate table or memory location to determine the metadata. The midpoint metadata region 350 for an allocation is efficiently addressed in terms of a power-of-two metadata spacing that is specified as an exponent in a power size field (e.g., 210) in an encoded pointer and that combines with the upper address bits in that pointer to locate the metadata in constant time. The midpoint metadata region assignment effectively results in each allocation being assigned to a naturally-aligned power-of-two allocation slot with the metadata at the midpoint of the slot. Thus, the size of the slot matches the metadata spacing (e.g., uniform intervals 346) specified by the value of the power field in the pointer. Furthermore, each allocation should be assigned the one unique midpoint metadata region with the highest power that is included in the allocation. However, the allocation does not itself need to be padded to fill the logical power-of-two slot. Spaced locations not used as metadata storage can instead store data or code of other allocations.

One possible formula for computing the slot midpoint location where the metadata is stored can be expressed in a Verilog-like format as follows:

{SignExt(Pointer[47:Power], 64-Power), 1'b1, (Power-1) 'b0} where SignExt(x,y) sign extends x to y bits. The power for each allocation can be determined as follows:

minPower such that AllocLimit {AllocBase[63:Power], Power'b1}

In this expression of minimum power, AllocBase is the address of the first byte of the allocation, AllocLimit is the address of the uppermost byte of the allocation, and the final term is sign-extended to have a bitwidth of Power and to be all ones. Note that the Power value is determined by both the size and the location of the allocation, i.e., based on which naturally-aligned power-of-two boundaries it crosses. The allocator can initialize the power field in each pointer according to this formula. In one example implementation, the initialization can be performed with assistance from a specialized instruction.

Any allocation that is at least half the minimum metadata spacing (power) has a unique metadata location that is inline or adjacent to the allocation data and is able to encode bounds covering the entire allocation. In the example of FIG. 3, a minimum metadata spacing (e.g., uniform intervals 346) that accommodates the minimum chunk size of a memory allocator (e.g., glibc) is 32B. This results in a minimum data size per chunk of 24B excluding an 8B chunk header. In one or more embodiments, the allocation bounds cover the data region, but not the header region. This helps to mitigate chunk header corruption. In one or more embodiments of a system for performing integrity checks with inline integrity metadata, the minimum data size per chunk also accounts for a cacheline metadata region in each cacheline, which may include an integrity value of any suitable size (e.g., one or more bits) and a data bounds value of any suitable size (e.g., one or more bits).

Midpoint metadata regions 350 (e.g., similar to midpoint metadata regions 150A-150n) are defined such that metadata can be deterministically stored inline with any possible allocation. Optionally, such metadata can include allocation bounds for that allocation. Every allocation has a unique association with a single metadata instance that can be located in constant time based on the encoded pointer (e.g., 180, 280, 310) for that allocation. The length of data preceding a midpoint of an allocation may differ from the length of data following the midpoint. Additionally, each allocation is free to span possible metadata storage locations for smaller powers. Those locations can simply store the allocation's data.

The power-of-two (Po2) approach, used according to one or more embodiments, allows a unique mapping of each memory allocation to a Po2 slot, where the slot is used to provide the possibility to uniquely encode and encrypt each object stored in the memory allocations. According to some embodiments, some, none, or all metadata (e.g., integrity value, data bounds value, and/or upper and lower allocation bounds information) in metadata regions 350 may be encrypted in addition to, or instead of, encrypting the object (e.g., data or code) in the memory allocation. In some embodiments, the integrity metadata is not encrypted. The integrity value may be computed based on the encrypted object and possibly also based on the data bounds value. In other embodiments, the integrity value may be computed based on the unencrypted object and possibly also on the data bounds object.

At least some embodiments specify, in the power size field (e.g., 210) of the pointer, the size of the slot, such as the Po2 size of the slot as a size exponent in the power size field of the pointer, that the object to be addressed fits into. The size determines the specific address bits to be referred to by the processor in order to determine the slot being referred to. Having identified the specific slot and size of the slot, the processor can go directly to the address of the midpoint metadata region of the identified slot in order to determine where the metadata regions storing the integrity metadata are located in the cachelines. Embodiments are, however, not limited to Po2 schemes for the slots, and may include a scheme where the availability of slots of successively increasing sizes may be based on a power of an integer other than two, or based on any other scheme.

Allocation bounds information stored as part of metadata in midpoint metadata regions 350, where the metadata region is known to cross the midpoint, may be expressed as the lower bound (LB) and upper bound (UB) with the midpoint as the point of reference for the LB and UB. Each metadata instance stored in the midpoint metadata region can specify allocation bounds up to half the specified metadata spacing in either direction. Allocation bounds can be used regardless of the size of the slot and in order to allow, among other things, a detection of buffer overflow. For example, allocation bounds information and non-repeating tags can be used to provide deterministic checking for adjacent overflows and probabilistic checking for non-adjacent overflows and use after free (UAF). Advantageously, because the allocation bounds information in the shown embodiment is stored with the object in a slot (although embodiments are not so limited), it can be, at substantially the same time as the object itself, made available to the processor. Allocation bounds information, according to some embodiments, allows a determination of the location of the allocation based on known midpoint reference and without the need to take up a large number of bits in the pointer where the slot and/or the allocation itself are large, especially where the number of bits in the pointer may not be sufficient to support a distance of the pointer value from the beginning of the allocation. A Po2 scheme as shown by way of example in FIG. 3 provides a compact encoding scheme where, every time a value is added in the size exponent field of the pointer, the slot size being referenced is doubled, instead of a linear scaling as afforded by the provision of distance information from a pointer value to the beginning of a referred to object.

Although the memory controller circuitry 334 and integrity circuitry 333 are depicted in FIG. 3 as separate boxes from the cores 332, the cores 332 may include all or a portion of the memory controller circuitry 334 and/or the integrity circuitry 333. Alternatively, memory controller circuitry 334 may include all or a portion of the integrity circuitry 333. Also, although the memory controller circuitry 334 and integrity circuitry 333 are depicted in FIG. 3 as part of processor circuitry 330, in some embodiments, the processor circuitry 330 may include all, a portion, or none of the memory controller circuitry 334. Furthermore, the processor circuitry 330 may include all, a portion, or none of the integrity circuitry 333. Generally, the embodiments described herein are intended to include implementations by circuitry having numerous possible configurations.

In response to execution of a memory access instruction, the processor circuitry 330 uses an encoded pointer 310 that includes at least data representative of the memory address 304 involved in the operation. Optionally in some embodiments, the encoded pointer 310 may also include data representative of the metadata 302, such as power size (e.g., in power size field 210), associated with the memory allocation 360 corresponding to the memory address 304. The encoded pointer 310 may include additional information, such as data representative of a tag or version (e.g., in metadata field 220) of the memory allocation 360 and pointer arithmetic bits (e.g., 240) to identify the particular address being accessed within the memory allocation.

In embodiments described herein, a midpoint metadata region 350 at the midpoint of a slot to which a memory allocation is assigned may be sized based on the size of the slot relative to a cacheline defined by the underlying architecture. Although different architectures may use different sizes of cachelines (e.g., a 32-byte block, 64-byte block, or 128-byte block, 256-byte block, 512-byte block, or more, or another block size equal to a power of two bytes), for ease of illustration, embodiments will be described herein assuming the underlying architecture uses 64B cachelines to move memory contents (e.g., data, code). If an allocation is assigned to a sub-cacheline slot (e.g., 32B allocation 368 having a 32B slot, 56B allocation 364 having a 64B slot), then the midpoint metadata regions (e.g., metadata regions 350a, 350b), may be sized to accommodate an integrity value for the entire allocation and both upper and lower data bounds values that indicate the amount of data in the cacheline extending in each direction from the midpoint to be included in the integrity value computation. The midpoint metadata region 350 for an allocation assigned to a sub-cacheline slot may be located entirely on either side of the midpoint, or partially on each side of the midpoint.

If an allocation is assigned to a slot that is greater than the size of the cacheline, and specifically sized to hold two or more cachelines, such as the 128B allocation to which the 48B allocation 366 is assigned, then the midpoint metadata region, such as midpoint metadata region 350c, comprises two metadata regions (e.g., a lower metadata region 367a and an upper metadata region 367b) that are loaded and stored in respective, consecutive cachelines. Respective integrity values for the consecutive cachelines can be stored in the lower metadata region (e.g., 367a) and the upper metadata region (e.g., 367b). A data bounds value may be stored in the lower metadata region (e.g., 367a) and indicate the size of the allocation's contents that are in the cacheline immediately preceding the midpoint, such as midpoint 342c, and that are to be included in the integrity value check for that cacheline. Another data bounds value may be stored in the upper metadata region (e.g., 367b) and indicate the size of the allocation's contents that are in the cacheline immediately following the midpoint (e.g., 342c) and that are included in the integrity value check for that cacheline.

In another example of an allocation assigned to a slot having a size that is greater than the size of a cacheline used by the underlying architecture, the 128B allocation 362 is assigned to the 256B slot 344. A midpoint metadata region 350d of the 256B slot 344 comprises a lower metadata region 363a and an upper metadata region 363b, which are loaded and stored in respective, consecutive cachelines. Respective integrity values for the consecutive cachelines can be stored in the lower metadata region 363a and the upper metadata region 363b. A data bounds value may be stored in the lower metadata region 363a and indicate the size of the contents of the 128B allocation 362 that are in the cacheline immediately preceding the midpoint 342d and that may be included in the integrity value check for that cacheline. Another data bounds value may be stored in the upper metadata region 363b and indicate the size of the allocation's contents that are in the cacheline immediately following the midpoint 342d and that may be included in the integrity value check for that cacheline. If the allocation spans one or more additional cachelines, each of the additional cachelines can include its own metadata region with an integrity value and a data bounds value for the cacheline. For example, the 128B allocation 362 spans a third cacheline that includes a metadata region 363c at the beginning of the cacheline. The metadata region 363c can include an integrity value and a data bounds value for that third cacheline spanned by the 128B allocation 362. Since there is always at least one MAC or other metadata per cacheline, cachelines can be physically extended to carry one instance of metadata. The additional metadata can be stored in ECC memory or a separate table in memory indexed by physical address that is accessed by the memory controller to construct a complete cacheline with metadata when loading the cacheline, or to store the updated metadata when storing the cacheline. Additional metadata beyond what fits in the physical extension of the cacheline (e.g., a MAC of a cacheline portion besides the portion that is covered by the MAC in the physical extension of the cacheline) could be stored inline in the original data region of the cacheline for cachelines that contain multiple allocations or portions of allocations. For example, the inline metadata could be stored adjacent to the end of each allocation as can be located by stored bounds.

Optionally in some embodiments, a midpoint metadata region is sized to also store other metadata such as, for example, upper and lower allocation bounds information of the memory allocation. In embodiments including upper and lower allocation bounds information, the core 332 may further perform bounds checks and potentially other checks using the metadata stored at the slot midpoint. If allocation bounds checks comparing the memory address 304 against the allocation bounds information match, the core 332 completes the requested operation if the integrity checks also pass. If allocation bounds checks on the address check fail to return a match, the core 332 returns an exception to the processor circuitry 330.

The memory/cache 320 may include any number and/or combination of electrical components, semiconductor devices, optical storage devices, quantum storage devices, molecular storage devices, atomic storage devices, and/or logic elements capable of storing contents including any data or code. All or a portion of the memory/cache 320 may include transitory memory circuitry, such as RAM, DRAM, SRAM, or similar. All or a portion of the memory/cache 320 may include non-transitory memory circuitry, such as: optical storage media; magnetic storage media; NAND memory; and similar. The memory/cache 320 may include one or more storage devices having any storage capacity. For example, the memory/cache 320 may include one or more storage devices having a storage capacity of about: 512 kiloBytes or greater; 1 megaByte (MB) or greater; 100 MB or greater; 1 gigaByte (GB) or greater; 100 GB or greater; 1 teraByte (TB) or greater; or about 100 TB or greater.

In the shown embodiment of FIG. 3, the IMC 334 apportions the memory/cache 320 into any power of two number of slots 340. In some embodiments, the IMC 334 may apportion the memory/cache 320 into a single memory slot 340 (i.e., a power of two=$2^m$, for a value of m that results in the entire system memory being covered). In other embodiments, the IMC 334 may apportion the memory/cache 320 into two memory slots 340 (i.e., a power of two=$2^{m-1}$). In other embodiments, the IMC 334 may apportion the memory/cache 320 into four memory slots 340 (i.e., a power of two=$2^{m-2}$). In other embodiments, the IMC 334 may apportion the memory/cache 320 into "n" memory slots 340 (i.e., a power of two=$2^k$ for a value k that results in dividing the memory space into "n" slots). Importantly, note that the midpoint 342 in each of the memory slots 340 does not align with the midpoint in other memory slots, thereby permitting the storage of metadata (in a midpoint metadata region 350) that is unique to the respective memory slots 340. In some embodiments, integrity metadata (which includes an integrity value and a data bounds value), and optionally other metadata such as allocation bounds information, may include any number of bits sufficient to accommodate each item of the metadata. For example, the integrity metadata may include 2-bits or more, 8-bits or more, 16-bits or more, 32-bits or more, or 64-bits or more.

The encoded pointer 310 is created for one of the memory allocations 360 (e.g., 32B allocation 368, 56B allocation 364, 48B allocation 366, or 128B allocation 362) and includes memory address 304 for an address within the memory range of that memory allocation. When memory is initially allocated, the memory address may point to the lower bounds of the memory allocation. The memory address may be adjusted during execution of the application 370 using pointer arithmetic to reference a desired memory address within the memory allocation to perform a memory operation (fetch, store, etc.). The memory address 304 may include any number of bits. For example, the memory address 304 may include: 8-bits or more; 16-bits or more, 32-bits or more; 48-bits or more; or 64-bits or more; 128-bits or more; 256-bits or more, 512-bits or more, up to 2 to the power of the linear address width for the current operating mode, e.g., the user linear address width-bits in terms of slot sizes being addressed. In embodiments, the metadata 302 carried by the encoded pointer 310 may include any number of bits. For example, the metadata 302 may include 4-bits or more, 8-bits or more, 16-bits or more, or 32-bits or more. In embodiments, all or a portion of the address and/or metadata (e.g., tag data, which may or may not be included depending on the embodiment) carried by the encoded pointer 310 may be encrypted.

In embodiments, the contents of midpoint metadata regions in allocations assigned to slots that are not larger than a cacheline (e.g., midpoint metadata regions 350a, 350c), or lower metadata regions in allocations assigned to slots that are larger than a cacheline (e.g., lower metadata regions 363a, 367a), upper metadata regions in allocations assigned to slots that are larger than a cacheline (e.g., upper metadata regions 363b, 367b), or other metadata regions in cachelines not adjacent to the midpoint and spanned by an allocation (e.g., metadata region 363c) may be loaded as part of a cache line (e.g., a 32-byte block, 64-byte block, or 128-byte block, 256-byte block or more, 512-byte block, or a block size equal to a power of two-bytes) into the cache of processor circuitry 330. In performing memory operations on contents of a metadata region (e.g., 350a, 350b, 363a, 363b, 363c, 367a, 367b) stored in the cache of processor circuitry 330, the memory controller circuitry 334 or other logic, e.g., in processor circuitry 330, can decrypt the metadata of the metadata region (if the metadata was stored in an encrypted form). The other contents (e.g., data or code) of the allocation loaded in the cacheline can also be decrypted (if the other contents were stored in an encrypted form). An integrity check can be performed using the decrypted data bounds value, the decrypted allocation contents in the cacheline, and the decrypted integrity value stored in the metadata region. If the integrity check is successful (i.e., the allocation's contents in the cacheline have not been altered), then the processor circuitry can perform the memory operation. In some cases, if allocation bounds information (i.e., upper allocation bounds information or lower bounds information) in the metadata region 350 can be used to determine whether the memory access is targeting an address range that is within the allocation or outside the allocation. If the targeted address range is within the allocation, then the memory operation can proceed. Otherwise, a fault can be raised.

Figure 4:
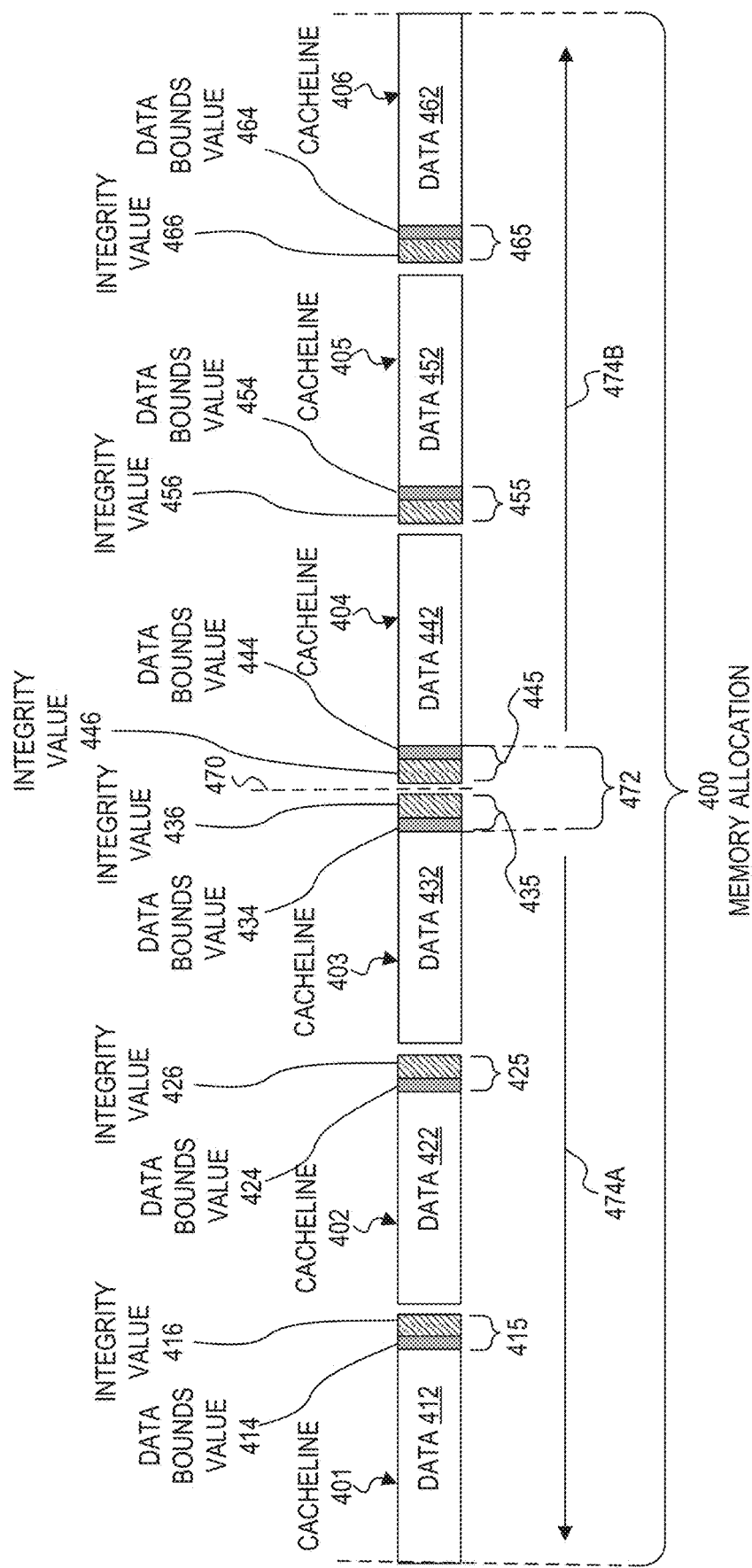
FIG. 4 is a schematic illustration of an example memory allocation with inline integrity metadata according to an embodiment.

FIG. 4 illustrates an example memory allocation 400 with inline integrity metadata according to an embodiment. For ease of reference, cachelines of the underlying architecture are presumed to be 64B, although cacheline size may vary depending on the architecture. Assuming 64B cachelines, memory allocation 400 is 384B and spans six cachelines 401, 402, 403, 404, 405, and 406. A power-of-two slot sized at 512B (or greater) may be assigned memory allocation 400. In this example, the memory allocation 400 is assigned to a having a midpoint 470 at the center of memory allocation 400. It should be noted however, that the slot midpoint may be located anywhere in the allocation 400 depending on the particular address range of the allocation and the slot size assigned to the allocation.

As illustrated in FIG. 4, for a memory allocation that spans multiple cachelines, multiple instances of integrity metadata (e.g., an integrity value and a data bounds value) are stored inline as part of an allocation relative to the midpoint of the slot to which the allocation is assigned. For example, a memory allocation operation (e.g., malloc, calloc, etc.) can reserve additional memory to account for the additional integrity metadata. The multiple instances of integrity metadata may be distributed throughout the allocation allowing efficient access of an integrity value and data bounds value when data is accessed on the same cacheline. In at least one embodiment, each cacheline includes a metadata region containing an integrity value and a data bounds value. In example allocation 400, cacheline 401 includes metadata region 415 containing integrity value 416 and data bounds value 414, cacheline 402 includes metadata region 425 containing integrity value 426 and data bounds value 424, cacheline 403 includes metadata region 435 containing integrity value 436 and data bounds value 434, cacheline 404 includes metadata region 445 containing integrity value 446 and data bounds value 444, cacheline 405 includes metadata region 455 containing integrity value 456 and data bounds value 454, and cacheline 406 includes metadata region 465 containing integrity value 466 and data bounds value 464. Other per-cacheline, sub-cacheline, or replicated or dispersed metadata may be stored in each metadata region such as a bitmap indicating whether each aligned word contains a pointer or capability, which may be further distinguished as referencing data, forward code addresses, or return addresses, whether each aligned word contains sensitive data, or tag/version values for cachelines or other memory granules.

The locations of the metadata regions containing the integrity metadata are deterministic and are hidden by the processor so that software does not need to mind the gaps. For allocations where the slot size is greater than the size of a cacheline, a midpoint metadata region comprises a lower metadata region in one cacheline immediately preceding the midpoint and an upper metadata region in another cacheline immediately following the midpoint. The lower metadata region may be aligned with the end of its cacheline and the upper metadata region may be aligned with the beginning of its cacheline. In the example of FIG. 4, metadata regions 435 and 445 are positioned about midpoint 470 in allocation 400 and form a midpoint metadata region 472. Metadata region 435 is the lower metadata region of midpoint metadata region 472 and is included in cacheline 403, which immediately precedes midpoint 470. Metadata region 435 is aligned with the end of its cacheline 403. Metadata region 445 is the upper metadata region of midpoint metadata region 472 and is included in cacheline 404, which immediately follows midpoint 470. Metadata region 435 is aligned with the beginning of its cacheline 404.

In one or more embodiments, the locations of metadata regions in cachelines spanned by the allocation 400 vary depending on the direction from the slot midpoint. If a cacheline is located to the left of the slot midpoint (i.e., precedes or before the midpoint), then the metadata region of that cacheline is aligned with the right side (or end) of the cacheline. If a cacheline is located to the right of the slot midpoint (i.e., follows or after the midpoint), then the metadata region of that cacheline is aligned with the left side (or beginning) of the cacheline. In the example in FIG. 4, like cacheline 403, which immediately precedes the midpoint, the metadata regions for all other cachelines that precede the midpoint (e.g., cachelines 401-402) are also aligned with the end of their cachelines. Like cacheline 404, which immediately follows the midpoint, the metadata regions for all other cachelines that follow the midpoint (e.g., cachelines 405-406) are also aligned with the beginning of their cachelines.

Each integrity value stored in a metadata region is computed based on the allocation's data in the cacheline, which may be optionally combined with (e.g., concatenated with) the data bounds value in the metadata region of the cacheline. For example, integrity value 416 is computed based on data 412 (which is optionally combined with the data bounds value 414), integrity value 426 is computed based on data 422 (which is optionally combined with data bounds value 424), integrity value 436 is computed based on data 432 (which is optionally combined with data bounds value 434), integrity value 446 is computed based on data 442 (which is optionally combined with data bounds value 444), integrity value 456 is computed based on data 452 (which is optionally combined with data bounds value 454), integrity value 466 is computed based on data 462 (which is optionally combined with data bounds value 464).

The data bounds value in a metadata region of a cacheline may represent the size of the allocation's data in that cacheline that is to be used to compute an integrity value. In an embodiment, the size can indicate the extent of the data covered on the cacheline, where the data extends from the metadata region in the direction away from the midpoint. Thus, an integrity value can be computed over variable sized data, up to the size of the cacheline (e.g., 64B), less the size of the integrity value and the data bounds value stored in the metadata region. The number of bits used to encode the data bounds value may vary, depending on the granularity desired in the particular implementation. If the data is referenced in 16B blocks, then for a 64B cacheline, only two bits are needed to encode the size, because four values can be encoded in two bits. Thus, the data bounds value may be encoded in 2 bits. If the data is referenced in 8B blocks, then for a 64B cacheline, three bits are needed to encode the size because eight values can be encoded in three bits. However, even a 1B granularity may be encoded. In this case, if the data is referenced in 1B blocks, then for a 64B cacheline, six bits are needed to encode the size, because sixty-four values can be encoded in six bits.

In FIG. 4, for cachelines preceding midpoint 470 (e.g., cachelines 401-403), the data bounds value indicates the extent of the data covered on the cacheline in the direction of arrow 474A. For cachelines following midpoint 470 (e.g., cachelines 404-406), the data bounds value indicates the extent of the data covered on the cacheline in the direction of arrow 474B. For example, data bounds value 414 indicates the extent of data 412 from the end of cacheline 401 extending in the direction of arrow 474A, data bounds value 424 represents the extent of data 422 from the end of cacheline 402 extending in the direction of arrow 474A, data bounds value 434 represents the extent of data 432 from the end of cacheline 403 extending in the direction of arrow 474A, data bounds value 444 represents the extent of data 442 from the end of cacheline 404 extending in the direction of arrow 474B, data bounds value 454 represents the extent of data 452 from the end of cacheline 405 extending in the direction of arrow 474B, and data bounds value 464 represents the extent of data 462 from the end of cacheline 406 extending in the direction of arrow 474B.

In other embodiments, the data bounds value in a metadata region of a cacheline may be included with the data in the cacheline to compute the integrity value for that cacheline. In this embodiment, for example, data bounds value 414 represents the combined size of data 412 and data bounds value 414 extending from integrity value 416 in the direction of arrow 474A, data bounds value 424 represents the combined size of data 422 and data bounds value 424 extending from integrity value 426 in the direction of arrow 474A, data bounds value 434 represents the combined size of data 432 and data bounds value 434 extending from integrity value 436 in the direction of arrow 474A, data bounds value 444 represents the combined size of data 442 and data bounds value 444 extending from integrity value 446 in the direction of arrow 474B, data bounds value 454 represents the combined size of data 452 and data bounds value 454 extending from integrity value 456 in the direction of arrow 474B, and data bounds value 464 represents the combined size of data 462 and data bounds value 464 extending from integrity value 466 in the direction of arrow 474B.

Depending on the address range of the allocation 400, the data 412 in the first cacheline 401 and data 462 in the last cacheline 406 may or may not fill their respective cachelines. Thus, a data bounds value at the first (beginning) and last cachelines of an allocation ensures that the integrity value is computed based only on data within the bounds of the allocation 400 and not on data outside the bounds of the allocation 400.

Figure 5:
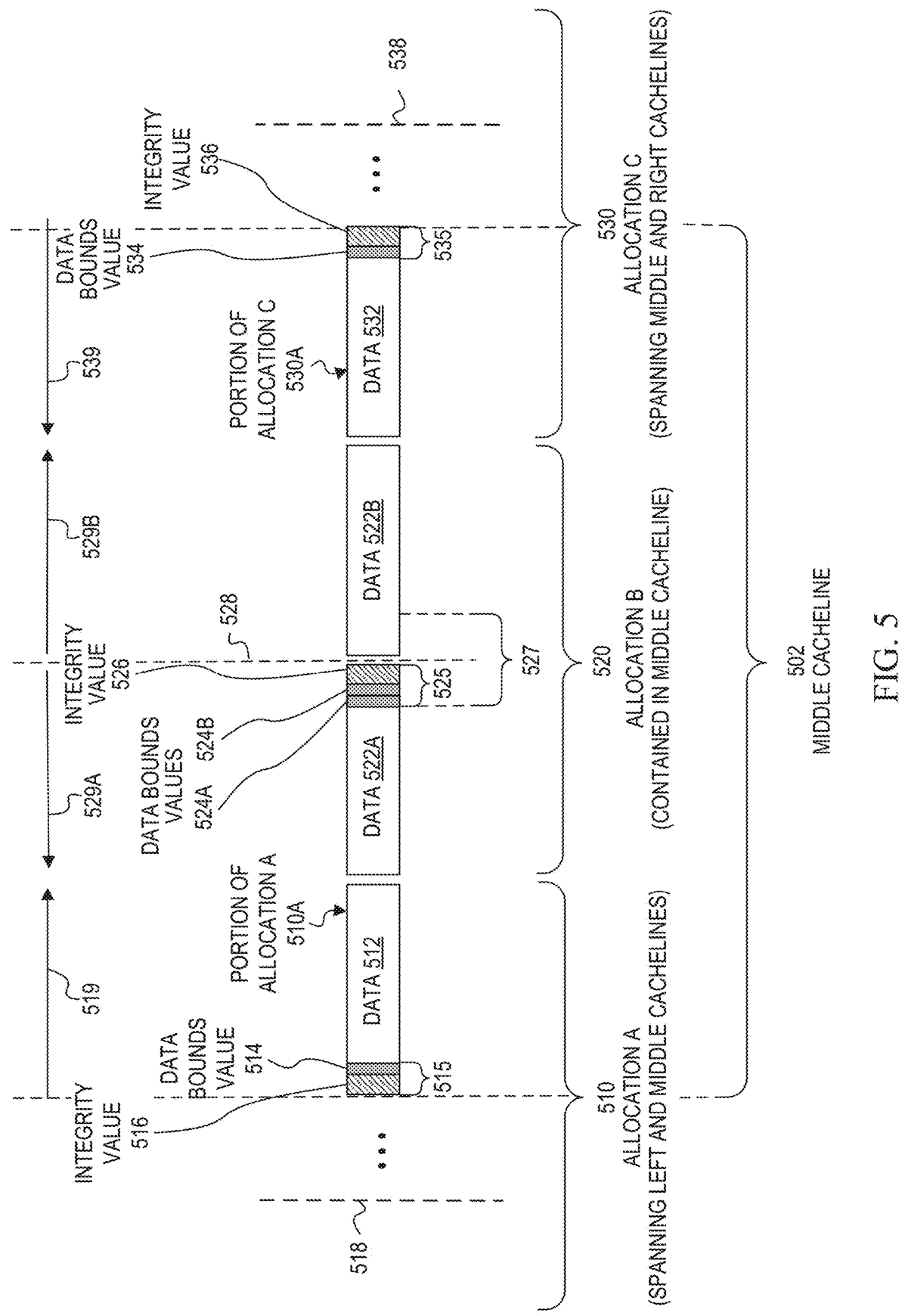
FIG. 5 is a schematic illustration of a single cacheline and three example memory allocations with inline integrity metadata according to an embodiment.

FIG. 5 illustrates three different memory allocations each having inline memory integrity values in various locations within the same cacheline. As shown in FIG. 5, multiple integrity values (and corresponding data bounds value) for multiple different allocations can share a cacheline, where small allocations that fit on the shared cacheline each store an integrity value at the midpoint of a slot to which that allocation is assigned, and other (potentially larger) allocations that extend from other cachelines into the shared cacheline, which contains other small allocations and potentially another large allocation.

In this specific example, FIG. 5 shows a single, middle cacheline 502 shared by three consecutive memory allocations, allocation A 510, allocation B 520, and allocation C 530. Allocation A 510 partially extends into middle cacheline 502 from a cacheline to the left of (or preceding) middle cacheline 502. Allocation A 510 may extend into one or more cachelines to the left of (or preceding) middle cacheline 502. Allocation C 530 partially extends into middle cacheline 502 from a cacheline to the right of (or following) middle cacheline 502. Allocation C 530 may extend into one or more cachelines to the right of (or following) middle cacheline 502. Allocation B 520 is fully contained within middle cacheline 502, between allocation A 510 and allocation C 530.

Allocation A 510 is assigned to a slot having a midpoint 518 that precedes middle cacheline 502. Middle cacheline 502 is the last (or ending) cacheline of two or more cachelines that are each spanned (at least partially) by allocation A 510. Middle cacheline 502 includes data 512 and a metadata region 515 of allocation A 510. The metadata region 515 contains an integrity value 516 and data bounds value 514. Because middle cacheline 502 follows (i.e., comes after) the midpoint 518 of the slot to which allocation A 510 is assigned, the metadata region 515 is aligned with the beginning (the left side) of the middle cacheline 502. Data bounds value 514 represents the size of data 512 that is to be used to compute an integrity value to be compared to stored integrity value 516 during a memory access operation. The size can indicate the extent of the data 512 covered on middle cacheline 502 measured from the beginning of middle cacheline 502, where the data 512 itself extends from the metadata region 515 in the direction away from the midpoint 518 of the slot to which allocation A 510 is assigned, as indicated by arrow 519. Optionally, an integrity value may be computed over data 512 combined (e.g., concatenated) with data bounds value 514.

Allocation C 530 is assigned to a slot having a midpoint 538 that precedes middle cacheline 502. Middle cacheline 502 is the first (or beginning) cacheline of two or more cachelines that are each spanned (at least partially) by allocation C 530. Middle cacheline 502 includes data 532 and a metadata region 535 of allocation A 530. The metadata region 535 contains an integrity value 536 and data bounds value 534. Because middle cacheline 502 precedes (i.e., comes before) the midpoint 538 of the slot to which allocation C 530 is assigned, the metadata region 535 is aligned with the end (the right side) of the middle cacheline 502. Data bounds value 534 represents the size of data 532 that is to be used to compute an integrity value to be compared to stored integrity value 536 during a memory access operation. The size can indicate the extent of the data 532 covered on middle cacheline 502 measured from the end of the middle cacheline 502, where the data 532 itself extends from the metadata region 535 in the direction away from the midpoint 538 of the slot to which allocation C 530 is assigned, as indicated by arrow 539. Optionally, an integrity value may be computed over data 532 combined (e.g., concatenated) with data bounds value 534.

Allocation B 520 shares middle cacheline 502 with allocation A 510 and allocation C 530 and is entirely contained within middle cacheline 502. Allocation B 520 is assigned to a slot having a midpoint 528. Middle cacheline 502 contains all of allocation B 520 including data 522A, metadata region 525, and data 522B. Data 522A and data 522B together form the object of allocation B 520. Metadata region 525 contains integrity value 526 and data bounds values 524A and 524B. Because allocation B 520 is contained within a single cacheline 502, a single integrity value 526 can be computed for all of the contents in allocation B 520, minus the integrity value 526. Specifically, in one embodiment, integrity value 526 may be computed based on data 522A and data 522B. In other embodiments, data bounds value 524A and/or 524B may be combined (e.g., concatenated) with the object (e.g., data 522A and 522B), and the integrity value 526 may be computed based on this combination.

Two data bounds values 524A and 524B may be encoded with respective sizes to represent the size of data 522A preceding the slot midpoint 528 and the size of data 522B following the slot midpoint 528 that are to be used to compute an integrity value to be compared to stored integrity value 526 during a memory access operation. The size represented by data bounds value 524A can indicate the extent of the data 522A covered in cacheline 502 measured from the midpoint 528, where the data 522A itself extends from the metadata region 525 in the direction away from the midpoint 528 as indicated by arrow 529A. The size represented by data bounds value 524B can indicate the extent of the data 522B covered in cacheline 502 measured from the midpoint 528, where the data 522B itself extends from the midpoint 528 in the direction away from the midpoint 528 as indicated by arrow 529B. Optionally, the data bounds value 524A and/or 524B may be combined (e.g., concatenated) with data 522A and 522B to compute the integrity value.

Because allocation B 520 is entirely contained within middle cacheline 502, a single integrity value may be used for the allocation and it may be stored at the midpoint in any suitable manner. A midpoint metadata region 527 illustrates a possible area around midpoint 528 where data bounds value 524A and 524B and integrity value 526 may be stored. For example, the integrity value 526 may be stored entirely on the left side of (or before) the midpoint 528 (as shown in FIG. 5), entirely on the right side of (or after) the midpoint 528, or partially on each side of the midpoint 528.

Figure 6:
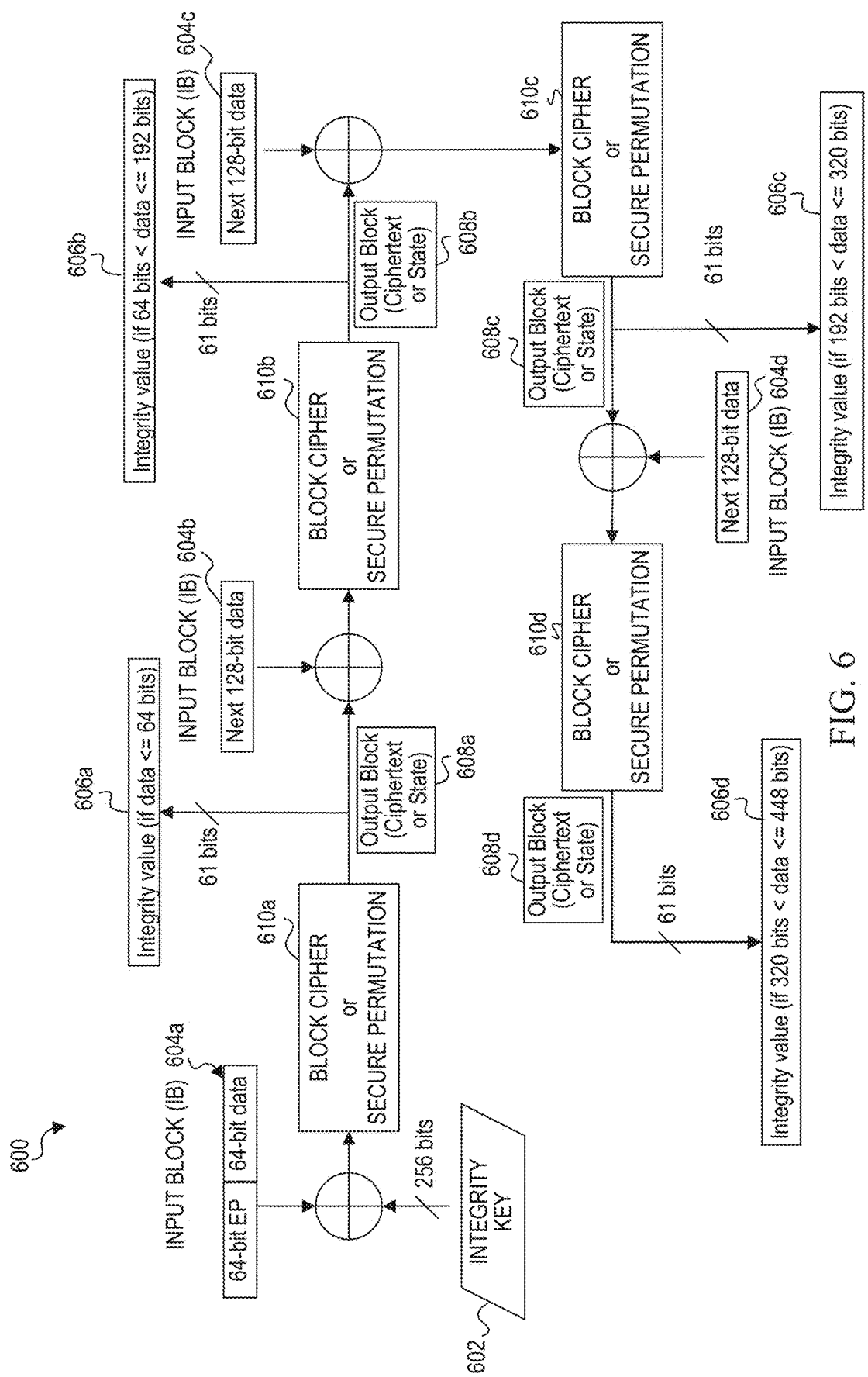
FIG. 6 is a block diagram illustrating an encryption technique for generating an integrity value according to an embodiment.

FIG. 6 is a block diagram illustrating a possible cryptographic technique 600 for generating an integrity value according to an embodiment. Cryptographic technique 600 may be implemented in one or more embodiments for performing a cryptographic algorithm on variable length data in a cacheline to produce an integrity value. The cryptographic algorithm can use block ciphers or cryptographically secure permutations to map variable sized data from a cacheline into a fixed-length value, or integrity value. In one or more embodiments, an integrity circuit, e.g., integrity circuit 114, 333, can be configured to perform the cryptographic technique 600.

Cryptographic technique 600 can be configured to produce an integrity value having any desirable length (e.g., 8-bits or more, 16-bits or more, 32-bits or more, 64-bits or more, etc.). In some cases, a length of an integrity value to be used for embodiments herein may be modified based, at least in part, on the size of cachelines used by the underlying architecture. For example, an architecture using 16B cachelines may implement embodiments herein that use integrity values having a smaller size to minimize the space required for storing the integrity metadata. For illustration purposes, cryptographic technique 600 will be discussed with reference to a system using 64B cachelines and the cryptographic technique 600 producing 64-bit integrity values. Thus, for a 512-bit cacheline (i.e., 64B), 64 bits of the 512 bits are used to store the integrity value. Computing a 64-bit integrity value can avoid most split line issues and provides strong integrity protection.

For an allocation that is 448 bits (i.e., 56B) or larger, and the 448 bits are contained in a single cacheline, one integrity value can be stored in that cacheline. For smaller allocations entirely contained in a cacheline, and/or for a beginning or end of an allocation that only fills a portion of the cacheline, the cacheline may have more than one integrity value if other allocations or portions of other allocations share the cacheline. For a cacheline containing at least a portion of an allocation, an integrity value is computed on 64-bit data and, at most, on 448-bit data, depending on how many data bits are stored in the cacheline.

In at least one embodiment, cryptographic technique 600 can include four block ciphers 610a, 610b, 610c, and 610d. Any suitable block cipher or cryptographically secure permutations may be implemented in cryptographic technique 600. For example, 257-bit Subterranean (of Subterranean 2.0 cipher suite) may be used, as well as other sizes (e.g., 32-bit, 64-bit, 128-bit, 320-bit, 384-bit etc.) depending on the block size used to identify a data in a cacheline for integrity protection computation and checks. Additionally, embodiments of cryptographic technique 600 may further be adapted to accommodate various sizes and/or types of a block cipher (e.g., 8-bit, 16-bit, 32-bit, 64-bit, 128-bit, 329-bit, 384-bit, etc. using Advanced Encryption Standard (AES), Simon, Speck, tweakable K-cipher, PRINCE, Gimli, Xoodoo, Ascon or any other block cipher).

The cryptographic technique 600 can use variable size input data (e.g., from a cacheline) to produce a cryptographic output. The cryptographic output may be generated by selectively using cryptographic algorithms (e.g., block ciphers), depending on the length of the input data, and generating a hash, which cannot be transformed into the original data. In the example configuration shown in FIG. 6, each block cipher encrypts a 128-bit block of input data and produces a 128-bit block of ciphertext. If there are additional blocks of input data, then the outputted 128-bit block of ciphertext and the next 128-bit block of input data can be combined and encrypted by the next block cipher in the pipeline. This can continue until all blocks of input data have been inputted to one of the block ciphers. In another example configuration shown in FIG. 6, each cryptographically secure permutation absorbs a 128-bit block of input data and produces an updated state. If there are additional blocks of input data, then the updated state and the next 128-bit block of input data can be combined and another permutation can be performed by the next permutation circuit in the pipeline. This can continue until all blocks of input data have been inputted to one of the permutation circuit.

Although the cryptographic technique 600 can be implemented in a wide variety of use cases, it may also be implemented in one or more embodiments herein for using inline integrity metadata in memory. Accordingly, the following detailed description of cryptographic technique 600 will reference its use related to one or more embodiments herein.

Input data for the block ciphers may be obtained from some or all of the data in a cacheline associated with a memory access operation. All of the data that is associated with an allocation targeted by the memory access operation is identified using a data bounds value stored in a metadata region of the cacheline. The identified data (which may include some or all of the data in the cacheline) can be used as input data in the cryptographic technique to produce an integrity value.

A first input block 604a for the first block cipher 610a may include a 64-bit encoded pointer (e.g., similar to encoded pointers 180, 280, 310) concatenated with 64 bits of the input data. The encoded pointer (EP) may include an encoded (and at least partially encrypted) base memory address of the memory allocation. An integrity key 602 and the first input block 604a may be combined (e.g., using a suitable operation such as XOR and/or other logical operations) and provided as input to the first block cipher or the first permutation 610a. The first block cipher 610a encrypts the input and produces a first 128-bit ciphertext output block 608a. In case of permutation, the first permutation 610a absorbs the input into its initial state and produces an updated (first) state output block 608a. If the input data from the cacheline includes only 64 bits or less, then the first ciphertext or state output block 608a can be truncated to provide an integrity value 606a, and the cryptographic process can end. The integrity value 606a can be used to validate 64-bit allocations.

If the input data from the cacheline is greater than 64 bits, then the first ciphertext output block 608a and a second input block 604b of the next 128 bits of input data can be combined (e.g., using a suitable operation such as XOR and/or other logical operations) and provided as input to the second block cipher or to the second permutation 610b. The second block cipher 610b encrypts the input and produces a second 128-bit ciphertext output block 608b. In case of permutation, the second permutation 610b absorbs the 128-bit input into its first output state and produces an updated (second) state output block 608b. If the input data from the cacheline includes more than 64 bits and less than or equal to 192 bits, then the second ciphertext or state output block 608b can be truncated to provide an integrity value 606b, and the cryptographic process can end. The integrity value 606b can be used to validate data in the cacheline that is greater than 64 bits and less than or equal to 192 bits.

If the input data from the cacheline is greater than 192 bits, then the second ciphertext output block 608b and a third input block 604c of the next 128 bits of input data can be combined (e.g., using a suitable operation such as XOR and/or other logical operations) and provided as input to the third block cipher 610c. The third block cipher 610c encrypts the input and produces a third 128-bit ciphertext output block 608c. In case of permutation, the third permutation 610c absorbs the 128-bit input into its second output state and produces an updated (third) state output block 608c. If the input data from the cacheline includes more than 192 bits and less than or equal to 320 bits, then the third ciphertext or state output block 608c can be truncated to provide an integrity value 606c, and the cryptographic process can end. The integrity value 606c can be used to validate data in the cacheline that is greater than 192 bits and less than or equal to 320 bits.

If the input data from the cacheline is greater than 320 bits, then the third ciphertext output block 608c and a fourth input block 604d of the next 128 bits of input data can be combined (e.g., using a suitable operation such as XOR and/or other logical operations) and provided as input to the fourth block cipher 610d. The fourth block cipher 610d encrypts the input and produces a fourth 128-bit ciphertext output block 608d. In case of permutation, the fourth permutation 610d absorbs the 128-bit input into its third output state and produces an updated (fourth) state output block 608d. The fourth ciphertext or state output block 608d can be truncated to provide an integrity value 606d, and the cryptographic process can end. The integrity value 606d can be used to validate data in the cacheline that is greater than 320 bits and less than or equal to 448 bits, which are associated with the same encoded pointer.

In this example encryption technique, one of four integrity values (e.g., 606a, 606b, 606c, 606d) can be generated based on a data bounds value in the metadata region of the cacheline. The integrity value is selectively generated based on the size of data in the cacheline that is associated with an allocation targeted by a memory access operation, and the size of the data is indicated by the data bounds value in the metadata region of the cacheline. It should also be noted that, instead of using a 64-bit integrity value, a smaller number of bits may be selected to accommodate the data bounds value up to 64 bits. Accordingly, for a 3-bit data bounds value, the 61 bits may be selected for the integrity value. It should be further noted that other approaches could include using one integrity value covering a fixed data block size.

Figure 7C:
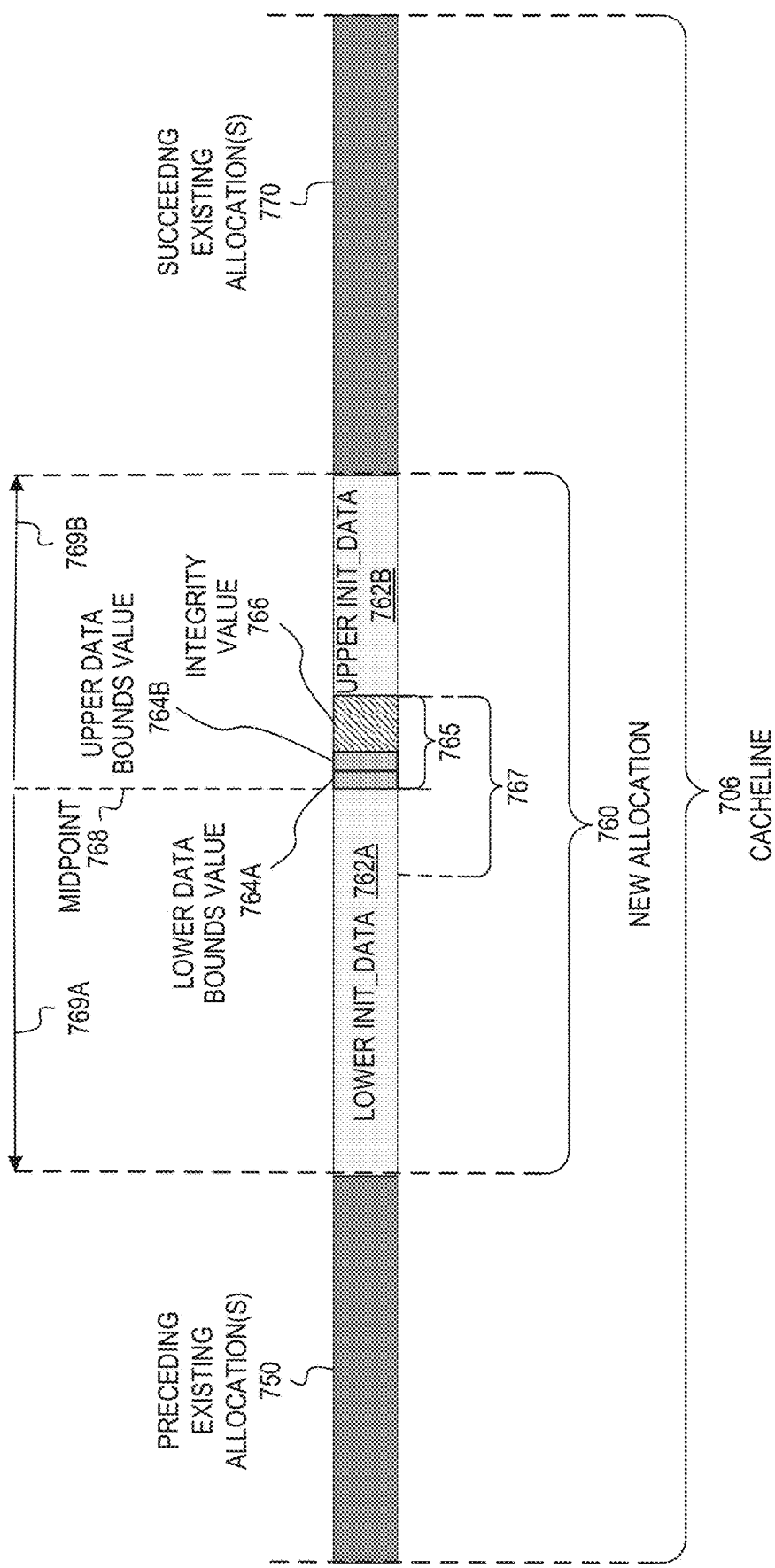

Turning to FIGS. 7A-7C, FIGS. 7A-7C illustrate example cachelines with inline integrity metadata at different locations within the cachelines, according to at least one embodiment. When a memory allocation operation is performed according to one or more embodiments, the newly allocated memory may be initialized to prevent a first read operation from getting a false negative during an integrity check of uninitialized memory, or to prevent a first write operation from getting a false negative during an integrity check when the memory is loaded to perform a modification or replacement for the write.

In one or more embodiments, a trusted entity may be used to initialize the data and the integrity values upon a new memory allocation to ensure that legitimate access to the newly allocated memory does not result in an integrity value mismatch during an integrity check. This can be done by an instruction that writes a specific data and integrity value combination to a particular cacheline. One or more embodiments provide that integrity values are cryptographically bound to an encoded pointer of the relevant memory allocation. In one example of such embodiments, an encoded pointer can be provided as input for the instruction. In at least some embodiments, the instruction may be available in user space so that it can be used by the memory manager, and non-authorized code in the user space can be prevented from initializing memory with the instruction via, for example, the integrity key for generating integrity values or a secret value in a register to authorize the instruction.

The instruction may be configured to initialize cachelines in an appropriate format depending on the particular allocation as shown in FIGS. 7A-7C. Based on a size of a memory allocation and the base address of the allocation, for each cacheline of the allocation, a metadata region containing an integrity value and a data bounds value for that cacheline may be aligned with the end of the cacheline if it contains some of the data from the allocation and the allocation spans one or more subsequent cachelines (e.g., FIG. 7A). For a cacheline containing some of the data from the allocation and the allocation spans one or more prior cacheline, a metadata region for that cacheline may be aligned with the beginning of the cacheline. For a cacheline containing an entire allocation assigned to a slot that is equal to or less than the size of the cacheline, a metadata region for that cacheline may be located within the cacheline at a midpoint of the slot to which the allocation is assigned (e.g., FIG. 7C). In the scenario of FIG. 7C, the slot may be referred to as a "sub-cacheline sized allocation slot" or "sub-cacheline slot."

In one or more embodiments, an instruction set architecture (ISA) may be extended to provide an instruction to initialize a memory allocation with specific initialization values for the data and integrity metadata corresponding to each cacheline spanned by the allocation. An example instruction for initializing a memory allocation can be defined as CCINIT, which can be executed for each cacheline in a memory allocation. The CCINIT instruction can specify an encoded address of a cacheline to be initialized. The CCINIT instruction can also specify the size (e.g., in bytes) of the data within the cacheline to be integrity-protected (which can be the data that is within the cacheline and that is part of the allocation, rather than data that is within the same cacheline but part of another allocation). The data size information enables correct initialization in the beginning cacheline and the ending cacheline of an allocation, as the edges of an allocation may not fill out the entire first (or beginning) and last cacheline of the allocation and thus, the allocation can potentially share the cacheline with one or more other allocations.

An example format for a CCINIT instruction could be defined with two operands as follows:

CCINIT dst_reg, size_reg dst_reg: Destination register operand (e.g., RDX) that holds the encoded pointer to the first byte in the allocation (or portion of the allocation) that is in a cacheline and is to be initialized size_reg: Register operand (e.g., RAX or RCX) that holds the size of the data (in bytes) within the cacheline to be integrity-protected The registers may be implicit, e.g., RDX for the encoded pointer and RCX for the data size. The encoded pointer may be similar to the encoded pointers previously described herein (e.g., 180, 280, 310), and may be decoded (including decrypting any encrypted portions) to obtain the linear address of the cacheline to be initialized.

Any suitable initialization data can be used to initialize the data and integrity metadata in the cachelines of an allocation. During initialization operations, the data portion of a cacheline (e.g., init_data 712, 732, 762A-762B in FIGS. 7A, 7B, 7C, respectively) can be set to a fixed pattern including, but not necessarily limited to all zeros, all ones, a randomly-generated pattern, or a deterministic pattern. Integrity metadata related to the initialized cacheline can be stored in the metadata region of the cacheline (e.g., metadata regions 715, 735, 765 in FIGS. 7A, 7B, 7C, respectively). The integrity metadata can include a single data bounds value if the associated slot is greater in size than the cacheline, and two data bounds values (upper and lower) if the associated slot is a sub-cacheline slot. The number of bits used to encode a data bounds value can depend on the data block granularity (e.g., 2 bits to encode on a 16B granularity, 3 bits to encode on an 8B granularity, etc.).

The integrity value for the initialized cacheline may be generated using certain parameters as inputs, as previously described with respect to the cryptographic technique in FIG. 6. For a cacheline of a new memory allocation, an integrity value can be generated using an integrity key, initialization data stored in the cacheline based on the data bounds value(s), encoded size of initialization data to be integrity-protected in the cacheline (e.g., 3-bit data bounds value), and an encoded pointer to the first byte in the allocation (or portion of the allocation) that is in the cacheline and that is to be initialized.

The layout of the initialization data and metadata depends on the cacheline location with respect to the slot midpoint. Unless the new allocation occupies the entirety of a cacheline, it needs to be combined with the existing data in the cacheline, which may belong to other allocations. Various examples of this scenario are shown in FIGS. 7A-7C. The new instruction (e.g., CCINIT) can read the old cacheline data into a buffer, update the new portion (corresponding to the new allocation) with the initialization data, and write the updated cacheline data back to cache, and ultimately, to memory.

With reference to FIGS. 7A-7C, various examples of the layout of initialization data when a new allocation is combined with an existing allocation(s) in the same cacheline are shown. In FIG. 7A, a new allocation 710 shares a cacheline 701 with an existing allocation(s) 720. Note that, for simplicity, inline integrity metadata for existing allocation(s) 720 is not shown in FIG. 7A. The new allocation 710 is assigned to a slot having a midpoint 718. Cacheline 701 is the first (or beginning) cacheline of two or more cachelines that are each occupied (at least partially) by the new allocation 710.

When a memory allocation operation allocates the new allocation 710, an instruction such as CCINIT may be executed for each cacheline occupied (at least partially) by the new allocation 710. A CCINIT instruction for cacheline 701 can store initialization data 712 (e.g., all zeroes, all ones, randomly generated pattern, deterministic pattern, etc.) in cacheline 701 based on the data bounds value in the size_reg operand. The data bounds value indicates the size of the data to be integrity-protected in cacheline 701, which extends away from the midpoint 718 in the (left) direction as indicated by arrow 719. An integrity value 716 is computed based on the relevant parameters such as an integrity key (e.g., 602), initialization data 712, data bounds value (e.g., from size_reg operand), and an encoded pointer (e.g., from dst_reg operand). The encoded pointer can point to the first byte of the initialization data, which is the first byte in the allocation (or portion of the allocation) that is in the cacheline and that is to be initialized. The computed integrity value 716 and the data bounds value 714 (e.g., from size_reg) can be stored in a metadata region 715 aligned with the slot midpoint 718.

In FIG. 7B, a new allocation 730 shares a cacheline 703 with an existing allocation(s) 740. Note that, for simplicity, inline integrity metadata for existing allocation(s) 740 is not shown in FIG. 7B. The new allocation 730 is assigned to a slot having a midpoint 738. Cacheline 703 is the last (or ending) cacheline of two or more cachelines that are each occupied (at least partially) by the new allocation 730.

When a memory allocation operation allocates the new allocation 730, an instruction such as CCINIT may be executed for each cacheline occupied (at least partially) by the new allocation 730. A CCINIT instruction for cacheline 703 can store initialization data 732 (e.g., all zeroes, all ones, randomly generated pattern, deterministic pattern, etc.) in cacheline 703 based on the data bounds value in the size_reg operand. The data bounds value indicates the size of the data to be integrity-protected in cacheline 703, which extends away from the midpoint 738 in the (right) direction as indicated by arrow 739. An integrity value 736 is computed based on the relevant parameters such as an integrity key (e.g., 602), initialization data 732, data bounds value (e.g., from size_reg operand), and an encoded pointer (e.g., from dst_reg operand). The encoded pointer can point to the first byte in the allocation (or portion of the allocation) that is contained in the cacheline and that is to be initialized. The computed integrity value 736 and the data bounds value 734 can be stored in a metadata region 735 aligned with the slot midpoint 738.

In FIG. 7C, a new allocation 760 shares a cacheline 706 with a preceding existing allocation(s) 750 and a succeeding existing allocation(s) 770. Note that, for simplicity, inline integrity metadata for existing allocation(s) 750 and 770 are not shown in FIG. 7C. The new allocation 760 is assigned to a sub-cacheline slot having a midpoint 768. The entire new allocation 760 (and the slot to which it is assigned) fits withing cacheline 706.

When a memory allocation operation allocates the new allocation 760, an instruction such as CCINIT may be executed for the cacheline 706, which is occupied by the entire new allocation 760, in addition to one or more existing allocations 750 and 770. In one embodiment, a CCINIT instruction for cacheline 706 can store lower initialization data 762A and upper initialization data 762B (e.g., all zeroes, all ones, randomly generated pattern, deterministic pattern, etc.) in cacheline 706 based on the data bounds value in the size_reg operand and an encoded pointer in the dst_reg operand. In this scenario, the value in the size_reg may indicate an upper data bounds value that can be stored as upper data bounds value 764B of metadata region 765. A calculation may be performed based on the encoded pointer in the dst_reg operand and a midpoint address to determine a lower data bounds value and store it as lower data bounds value 764A in metadata region 765. The lower data bounds value 764A can indicate the size of the lower data (before the midpoint) to be integrity-protected in cacheline 706, which extends away from the midpoint 768 in the (left) direction as indicated by arrow 769A. The upper data bounds value 764B can indicate the size of the upper data (after the midpoint) to be integrity-protected in cacheline 706, which extends away from the midpoint 768 in the (right) direction as indicated by arrow 769B. An integrity value 766 is computed based on the relevant parameters such as an integrity key (e.g., 602), lower and upper initialization data 762A and 762B, lower and upper data bounds values 764A and 764B, and an encoded pointer (e.g., from dst_reg operand) to the first byte in the allocation (or portion of the allocation) that is contained in the cacheline and that is to be initialized. The computed integrity value 766 and the upper and lower data bounds values 764A and 764B can be stored in the metadata region 765 and aligned with the slot midpoint 738. It should be noted that the integrity metadata can be stored on either side of the midpoint 768, or may be stored partially on each side of the midpoint. In an alternative embodiment, the size_reg can indicate a size of the entire allocation to be initialized. In this embodiment, the upper data bounds value 764B can be calculated based on the encoded pointer to the allocation, a midpoint address, and the size of the entire allocation.

It should be appreciated that other instructions to perform initialization of new memory allocations with inline integrity metadata are included within the scope of this application. One example variation includes a special MOVDIR family of instructions that could be used with an encoded pointer to the destination (e.g., the address of the first byte in the allocation or portion of the allocation that is in the cacheline). The encoded pointer may be similar to encoded pointers previously described herein (e.g., 180, 280, 310) in which at least a portion of the linear address could be encrypted. In addition, the initialization data may be specified in a register identified in a register operand of the instruction. Other instructions in the family can include instructions such as MOVDIR56, MOVDIR40, MOVDIR24, and MOVDIR8, for example, where the metadata in the cacheline consumes 8B and is automatically set by the processor depending on the instruction and the address offset within a cacheline. Data written to the cacheline is reduced to what actually fits on the cacheline considering the space consumed by the integrity metadata (e.g., 56B of data and 8B of integrity metadata, 40B of data and 8B of integrity metadata, etc.). Variants of the MOVDIR instruction can avoid executing a read-for-ownership (RFO) instruction and directly write the integrity value, as all the data is available at the time of instruction execution. With these instructions, the processor directly writes the data and directly writes the integrity value without requiring a read operation first. In addition, non-related allocations on the same cacheline contain their own independent integrity values and are not affected by the direct write.

An optimized instruction for string allocations may also be provided to initialize a fixed number of aligned blocks (e.g., 8B-aligned, 16B-aligned, etc.) that may stretch over multiple cachelines. For example, a "REP CCINIT" instruction with implicit operands may be used. A first implicit operand can include an RDI that holds the destination address of a first granule to initialize (e.g., 8B-aligned, 16B-aligned, etc.). A second implicit operand can include RCX to specify the total number of granules to initialize. In operation, the REP CCINIT instruction identifies all cachelines and sub-cacheline regions to initialize based on its input operands. The instruction initializes each of the regions appropriately, as described for example with respect to the CCINIT instruction. More details related to the execution of any of the above instructions on a core of a processor are provided in FIGS. 15A-15B.

Figure 8:
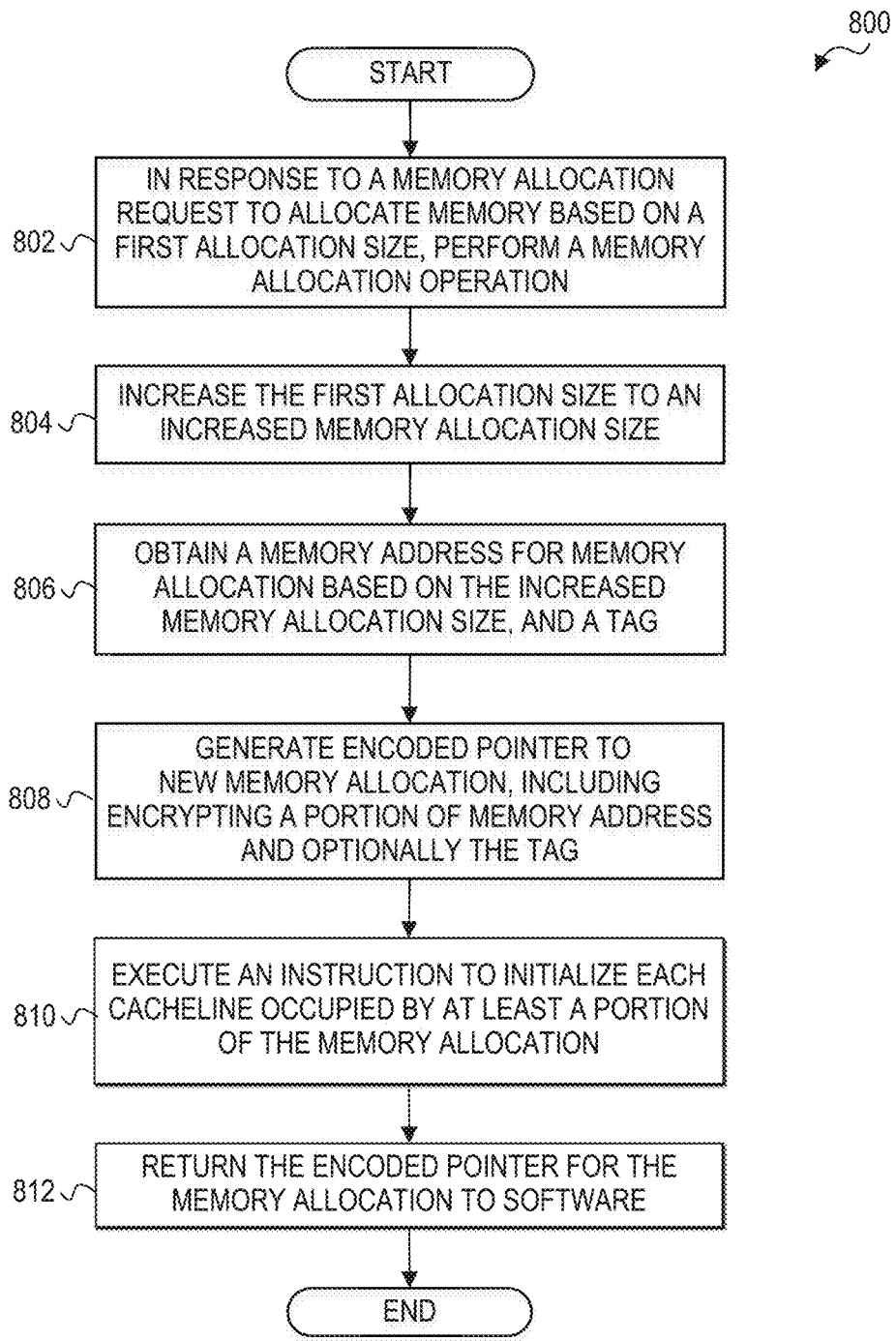
FIG. 8 is a high level flow diagram of an example process of performing a memory allocation operation according to at least one embodiment.

Turning to FIG. 8, FIG. 8 is a high level flow diagram of an example process 800 of performing a memory allocation operation using inline integrity metadata according to at least one embodiment. For ease of illustration, process 800 is described with reference to memory allocation 400 of FIG. 4 and/or memory allocation 500 of FIG. 5. In an example, at least some of the operations shown in process 800 may be performed in software (e.g., by application 170 invoking memory allocator 165), which may be executed by processor circuitry 110, 330. One or more of the operations shown in process 800 may be performed in hardware (e.g., processor circuitry 110, 330 and/or memory controller circuitry 120, 334).

At 802, a memory allocation request to allocate memory based on a first (requested) allocation size may correspond to, for example, instructions in a user space application executed at run-time (e.g., C malloc, alloc, new, etc.), instructions compiled at compile time that need static memory (e.g., variables declaration, etc.), or the initiation of loading process by a loader (e.g., implicit memory allocation). In response to the memory allocation request, various instructions or logic may be executed to perform a memory allocation operation, which can include one or more operations, at least some of which are shown in process 800 and will be further described with reference to the process. In one example, the instructions or logic to perform the memory allocation may be included in a privileged component, which may be part of an operating system, a trusted execution environment (TEE), a virtual machine, processor circuitry (e.g., 110, 330), a co-processor, or any other suitable hardware, firmware, or software in a computing system (e.g., 100) or securely connected to the computing system.

At 804, the requested memory allocation size is increased by a number of bytes sufficient to accommodate inline integrity metadata (e.g., integrity value and data bounds value(s)) to be stored in one or more metadata regions of the memory allocation (e.g., metadata regions 415, 425, 435, 445, 455, and 465 of memory allocation 400; metadata region 525 of memory allocation 520), where the number of metadata regions and potentially the size of the integrity metadata to be stored, depends on the number of cachelines occupied (at least partially) by the allocation. For an allocation assigned to a slot spanning multiple cachelines (e.g., allocation 400 and cachelines 401-406), one metadata region in each cacheline associated with the allocation contains integrity metadata that may include an integrity value and one data bounds value. It should be noted that, depending on the slot to which a small allocation is assigned, it is possible for the allocation to partially occupy two cachelines (e.g., 48B-allocation 366 in FIG. 3). In allocations that are assigned to a sub-cacheline slot such that the allocation is contained within a single cacheline (e.g., allocation B 520 in cacheline 502), the metadata region in the cacheline may include an integrity value and both an upper data bounds value and a lower data bounds value. Optionally, other metadata may be included, such as allocation bounds information for example. The size of the memory allocation request may be increased by any number of bytes to accommodate the total size of all integrity metadata associated with the allocation that is stored in each cacheline of one or more cachelines of the allocation.

At 806, a memory address (e.g., a linear address) for the requested memory allocation is obtained in the memory circuitry based on the increased memory allocation size. In at least one embodiment, the memory allocation operation may be performed as previously described herein, where the memory allocation is assigned to a power of two slot. Optionally, a tag is obtained for the memory allocation.

At 808, a pointer to the allocation is generated, for example, by encoding it with the power of two size, as shown in FIGS. 1-3, among others. Optionally, tag data is also encoded in the pointer. In one or more embodiments, at least a portion of the memory address, such as the immutable address bits, may be encrypted. Other metadata, such as the tag, may also be encrypted.

In one or more embodiments, the newly allocated memory may be initialized to prevent a first read from getting a false negative during an integrity check of uninitialized memory, or a first write operation getting a false negative during an integrity check when the memory is loaded to perform the modification or replacement. This is particularly desirable if integrity checks are performed for write operations. Accordingly, at 810, an instruction (e.g., CCINIT, MOVDIR #, REP CCINIT, etc.) may be executed for each cacheline occupied by at least a portion of the memory allocation. When the instruction is executed for a particular cacheline, the instruction causes the data portion and the metadata region associated with the allocation to be initialized in the cacheline, which may be written to memory. It should be noted however, that the use of an instruction to initialize newly allocated memory is optional, as uninitialized memory could be handled using other mechanisms.

At 812, the encoded pointer to the initialized memory allocation can be returned to the software application.

Figure 9A:
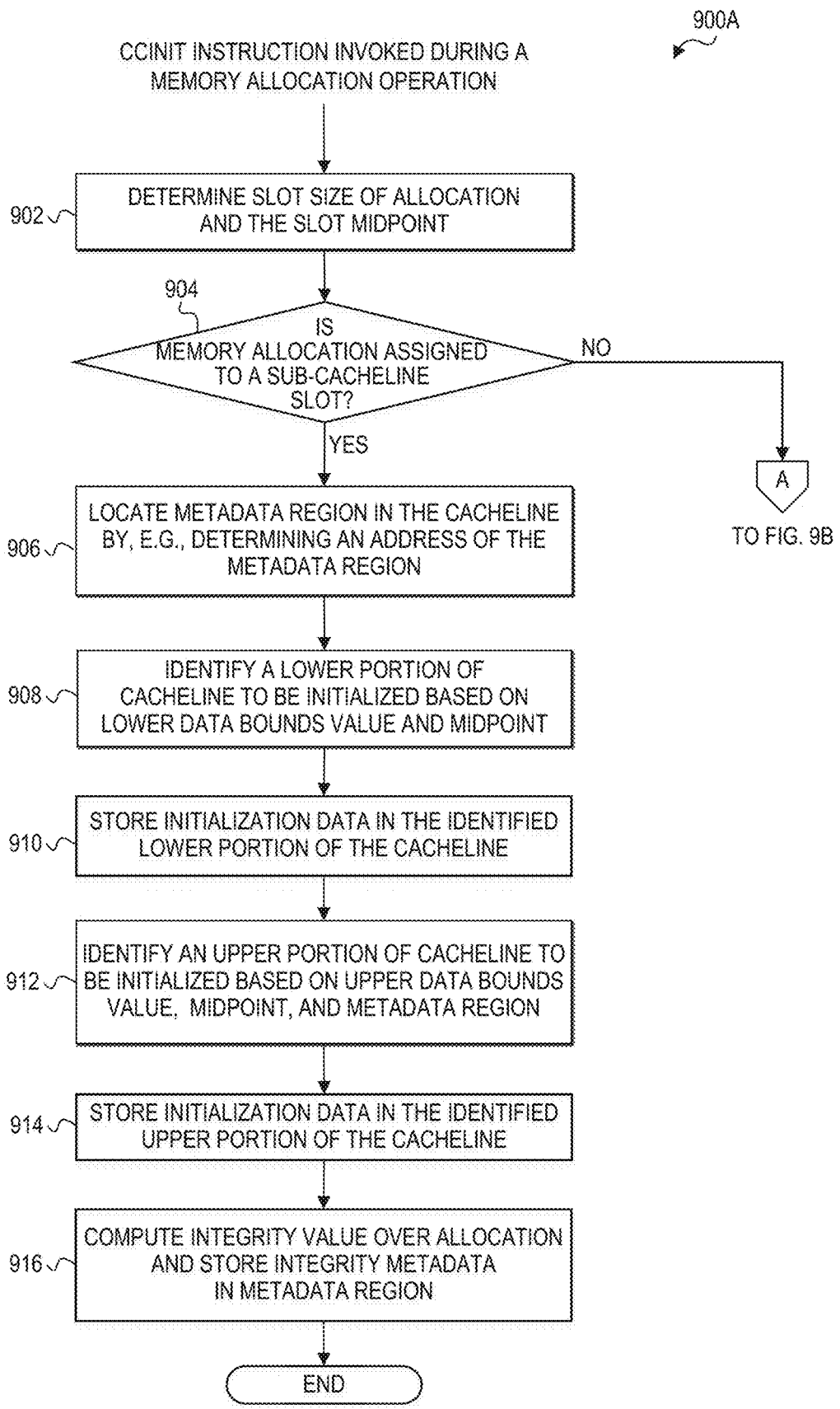
FIGS. 9A-9B are high level flow diagrams of an example instruction for initializing a new memory allocation according to at least one embodiment.
Figure 9B:
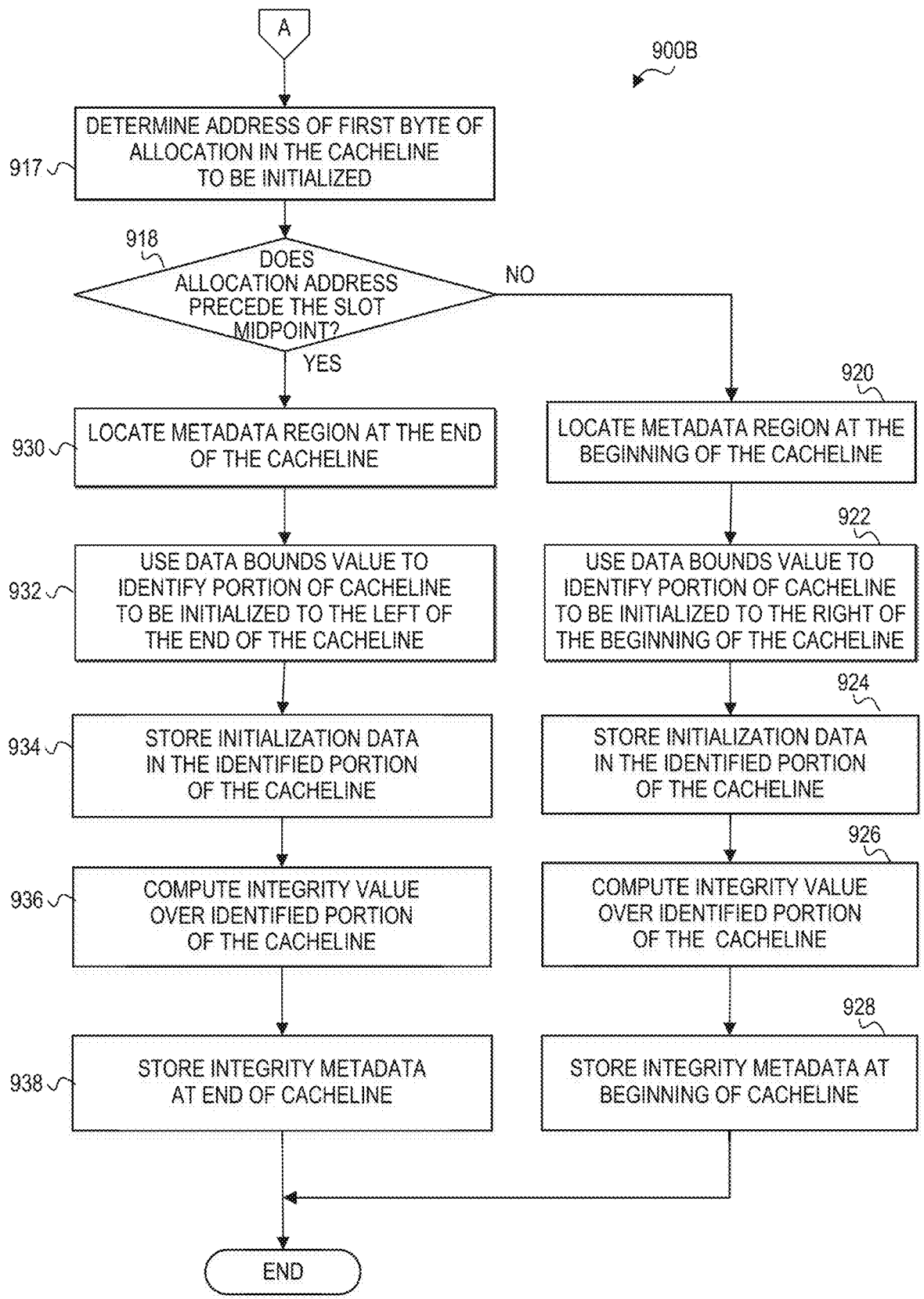

Turning to FIGS. 9A-9B, FIGS. 9A-9B are high level flow diagrams of an example process 900A-900B that may be associated with an example instruction (e.g., CCINIT or similar memory initialization instruction) to initialize a new memory allocation using inline integrity metadata according to at least one embodiment. In one example, process 900A-900B illustrates example operations that may be performed for an instruction executed at 810 of FIG. 8. Portions of the process 900A-900B may be executed by hardware, firmware, and/or software of a computing device. In an example, one or more of the operations shown in process 900A-900B may be performed in hardware (e.g., processor circuitry 110, 330, integrity circuit 114, 333, and/or memory controller circuitry 120, 334).

The CCINIT instruction may be called to initialize a data region and a metadata region of each cacheline occupied by the memory allocation. For memory allocations that occupy multiple cachelines, the memory allocation may share each of its beginning and ending cachelines with one or more other allocations, or may occupy the entire beginning and/or ending cacheline. For memory allocations that occupy a single cacheline, the memory allocation may occupy a portion of the cacheline or the entire cacheline. The CCINIT instruction may include a first operand (e.g., dst_reg) that indicates an encoded pointer to the first byte in the allocation (or portion of the allocation) that is in a cacheline and is to be initialized and a second operand (e.g., size_reg) that specifies the size of the data to be stored in the cacheline or, for allocations assigned to sub-cacheline slots, the size of the data to be stored after the midpoint.

At 902, a midpoint of the slot to which the memory allocation is assigned may be calculated, as previously described herein. The encoded pointer may be used to calculate the midpoint. At 904, a determination is made as to whether the allocation is assigned to a sub-cacheline slot such that the allocation occupies only one cacheline.

If the allocation is assigned to a sub-cacheline slot and therefore, occupies only one cacheline, then at 906, an address for the metadata region in the cacheline is determined based on the slot midpoint. If the integrity metadata is stored before the midpoint (to the left of the midpoint), then the size of the integrity metadata can be used with the slot midpoint to calculate the address for the metadata region. Otherwise, if the integrity metadata is stored after the midpoint, then a midpoint address can be determined as the address for the metadata region.

A lower data bounds value can be determined based on the encoded pointer in the first operand (e.g., dst_reg) and a midpoint of a slot to which the allocation is assigned. If the second operand (e.g., size_reg) indicates the size of the data in the cacheline after the midpoint to be integrity-protected, then the upper data bounds value can be determined from the data size value specified in the second operand (e.g., size_reg). If the second operand (e.g., size_reg) indicates the total size of the data in the cacheline to be integrity-protected, then the upper data bounds value can be determined from the data size value specified in the second operand, the address encoded in the encoded pointer of the first operand (e.g., dst_reg), and the slot midpoint.

At 908, a lower portion of the cacheline to be initialized can be identified based on the midpoint and the lower data bounds value, which indicates how far the data of the allocation extends in the cacheline before (to the left of) the midpoint. The memory address of the first byte of the allocation in the cacheline can be obtained by decoding the encoded pointer in the first operand (e.g., dst_reg). In one example, the memory address of the first byte in the cacheline to be initialized can be obtained by decoding the encoded pointer in the first operand (e.g., dst_reg). The memory address of the first byte in the cacheline to be initialized can also be calculated using the lower data bounds value (e.g., size of the lower data to be initialized) and the slot midpoint address. At 910, initialization data can be stored in the identified lower portion of the cacheline (to the left of the midpoint).

At 912, an upper portion of the cacheline to be initialized is identified based on at least the midpoint and the upper data bounds value, which indicates how far the data of the allocation extends in the cacheline after (to the right of) the midpoint. In one example, the memory address of the first byte in the upper portion of the cacheline to be initialized can be calculated using the midpoint address and the size of the integrity metadata (or metadata region) if the metadata region is located to the right of the midpoint. If the metadata region is located to the left of the midpoint, then the first byte of the upper portion to be initialized is the address at the midpoint. At 914, initialization data can be stored in the identified upper portion of the cacheline to be initialized.

At 916, an integrity value can be computed for the lower portion and upper portion of the cacheline, which both contain initialization data. The lower and upper portions may be concatenated (by skipping over the metadata region) to compute the integrity value in one embodiment. The integrity value may be computed using any suitable cryptographic technique including, but not necessarily limited to, the cryptographic technique 600 of FIG. 6. In one or more embodiments, the upper and lower data bounds values may be included in the integrity value by, for example, being added to the end of the integrity value as in cryptographic technique 600, or by including the upper and lower data bounds values as part of the input to the cryptographic technique. The computed integrity value, the upper data bounds value, and the lower data bounds value can be stored in the metadata region of the cacheline. The metadata region may be aligned with the slot midpoint and may be located entirely on either side of the midpoint or partially on each side of the midpoint. Appropriate adjustments can be made for storing initialization data and integrity metadata depending on where the metadata region is located.

With reference again to 904, if the allocation is determined to occupy more than one cacheline because the slot to which it is assigned is larger than a cacheline (even if the allocation itself is not larger than a cacheline), then at 917 of FIG. 9B, the address of the first byte of the allocation (or portion of the allocation) in the cacheline is determined. In one example, the address of the first byte of the allocation (or portion of the allocation) that is in the cacheline is determined based on the encoded pointer in the first operand (e.g., dst_reg). The encoded pointer can be decoded (including decrypting the encrypted portions of the pointer) into a linear address of the first byte of the allocation (or portion of the allocation) that is in the cacheline.

At 918, if it is determined that the address of the first byte of the allocation (or portion of the allocation) that is in cacheline does not precede the slot midpoint (i.e., it follows the midpoint), then at 920, the metadata region in the cacheline is located at the beginning (e.g., first byte) of the cacheline, at the cacheline address. In this scenario, the cacheline address corresponds to the address of the first byte of the allocation (or portion of the allocation) that is in the cacheline.

At 922, a portion of the cacheline to be initialized is identified. The portion of the cacheline to be initialized may include some or all of the cacheline minus the metadata region. In one example, the memory address of the first byte in the cacheline to be initialized can be calculated using the cacheline address and the size of the integrity metadata (or metadata region). The cacheline address (i.e., the beginning of the cacheline) and the data bounds value, which indicates how far the data of the allocation extends in the cacheline after (to the right of) the cacheline address, can be used to calculate an end address for the initialization. At 924, initialization data can be stored in the identified portion of the cacheline to be initialized.

At 926, an integrity value can be computed for the identified portion of the cacheline, which contains initialization data. The integrity value may be computed using any suitable cryptographic technique including, but not necessarily limited to, the cryptographic technique 600 of FIG. 6. In one or more embodiments, the data bounds value may be included in the integrity value by, for example, being added to the end of the integrity value as in cryptographic technique 600, or by including the data bounds value as part of the input to the cryptographic technique.

At 928, the integrity metadata, including the computed integrity value and the data bounds value can be stored in the metadata region at the beginning of the cacheline, at the cacheline address.

With reference again to 918, if it is determined that the cacheline address precedes the slot midpoint, then at 930, the metadata region in the cacheline is located at the end of the cacheline. The address for the metadata region may be calculated based on the end of the cacheline (e.g., the first address of the next cacheline) minus the size of the integrity metadata.

At 932, a portion of the cacheline to be initialized is identified. The portion of the cacheline to be initialized may include some or all of the cacheline minus the metadata region. In one example, the memory address of the first byte in the cacheline to be initialized can be calculated using the data bounds value (e.g., size of the data to be initialized) and the end of the cacheline (e.g., the first address of the next cacheline). The memory address of the last byte in the cacheline to be initialized can be calculated using the data bounds value minus the size of the integrity metadata and the memory address of the first byte in the cacheline to be initialized. At 934, initialization data can be stored in the identified portion of the cacheline to be initialized.

At 936, an integrity value can be computed for the identified portion of the cacheline, which contains initialization data. The integrity value may be computed using any suitable cryptographic technique including, but not necessarily limited to, the cryptographic technique 600 of FIG. 6. In one or more embodiments, the data bounds value may be included in the integrity value by, for example, being added to the end of the integrity value as in cryptographic technique 600, or by including the data bounds value as part of the input to cryptographic technique.

At 938, the integrity metadata, including the computed integrity value and the data bounds value can be stored in the metadata region at the end of the cacheline, at the offset from the end of the cacheline by the size of the integrity metadata.

Figure 10A:
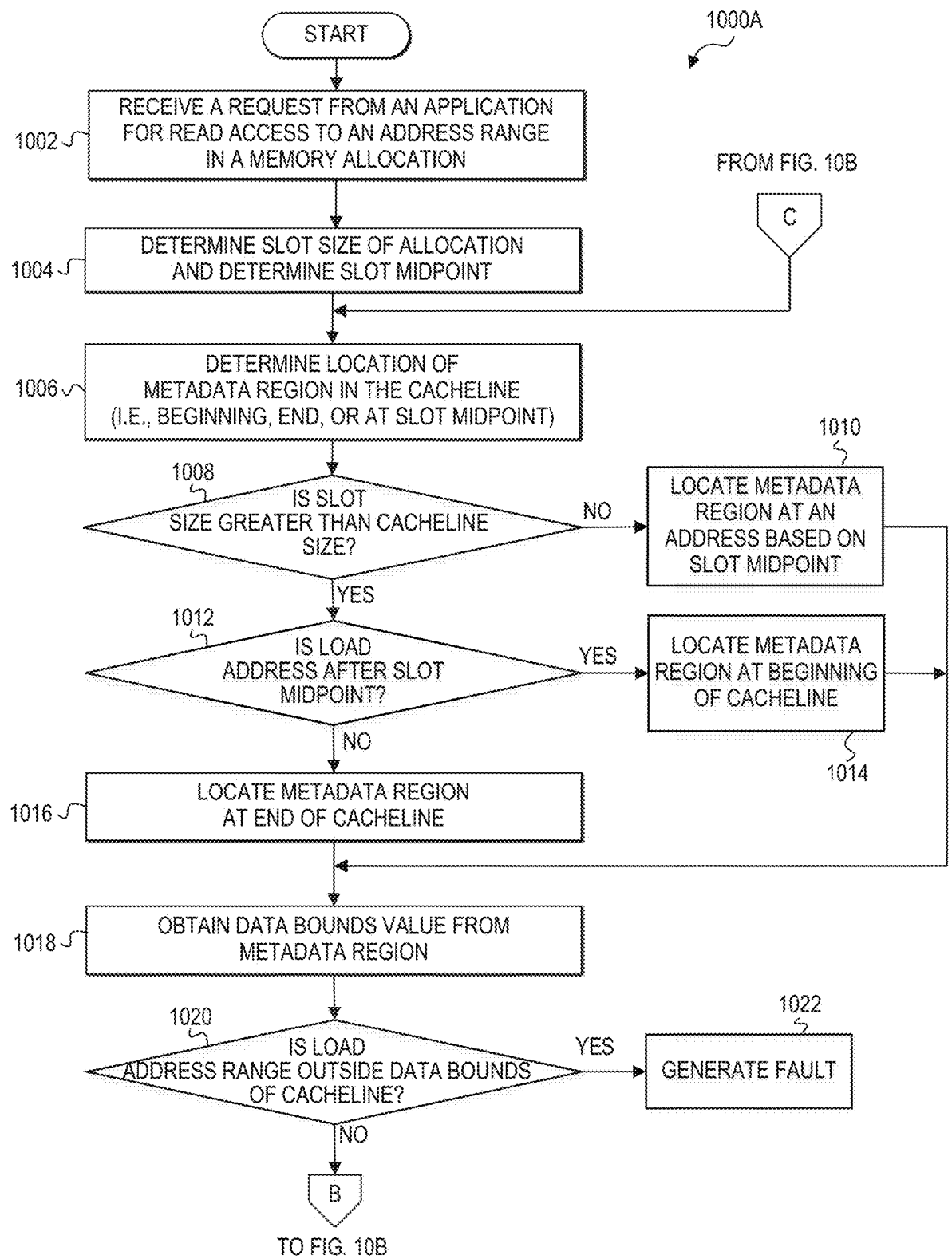
FIGS. 10A-10B are high level flow diagrams of an example process of performing a memory load operation according to at least one embodiment.
Figure 10B:
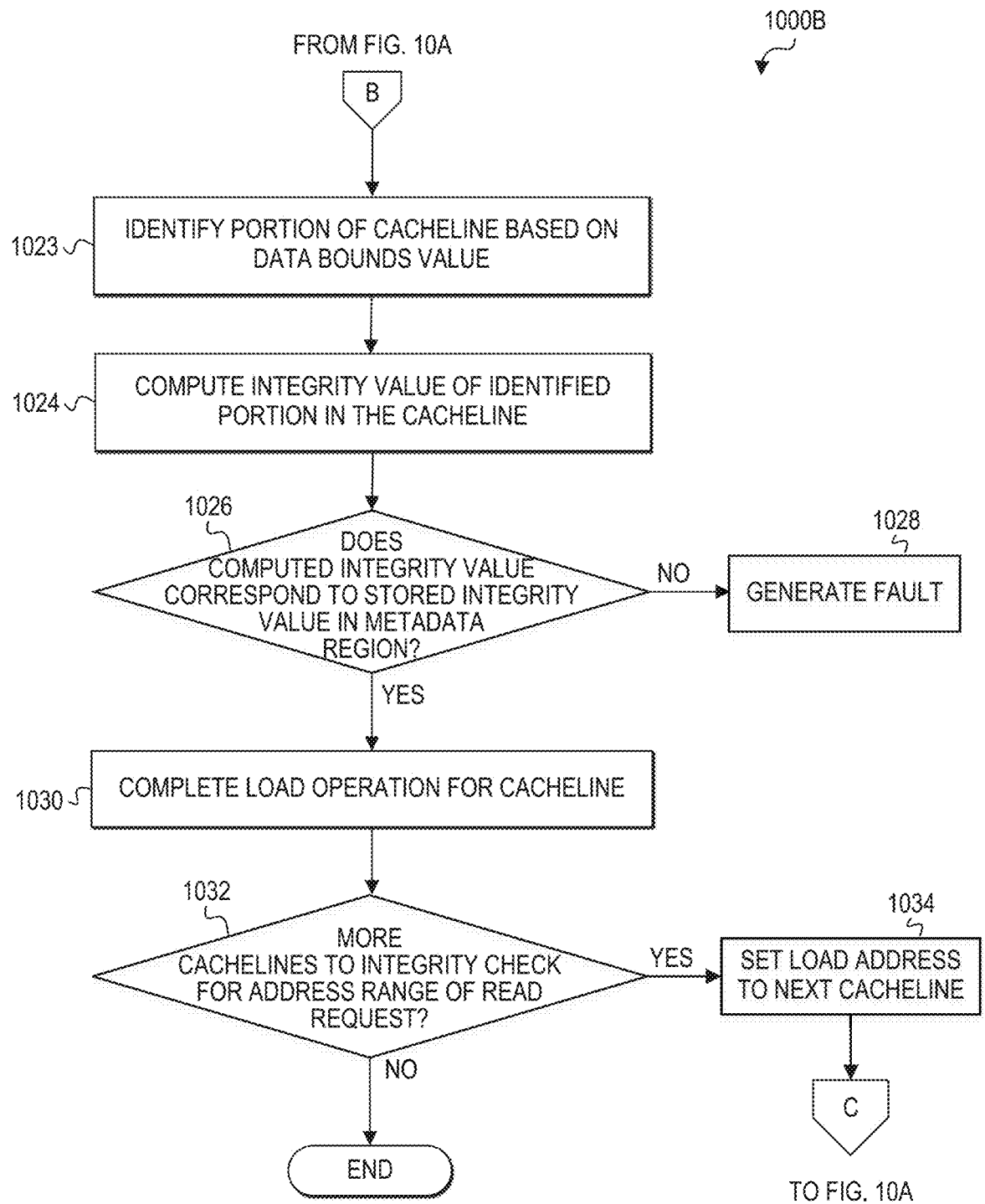

FIGS. 10A-10B are high level flow diagrams of an example process 1000A-1000B of performing a memory access request, such as a read, move, or any other request from a software application in a system with inline integrity metadata that causes an operation to load data from memory into, or load request according to at least one embodiment described herein. One or more of the operations shown in process 1000 may be performed by processor circuitry 110, 330, integrity circuit 114, 333, and/or memory controller circuitry 120, 334.

At 1002, the processor circuitry and/or the memory controller circuitry receives a request (e.g., a memory read request) from a software application for read access to an address range in a memory allocation of the memory circuitry. The request indicates an encoded pointer to the first memory address in the requested address range in the memory allocation to be accessed (e.g., to read data). The number of bytes to be accessed (e.g., for reading data) can depend on the particular request that is received, and the address range to access can be implicit (e.g., instruction for a unit of data having a known byte-size) or explicit depending on the particular instruction and architecture. Generally, the requested address range can include the entire memory allocation or any portion thereof, including a single byte.

At 1004, the encoded pointer can be used to determine the slot size of the memory allocation. In addition, the slot midpoint can be determined based on the encoded pointer (e.g., power size bits).

The encoded pointer can be decoded (including decrypting any encrypted portions) to obtain the linear address, which is the load address for the memory access. The load address is the memory address (e.g., linear address encoded in pointer) of a first byte in memory at which a requested data access begins. The load address is where software expects the data to be without considering the inline integrity metadata (or other optional inline metadata). Thus, the load address corresponds to a compressed location as if all metadata was removed and the data was concatenated. At 1006, the location of a metadata region in the cacheline associated with the load address can be determined. The location of the metadata region in the cacheline can vary depending on the location of the load address relative to the slot midpoint and on the size of the slot relative to the size of the cacheline. Generally, the location of a metadata region in a cacheline may be at the beginning of the cacheline, at the end of the cacheline, or at a midpoint of a slot to which the cacheline is assigned. More details related to determining the location of the metadata region have previously been discussed (e.g., with reference to FIGS. 9A-9B) and are further discussed with reference to 1008-1016.

At 1008, a determination is made as to whether the size of the slot associated with the cacheline is greater than the size of the cacheline. If not, then the size of this sub-cacheline slot is less than or equal to the size of the cacheline, and the allocation is contained entirely within the cacheline. For cachelines of allocations assigned to sub-cacheline slots, the integrity metadata is stored at a midpoint of the slot. Accordingly, if the size of the slot is determined to be not greater than the size of the cacheline at 1008, then at 1010, the metadata region is located based on the midpoint of the slot. The metadata region may be located to the left of the midpoint (e.g., ending with a byte immediately prior to the midpoint address), to the right of the midpoint (e.g., starting at the midpoint address), or partially on each side of the midpoint (e.g., including bytes before and after the midpoint).

If the slot is greater in size than the cacheline, then the allocation spans at least two cachelines and at 1012, based on the slot midpoint, the linear address is used to determine if the load address is located before or after the slot midpoint. If the load address is located after the slot midpoint, then at 1014, the metadata region for the cacheline can be located at the beginning of the cacheline, at the cacheline address.

At 1012, if the load address is determined to come before the midpoint, then at 1016, the metadata region for the cacheline can be located at the end of the cacheline. The address for the metadata region may be calculated based on the end of the cacheline (e.g., the first address of the next cacheline) minus the size of the integrity metadata.

At 1018, a data bounds value(s) is obtained from the metadata region. At 1020, a determination is made as to whether the load is within the data bounds for the cacheline. If the allocation is assigned to a sub-cacheline slot, then an upper data bounds value and a lower data bounds value are obtained from the metadata region. The upper data bounds value indicates the size (e.g., number of blocks, words, bytes, etc.) of data immediately following the midpoint that is part of the allocation and the lower data bounds value indicates the size (e.g., number of blocks, words, bytes, etc.) of data immediately preceding the midpoint that is part of the allocation. Thus, the upper and lower data bounds in the cacheline (which in this case includes the entire allocation) can be determined. If the load (e.g., load address and/or end address of address range being accessed) is outside of the upper and lower data bounds in the cacheline, then at 1022 a fault can be generated.

If the allocation is assigned to a slot sized to include two or more cachelines, and therefore the allocation is contained in more than one cacheline, then a single data bounds value was obtained from the metadata region at 1018. If the load address of the read access request is located before the slot midpoint, then the lower data bounds in the cacheline can be determined based on the end of the cacheline (e.g., the first address of the next cacheline) and the size (e.g., number of blocks, words, bytes, etc.) of the data immediately preceding the end of the cacheline as indicated by the data bounds value. If the load (e.g., load address for the first cacheline, cacheline address of the cacheline being evaluated for subsequent cachelines) is outside of (or prior to) the lower data bounds of the cacheline, then at 1022 a fault can be generated. If the load address of the read access request is located after the slot midpoint, then the upper data bounds of the cacheline can be determined based on the beginning of the cacheline and the size (e.g., number of blocks, words, bytes, etc.) of the data immediately following the beginning of the cacheline as indicated by the data bounds value. If the load (e.g., end address of data being accessed in the cacheline) is outside of (or after) the upper data bounds of the cacheline, then at 1022 a fault can be generated.

If the load is within the data bounds in the cacheline, then the integrity circuit can perform an integrity check to determine whether the data within the cacheline data bounds determined at 1020 matches an integrity value stored in the metadata region of the cacheline. The cacheline data bounds may include the whole cacheline (minus the stored integrity value), or a portion thereof. For an allocation spanning more than one cacheline, the data bounds of the cacheline extend from the beginning or end of the cacheline where the metadata region is stored, in a direction away from the slot midpoint for a number of bytes (or other unit such as a block, word, etc.) equal to the data bounds value. For an allocation contained entirely within one cacheline, the data bounds of the cacheline extend from the midpoint in one direction for a number of bytes (or other unit such as a block, word, etc.) equal to the upper data bounds value and in the opposite direction for a number of bytes (or other unit such as a block, word, etc.) equal to the lower data bounds value.

At 1023 of FIG. 10B, a portion of the cacheline, over which an integrity value will be computed, is identified based on the data bounds value(s). The identified portion could include some or all of the cacheline and omits the integrity value. Depending on the particular type of cryptographic technique used to compute the integrity value, the identified portion may not include the data bounds value as it may be added after encryption operations during the computation of the integrity value. In other embodiments, the data bounds value may be included in the identified portion of the cacheline to be encrypted. In yet other embodiments, the data bounds value may be omitted entirely from the integrity value computation.

At 1024 of FIG. 10B, an integrity value is computed over the identified portion of data within the cacheline data bounds determined at 1023. The integrity value may be computed using any suitable cryptographic technique including, but not necessarily limited to, the cryptographic technique 600 of FIG. 6. Using cryptographic technique 600 causes the slot size and/or the immutable pointer bits to be bound to the integrity value as part of the inputs to the encryption algorithm(s). The encryption algorithm(s) may also include the data within the cacheline data bounds and a secret key as input. In one or more embodiments, the upper and lower data bounds values may be included in the integrity value by, for example, being added to the integrity value as in cryptographic technique 600, or by including the data bounds value(s) as part of the input to cryptographic technique. It should be noted that the data in the cacheline that is integrity-protected may be encrypted or unencrypted, and the integrity value may be computed over encrypted or unencrypted data.

The computed integrity value can be compared to the stored integrity value in the metadata region. If they do not match, or otherwise correspond, then a fault may be generated at 1028. Otherwise, if they do match or otherwise correspond, then at 1030, the load operation for the cacheline may proceed (or retire).

At 1032, a determination can be made as to whether there are more cachelines to load for the address range of the read request. If there are no more cachelines, then the flow can end. Otherwise, if there are more cachelines in the address range, then at 1034, the load address can be set to the next cacheline in the allocation, and flow can return to 1006, where the location of the metadata region in the new cacheline is determined. The processing may continue until a fault is generated (e.g., address range is out of bounds in cacheline, integrity value mismatch), or until there are no more cachelines to be loaded to satisfy the read request.

Figure 11:
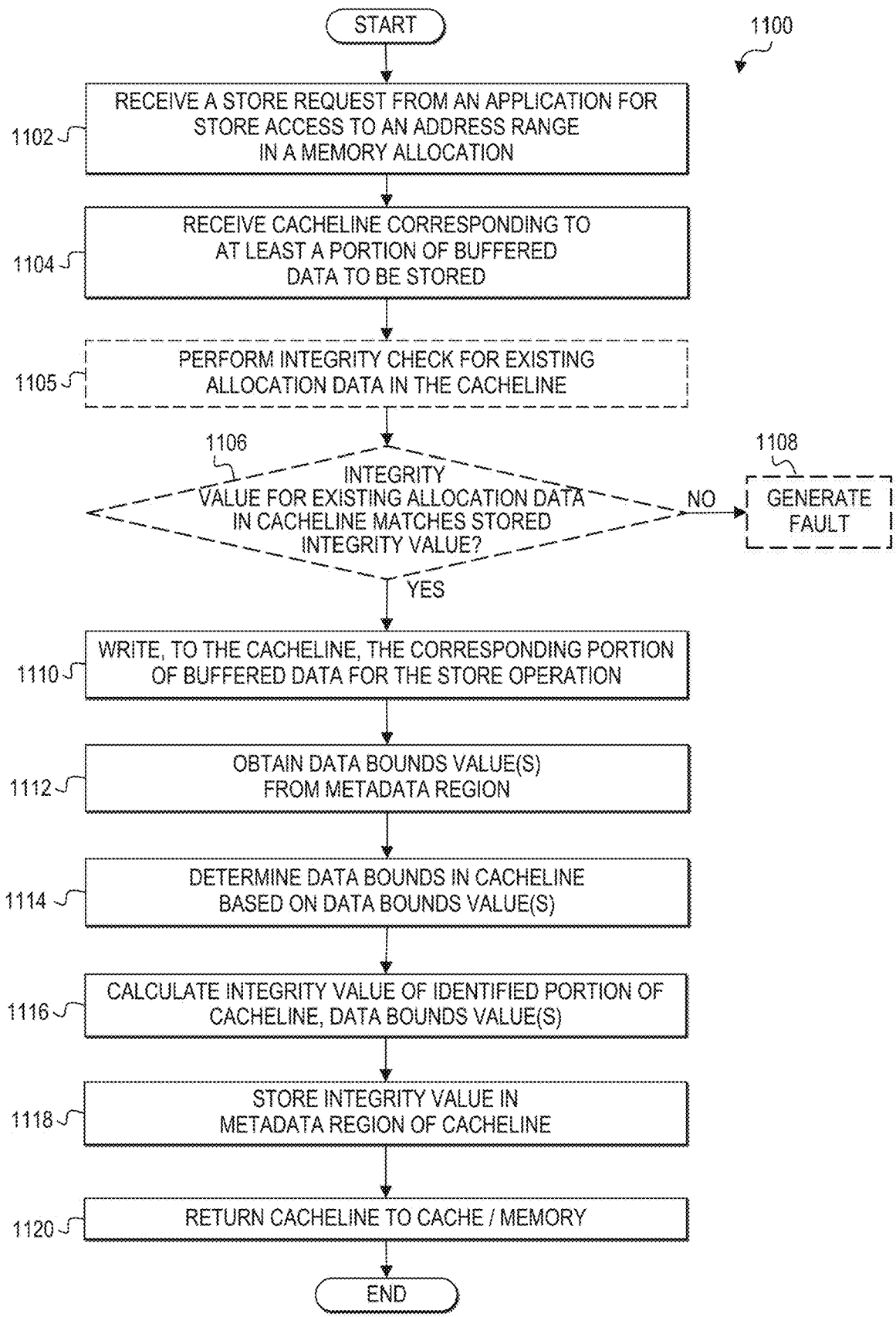
FIG. 11 is a high level flow diagram of an example process of performing a memory write operation according to at least one embodiment.

FIG. 11 is a high level flow diagram of an example process 1100 of performing a memory access request, such as a store or move request, in a system with inline integrity metadata according to at least one embodiment described herein. One or more of the operations shown in process 1100 may be performed by processor circuitry 110, 330, integrity circuit 114, 333, and/or memory controller circuitry 120, 334.

At 1102, the processor circuitry and/or the memory controller circuitry receives a request (e.g., a memory store/write request) from an application for store access to an address range in a memory allocation of the memory circuitry. The request indicates an encoded pointer to the first memory address in the requested address range in the memory allocation to be accessed (e.g., to store data). The number of bytes to be accessed (e.g., for storing data) can depend on the particular request that is received, and the address range to access can be implicit (e.g., instruction for a unit of data having a known byte-size) or explicit depending on the particular instruction and architecture. Generally, the requested address range can include the entire memory allocation or any portion thereof, including a single byte.

The data to be stored may be placed in a buffer until a cacheline of the memory allocation targeted by the memory store request is received. At 1104, a cacheline of the memory allocation is received. The cacheline corresponds to at least a portion of the data to be stored.

Optionally, some embodiments may perform an integrity check of the existing data in the cacheline, even if all of the data or just some of the data is to be modified or replaced in the store operation. This is shown in dashed lines at 1105-1108 to indicate that such operations are optional. A particular security context (e.g., power size encoded in the pointer) may be used in the integrity check when computing the integrity value in some embodiments. Performing an integrity check on existing data in an allocation before the data is overwritten by a store operation can avoid overwriting information out of bounds for the current allocation, even if that cacheline is entirely replaced with new data. Without performing this integrity check on existing data, another allocation belonging to a different user/program may be inadvertently (or maliciously) overwritten.

At 1105, an integrity check may be performed on the cacheline that has been received. For example, operations similar to those described with reference to 1004-1024 of FIGS. 10A-10B may be performed. At 1020, however, the determination may be whether a store address range (rather than a load address range as in FIG. 10A) is outside the data bounds in the cacheline. At 1106, after the integrity value is computed for the data in the cacheline data bounds, a determination may be made as to whether the computed integrity value for the existing allocation data in the cacheline matches a stored integrity value in a metadata region of the cacheline. If there is a mismatch, then at 1108, a fault may be generated.

If there is a match between the computed integrity value for the existing allocation data in the cacheline and a stored integrity value in a metadata region of the cacheline, then at 1110, the buffered contents to be stored that correspond to the cacheline can be written to the cacheline.

At 1112, the data bounds value(s) is obtained from the metadata region of the cacheline. At 1114, data bounds in the cacheline are determined based on data bounds value(s) obtained from the metadata region. If the allocation is assigned to a sub-cacheline slot, then an upper data bounds value and a lower data bounds value are obtained from the metadata region. The upper data bounds value indicates the size (e.g., number of blocks, words, bytes, etc.) of data immediately following the midpoint that is part of the allocation and the lower data bounds value indicates the size (e.g., number of blocks, words, bytes, etc.) of data immediately preceding the midpoint that is part of the allocation. Thus, the upper and lower data bounds in the cacheline (which in this case includes the entire allocation) can be determined.

If the allocation is not assigned to a sub-cacheline slot, then a single data bounds value can be obtained from the metadata region. If the store address is located before the slot midpoint, then the cacheline data bounds can be determined based on the end of the cacheline and the size (e.g., number of blocks, words, bytes, etc.) of the data immediately preceding the end of the cacheline as indicated by the data bounds value. If the store address is located after the slot midpoint, then the cacheline data bounds can be determined based on beginning of the cacheline and the size (e.g., number of blocks, words, bytes, etc.) of the data immediately following the beginning of the cacheline as indicated by the data bounds value.

At 1116, an integrity value is computed over the data within the cacheline data bounds determined at 1114. The integrity value may be computed using any suitable cryptographic technique including, but not necessarily limited to, the cryptographic technique 600 of FIG. 6. Using cryptographic technique 600 causes the slot size and/or the immutable pointer bits to be bound to the integrity value as part of the inputs to the cryptographic algorithm(s). The cryptographic algorithm(s) may also include the data within the cacheline data bounds and a secret key as input. In one or more embodiments, the upper and lower data bounds values may be included in the integrity value by, for example, being added to the integrity value as in cryptographic technique 600, or by including the data bounds value(s) as part of the input to cryptographic algorithm. It should be noted that the data in the memory allocation targeted by the store operation may be encrypted or unencrypted. If the data is encrypted, then before the integrity value is computed, the data in the cacheline data bounds of the cacheline can be encrypted (e.g., using a tweakable block cipher with the encoded pointer to the allocation as a tweak input). The cryptographic technique used to compute an integrity value can use the encrypted data as input (e.g., input block, initialization data). In other embodiments, the data in the memory may be unencrypted and so the cryptographic technique used to compute the integrity value can use the unencrypted data as input (e.g., input block, initialization data). Even if the data is unencrypted, security context (e.g. size/power, key ID, type, etc.) may optionally be associated with each cacheline or portion of a cacheline. This additional security context may be placed in additional storage associated with each cacheline, since it may be reconstituted from information specific to an access, e.g. a pointer or an instruction operand, rather than from information loaded from DRAM.

At 1118, the computed integrity value can be stored in the metadata region of the cacheline. At 1120, the cacheline can be returned to cache and, eventually, to memory. It should be noted that on a store operation, storing the integrity value can wait until all stores have accumulated in a buffered line before the line is returned to the DCU (e.g., lowest level cache). The integrity circuit can calculate the integrity value after the last store before the cacheline is returned to the cache (DCU).

Privileged software or software using shared memory may use a different linear address to access memory than was used to generate the tweak/IV for encrypting the memory. For example, a memory access instruction may accept an alternative address operand in addition to the actual address operand so that the alternative address operand can be used to generate the tweak/IV. Such accesses should also rely on the alternative address operand for computing the MACs.

Figure 12:
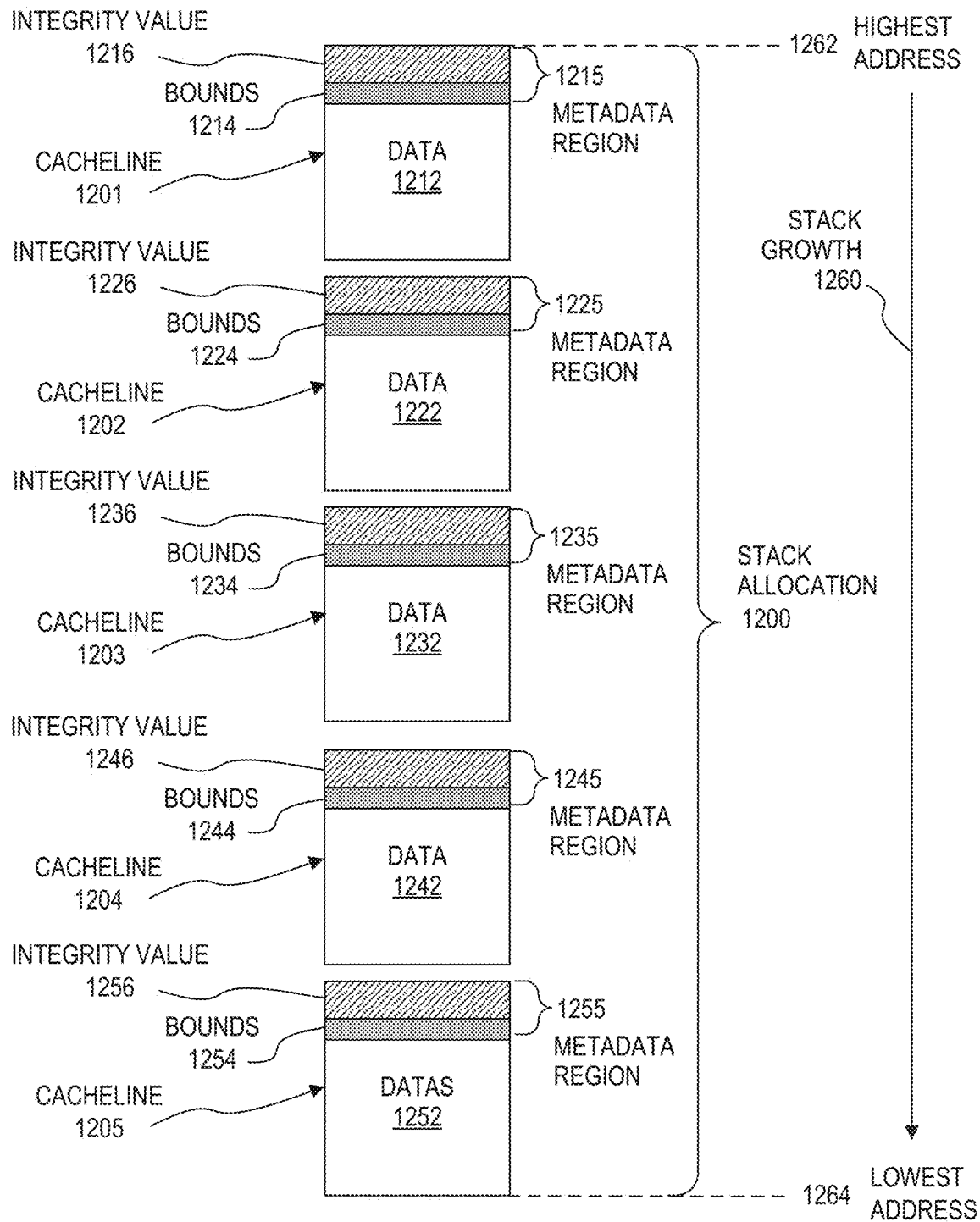
FIG. 12 is a schematic illustration of an example memory allocation in stack with inline memory integrity values according to an embodiment.

FIG. 12 is a schematic illustration of an example memory allocation in stack with inline memory integrity values according to an embodiment. Stack frames can utilize an inline integrity metadata approach as disclosed in this application, by storing the integrity metadata relative to the side of the cacheline closest to the stack pointer's base address relative to the direction the stack grows.

FIG. 12 illustrates a stack allocation 1200 with five corresponding cachelines 1201-1205 and any number of frames. Frames are not illustrated as any number of frames could be included in the stack frame, including a single frame or more. Encoded stack pointers may point to each frame in accordance with embodiments of the present disclosure. In the example stack allocation 1200, each cacheline 1201, 1202, 1203, 1203, ad 1204 includes a respective metadata region 1215, 1225, 1235, 1245, and 1255. Each metadata region can contain respective integrity values 1216, 1226, 1236, 1246, and 1256 and respective data bounds value 1214, 1224, 1234, 1244, and 1254. Stack growth is illustrated by arrow 1260 as growing from a highest address 1262 to a lowest address 1264. Accordingly, in this example, each metadata region 1215-1255 is located relative to the side of the cacheline closest to the stack pointer's base address, which is the highest address 1262 in this example, relative to the direction the stack grows, which is toward the stack pointer's lowest address 1264 as indicated by the stack growth arrow 1260. It should be noted that stack growth could be opposite in other examples depending on particular implementations and needs. The integrity metadata can provide granular integrity protection down to each individual object on a frame.

In further embodiments, per cache metadata may be used for storing certain types of metadata that scale with the sizes of allocations. For example, some security mechanisms depend on distinguishing pointers and non-pointer data within memory using a special bit. In an embodiment, per-cache metadata could be used in which a bit map for a unit of data (e.g., one bit for every 8B word) indicates whether the unit of data (e.g., 8B word) at the corresponding location within the cacheline contains a pointer or not. Because the number of potential storage locations for pointers increases as allocation sizes increase, storing a bitmap per-cacheline rather than in a single place enables scaling. Other similar types of metadata could also be stored per-cacheline. For example, a bit to indicate whether a word is sensitive or not sensitive. Such metadata could help distinguish sensitive data from non-sensitive data when a mixture of the two is present in one allocation. Thus, if processing restrictions ae placed on the sensitive data, e.g., requiring it to be processed in a special mode (e.g., data-oblivious mode), certain restrictions could be put on operations applied to the certain sensitive data that could be put on operations applied to the certain sensitive data. There are other sorts of MD that could be defined as well.

Example Architectures

Figure 13:
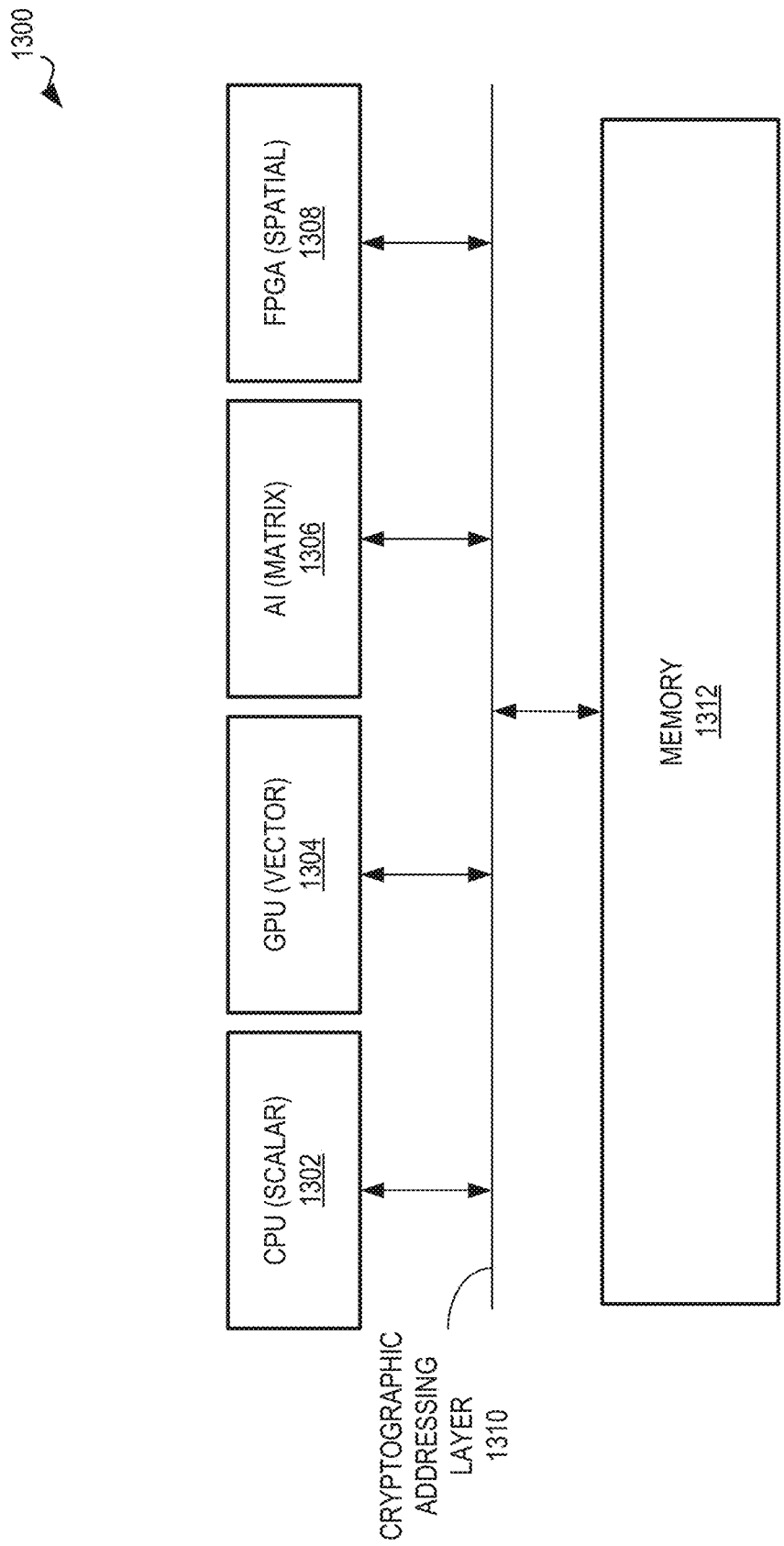
FIG. 13 is a block diagram illustrating an example cryptographic computing environment according to at least one embodiment.

FIG. 13 is a block diagram illustrating an example cryptographic computing environment 1300 according to at least one embodiment. In the example shown, a cryptographic addressing layer 1310 extends across the example compute vectors central processing unit (CPU) 1302, graphical processing unit (GPU) 1304, artificial intelligence (AI) 1306, and field programmable gate array (FPGA) 1308. For example, the CPU 1302 and GPU 1304 may share the same virtual address translation for data stored in memory 1312, and the cryptographic addresses may build on this shared virtual memory. They may share the same process key for a given execution flow, and compute the same tweaks to decrypt the cryptographically encoded addresses and decrypt the data referenced by such encoded addresses, following the same cryptographic algorithms.

Combined, the capabilities described herein may enable cryptographic computing. Memory 1312 may be encrypted at every level of the memory hierarchy, from the first level of cache through last level of cache and into the system memory. Binding the cryptographic address encoding to the data encryption may allow extremely fine-grain object boundaries and access control, enabling fine grain secure containers down to even individual functions and their objects for function-as-a-service. Cryptographically encoding return addresses on a call stack (depending on their location) may also enable control flow integrity without the need for shadow stack metadata. Thus, any of data access control policy and control flow can be performed cryptographically, simply dependent on cryptographic addressing and the respective cryptographic data bindings.

Figure 14:
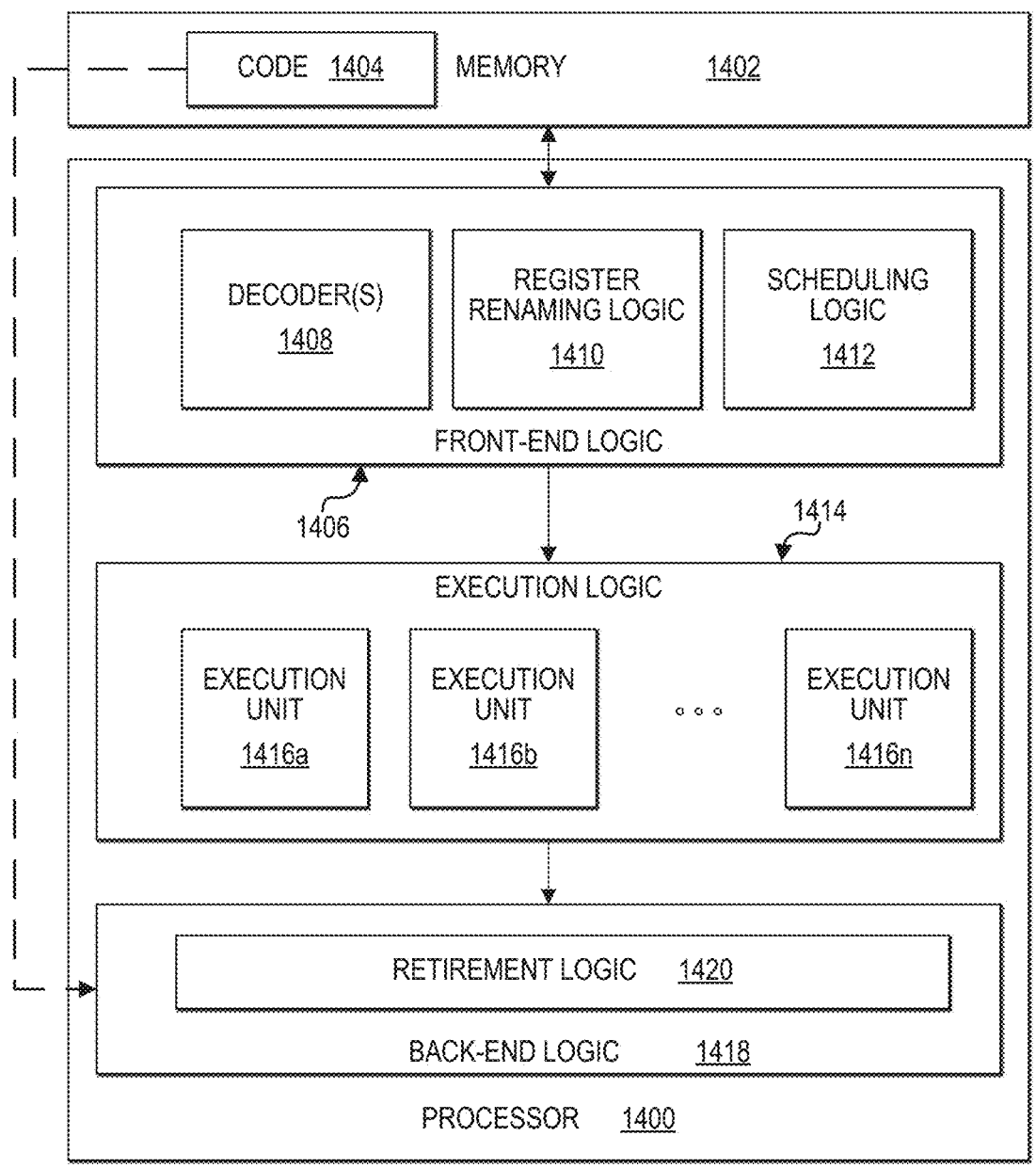
FIG. 14 is a block diagram illustrating an example processor core and memory according to at least one embodiment.
Figure 15:
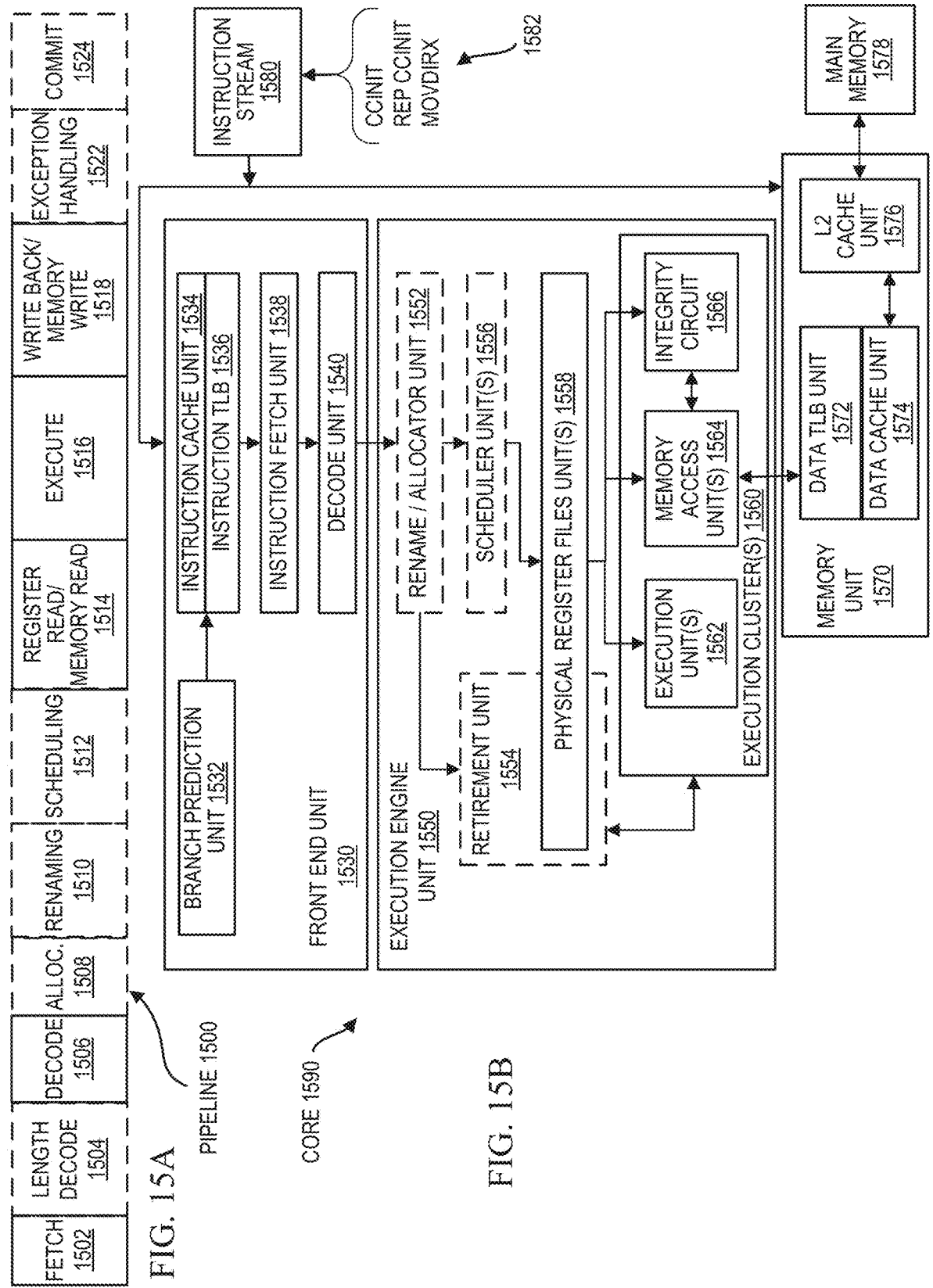
FIG. 15A is a block diagram illustrating both an exemplary in-order pipeline and an exemplary register renaming, out-of-order issue/execution pipeline in accordance with certain embodiments.
FIG. 15B is a block diagram illustrating both an exemplary embodiment of an in-order architecture core and an exemplary register renaming, out-of-order issue/execution architecture core to be included in a processor in accordance with certain embodiments.
Figure 16:
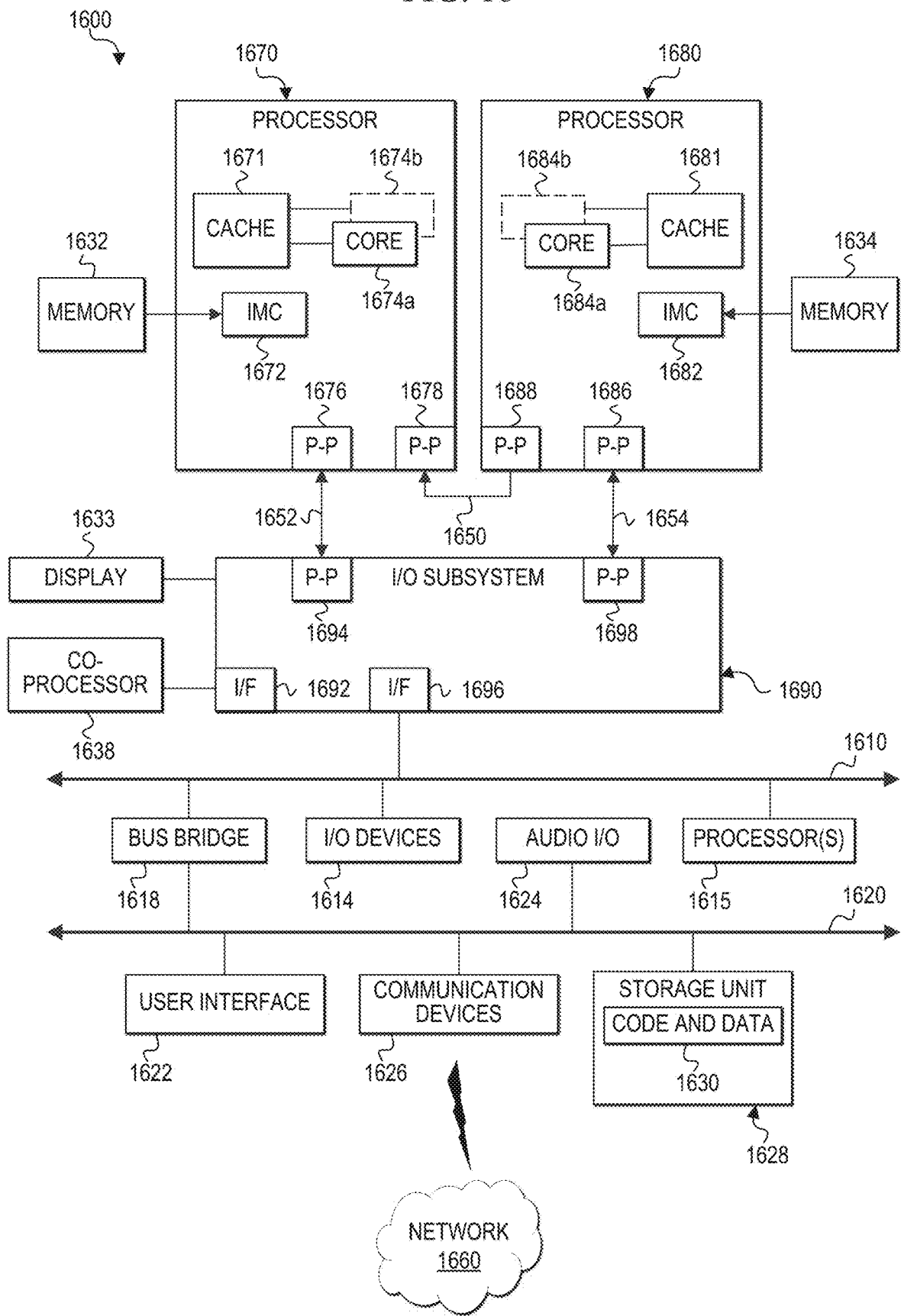
FIG. 16 is a block diagram of an example computer architecture according to at least one embodiment.

FIGS. 14-16 are block diagrams of exemplary computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 14-16.

FIG. 14 is an example illustration of a processor according to an embodiment. Processor 1400 is an example of a type of hardware device that can be used in connection with the implementations shown and described herein (e.g., processor circuitry 110, 330). Processor 1400 may be any type of processor, such as a microprocessor, an embedded processor, a digital signal processor (DSP), a network processor, a multi-core processor, a single core processor, or other device to execute code. Although only one processor 1400 is illustrated in FIG. 14, a processing element may alternatively include more than one of processor 1400 illustrated in FIG. 14. Processor 1400 may be a single-threaded core or, for at least one embodiment, the processor 1400 may be multi-threaded in that it may include more than one hardware thread context (or "logical processor") per core.

FIG. 14 also illustrates a memory 1402 coupled to processor 1400 in accordance with an embodiment. Memory 1402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1400 can execute any type of instructions associated with algorithms, processes, or operations detailed herein. Generally, processor 1400 can transform an element or an article (e.g., data) from one state or thing to another state or thing.

Code 1404, which may be one or more instructions to be executed by processor 1400, may be stored in memory 1402, or may be stored in software, hardware, firmware, or any suitable combination thereof, or in any other internal or external component, device, element, or object where appropriate and based on particular needs. In one example, processor 1400 can follow a program sequence of instructions indicated by code 1404. Each instruction enters a front-end logic 1406 and is processed by one or more decoders 1408. The decoder may generate, as its output, a micro operation such as a fixed width micro operation in a predefined format, or may generate other instructions, microinstructions, or control signals that reflect the original code instruction. Front-end logic 1406 also includes register renaming logic 1410 and scheduling logic 1412, which generally allocate resources and queue the operation corresponding to the instruction for execution.

Processor 1400 can also include execution logic 1414 having a set of execution units 1416a, 1416b, 1416n, etc. Some embodiments may include a number of execution units dedicated to specific functions or sets of functions. Other embodiments may include only one execution unit or one execution unit that can perform a particular function. Execution logic 1414 performs the operations specified by code instructions.

After completion of execution of the operations specified by the code instructions, back-end logic 1418 can retire the instructions of code 1404. In one embodiment, processor 1400 allows out of order execution but requires in order retirement of instructions. Retirement logic 1420 may take a variety of known forms (e.g., re-order buffers or the like). In this manner, processor 1400 is transformed during execution of code 1404, at least in terms of the output generated by the decoder, hardware registers and tables utilized by register renaming logic 1410, and any registers (not shown) modified by execution logic 1414.

Although not shown in FIG. 14, a processing element may include other elements on a chip with processor 1400. For example, a processing element may include memory control logic along with processor 1400. The processing element may include I/O control logic and/or may include I/O control logic integrated with memory control logic. The processing element may also include one or more caches. In some embodiments, non-volatile memory (such as flash memory or fuses) may also be included on the chip with processor 1400.

FIG. 15A is a block diagram illustrating both an exemplary in-order pipeline and an exemplary register renaming, out-of-order issue/execution pipeline according to one or more embodiments of this disclosure. FIG. 15B is a block diagram illustrating both an exemplary embodiment of an in-order architecture core and an exemplary register renaming, out-of-order issue/execution architecture core to be included in a processor according to one or more embodiments of this disclosure. The solid lined boxes in FIGS. 15A-15B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 15A, a processor pipeline 1500 includes a fetch stage 1502, a length decode stage 1504, a decode stage 1506, an allocation stage 1508, a renaming stage 1510, a scheduling (also known as a dispatch or issue) stage 1512, a register read/memory read stage 1514, an execute stage 1516, a write back/memory write stage 1518, an exception handling stage 1522, and a commit stage 1524.

FIG. 15B shows processor core 1590 including a front end unit 1530 coupled to an execution engine unit 1550, and both are coupled to a memory unit 1570. Processor core 1590 and memory unit 1570 are examples of the types of hardware that can be used in connection with the implementations shown and described herein (e.g., processor circuitry 110, 330, memory controller circuitry 120, 334, memory circuitry 130, 270, 320 cache circuitry 112, 320). The core 1590 may be a reduced instruction set computing (RISC) core, a complex instruction set computing (CISC) core, a very long instruction word (VLIW) core, or a hybrid or alternative core type. As yet another option, the core 1590 may be a special-purpose core, such as, for example, a network or communication core, compression engine, coprocessor core, general purpose computing graphics processing unit (GPGPU) core, graphics core, or the like. In addition, processor core 1590 and its components represent example architecture that could be used to implement logical processors and their respective components.

The front end unit 1530 includes a branch prediction unit 1532 coupled to an instruction cache unit 1534, which is coupled to an instruction translation lookaside buffer (TLB) unit 1536, which is coupled to an instruction fetch unit 1538, which is coupled to a decode unit 1540. The decode unit 1540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1590 includes a microcode ROM or other medium that stores microcode for certain macroinstructions (e.g., in decode unit 1540 or otherwise within the front end unit 1530). The decode unit 1540 is coupled to a rename/allocator unit 1552 in the execution engine unit 1550.

The execution engine unit 1550 includes the rename/allocator unit 1552 coupled to a retirement unit 1554 and a set of one or more scheduler unit(s) 1556. The scheduler unit(s) 1556 represents any number of different schedulers, including reservations stations, central instruction window, etc. The scheduler unit(s) 1556 is coupled to the physical register file(s) unit(s) 1558. Each of the physical register file(s) units 1558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1558 comprises a vector registers unit, a write mask registers unit, and a scalar registers unit. These register units may provide architectural vector registers, vector mask registers, and general purpose registers (GPRs). In at least some embodiments described herein, register file(s) units 1558 are examples of the types of hardware that can be used in connection with the implementations shown and described herein (e.g., system 100). The physical register file(s) unit(s) 1558 is overlapped by the retirement unit 1554 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1554 and the physical register file(s) unit(s) 1558 are coupled to the execution cluster(s) 1560. The execution cluster(s) 1560 includes a set of one or more execution units 1562, a set of one or more memory access units 1564, and an integrity circuit 1566. The execution units 1562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1562 may also include an address generation unit (e.g., 822) to calculate addresses used by the core to access main memory (e.g., memory unit 1570) and a page miss handler (PMH) (e.g., 826).

The scheduler unit(s) 1556, physical register file(s) unit(s) 1558, and execution cluster(s) 1560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1564). It should also be understood that where separate pipelines are used, one or more of these pipelines may be out-of-order issue/execution and the rest in-order.

The set of memory access units 1564 is coupled to the memory unit 1570, which includes a data TLB unit 1572 coupled to a data cache unit 1574 coupled to a level 2 (L2) cache unit 1576. In one exemplary embodiment, the memory access units 1564 may include a load unit, a store address unit, and a store data unit, each of which is coupled to the data TLB unit 1572 in the memory unit 1570. The instruction cache unit 1534 is further coupled to a level 2 (L2) cache unit 1576 in the memory unit 1570. The L2 cache unit 1576 is coupled to one or more other levels of cache and eventually to a main memory. In addition, a page miss handler (e.g., page miss handler 826) may also be included in core 1590 to look up an address mapping in a page table if no match is found in the data TLB unit 1572.

Memory access units 1564 may also be coupled to integrity circuit 1566, which may be the similar to integrity circuits 114 and/or 333. Integrity circuit 1566 may be provisioned on the backend processor pipeline in at least one implementation. Integrity circuit 1566 can be configured to compute integrity values during memory access operations and possibly memory allocation operations, from loaded cachelines (e.g., in DCU 1574) and from buffers before storing a modified cacheline (e.g., to DCU 1574). A computed integrity value may be compared to a stored integrity value in the cacheline to determine whether the data has been modified/corrupted. If the integrity check determines the data has been modified/corrupted, then the memory operation may be blocked or aborted, and/or any suitable fault may be raised.

By way of example, the exemplary register renaming, out-of-order issue/execution core architecture may implement the pipeline 1500 as follows: 1) the instruction fetch unit 1538 performs the fetch and length decoding stages 1502 and 1504; 2) the decode unit 1540 performs the decode stage 1506; 3) the rename/allocator unit 1552 performs the allocation stage 1508 and renaming stage 1510; 4) the scheduler unit(s) 1556 performs the schedule stage 1512; 5) the physical register file(s) unit(s) 1558 and the memory unit 1570 perform the register read/memory read stage 1514; the execution cluster 1560 perform the execute stage 1516; 6) the memory unit 1570 and the physical register file(s) unit(s) 1558 perform the write back/memory write stage 1518; 7) various units may be involved in the exception handling stage 1522; and 8) the retirement unit 1554 and the physical register file(s) unit(s) 1558 perform the commit stage 1524.

The core 1590 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1590 includes logic to support a packed data instruction set extension (e.g., AVX1, AVX2), thereby allowing the operations used by many multimedia applications to be performed using packed data.

Instructions to be executed on core 1590 may be included in an instruction stream 1580 and may be stored in instruction cache unit 1534. The instruction stream 1580 may be generated by, for example, a compiler, just-in-time interpreter, or other suitable mechanism (which might or might not be included in the same system with core 1590), or may be designated by a drafter of code resulting in the instruction stream. For example, a compiler may take application code and generate executable code in the form of an instruction stream. Instructions may be received by core 1590 from the instruction stream 1580. Instruction stream 1580 may be loaded to core 1590 in any suitable manner. For example, instructions to be executed by core 1590 may be loaded from storage, from other machines, or from other memory, such as main memory 1578. The instructions may arrive and be available in resident memory, such as RAM, wherein instructions are fetched from storage to be executed by core 1590. The instructions may be fetched from resident memory by, for example, a prefetcher or fetch unit (such as instruction fetch unit 1538).

In one embodiment, instruction stream 1580 may include instructions from an instruction set architecture (ISA) having particular formats based on respective instruction definitions. Generally, native instructions are executed by a CPU directly and contain an opcode and one to three operands. An opcode contains information that informs the CPU what operations are to be performed. Operands tell the CPU what data is to be processed in the operations to be performed. Types of operands can include immediate, register, and memory. An immediate operand is a constant value to be used by the instruction. A register operand may be a name/identifier of a register to be accessed. The register may contain data to be accessed or a pointer to a memory location where the data to be accessed is stored. A memory operand may be a reference to a location in memory that contains data or a pointer to a memory location where the data to be accessed is stored.

In one or more embodiments disclosed herein, an instruction set architecture can be extended to include instructions to perform memory integrity operations. For example, the new instructions may include a "CCINIT" instruction, a "REP CCINIT" instruction, and/or a family of "MOVDIRx" instructions for initializing a memory allocation with specific initialization values for the data (or code) and integrity metadata corresponding to each cacheline spanned by the allocation, which were previously described herein with respect to FIGS. 7A-7C. Accordingly, instruction stream 1580 may include one or more new instructions 1582 (e.g., CCINIT, REP CCINIT, and/or MOVDIRx).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1534/1574 and a shared L2 cache unit 1576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 16 illustrates a computing system 1600 that is arranged in a point-to-point (PtP) configuration according to an embodiment. In particular, FIG. 16 shows a system where processors, memory, and input/output devices are interconnected by a number of point-to-point interfaces. Generally, one or more of the computing systems or computing devices described herein (e.g., system 100) may be configured in the same or similar manner as computing system 1600.

Processors 1670 and 1680 may be implemented as single core processors 1674a and 1684a or multi-core processors 1674a-1674b and 1684a-1684b. Processors 1670 and 1680 may each include a cache 1671 and 1681 used by their respective core or cores. A shared cache (not shown) may be included in either processors or outside of both processors, yet connected with the processors via P-P interconnect, such that either or both processors' local cache information may be stored in the shared cache if a processor is placed into a low power mode. It should be noted that one or more embodiments described herein could be implemented in a computing system, such as computing system 1600. Moreover, processors 1670 and 1680 are examples of the types of hardware that can be used in connection with the implementations shown and described herein (e.g., processor circuitry 110, 330).

Processors 1670 and 1680 may also each include integrated memory controller logic (MC) 1672 and 1682 to communicate with memory elements 1632 and 1634, which may be portions of main memory locally attached to the respective processors. In alternative embodiments, memory controller logic 1672 and 1682 may be discrete logic separate from processors 1670 and 1680. Memory elements 1632 and/or 1634 may store various data to be used by processors 1670 and 1680 in achieving operations and functionality outlined herein.

Processors 1670 and 1680 may be any type of processor, such as those discussed in connection with other figures. Processors 1670 and 1680 may exchange data via a point-to-point (PtP) interface 1650 using point-to-point interface circuits 1678 and 1688, respectively. Processors 1670 and 1680 may each exchange data with an input/output (I/O) subsystem 1690 via individual point-to-point interfaces 1652 and 1654 using point-to-point interface circuits 1676, 1686, 1694, and 1698. I/O subsystem 1690 may also exchange data with a high-performance graphics circuit 1638 via a high-performance graphics interface 1639, using an interface circuit 1692, which could be a PtP interface circuit. In one embodiment, the high-performance graphics circuit 1638 is a special-purpose processor, such as, for example, a high-throughput MIC processor, a network or communication processor, compression engine, graphics processor, GPGPU, embedded processor, or the like. I/O subsystem 1690 may also communicate with a display 1633 for displaying data that is viewable by a human user. In alternative embodiments, any or all of the PtP links illustrated in FIG. 16 could be implemented as a multi-drop bus rather than a PtP link.

I/O subsystem 1690 may be in communication with a bus 1610 via an interface circuit 1696. Bus 1610 may have one or more devices that communicate over it, such as a bus bridge 1618, I/O devices 1614, and one or more other processors 1615. Via a bus 1620, bus bridge 1618 may be in communication with other devices such as a user interface 1622 (such as a keyboard, mouse, touchscreen, or other input devices), communication devices 1626 (such as modems, network interface devices, or other types of communication devices that may communicate through a computer network 1660), audio I/O devices 1624, and/or a data storage device 1628. Data storage device 1628 may store code and data 1630, which may be executed by processors 1670 and/or 1680. In alternative embodiments, any portions of the bus architectures could be implemented with one or more PtP links.

Program code, such as code 1630, may be applied to input instructions to perform the functions described herein and generate output information. The output information may be applied to one or more output devices, in known fashion. For purposes of this application, a processing system may be part of computing system 1600 and includes any system that has a processor, such as, for example; a digital signal processor (DSP), a microcontroller, an application specific integrated circuit (ASIC), or a microprocessor.

The program code (e.g., 1630) may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the one or more of the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the present disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The computing system depicted in FIG. 16 is a schematic illustration of an embodiment of a computing system that may be utilized to implement various embodiments discussed herein. It will be appreciated that various components of the system depicted in FIG. 16 may be combined in a system-on-a-chip (SoC) architecture or in any other suitable configuration capable of achieving the functionality and features of examples and implementations provided herein.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
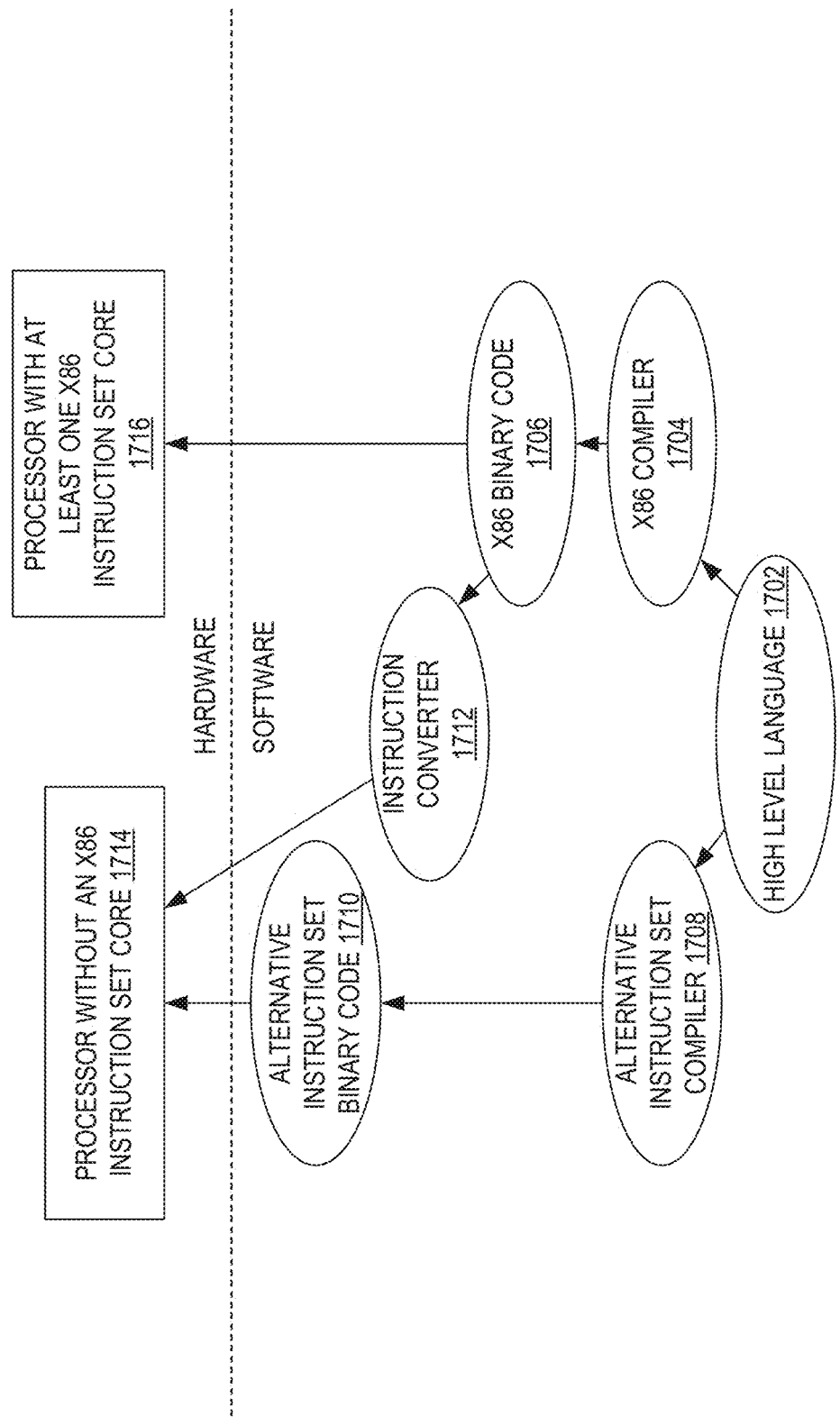
FIG. 17 is a block diagram contrasting the use of a software instruction converter to convert binary instructions in a source instruction set to binary instructions in a target instruction set according to embodiments of the present disclosure.

FIG. 17 is a block diagram contrasting the use of a software instruction converter to convert binary instructions in a source instruction set to binary instructions in a target instruction set according to embodiments of this disclosure. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named items, elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Furthermore, the words "optimize," "optimization," "optimizing," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described. Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The following examples pertain to embodiments in accordance with this specification. The system, apparatus, method, and machine readable storage medium embodiments can include one or a combination of the following examples:

Example S1 provides a system or apparatus, comprising processor circuitry to receive a first request associated with an application to perform a memory access operation for an address range in a memory allocation of memory circuitry, and integrity circuitry to determine a location of a metadata region within a cacheline that includes at least some of the address range identify a first portion of the cacheline based at least in part on a first data bounds value stored in the metadata region, generate a first integrity value based on the first portion of the cacheline, and prevent the memory access operation in response to determining that the first integrity value does not correspond to a second integrity value stored in the metadata region.

Example S2 comprises the subject matter of Example S1, and the first data bounds value is to indicate a size corresponding to the first portion of the cacheline.

Example S3 comprises the subject matter of any one of Examples S1-52, and the integrity circuitry is further to determine a first load address in the address range by decoding an encoded pointer to the address range.

Example S4 comprises the subject matter of Example S3, and the integrity circuitry is further to determine whether the first load address is outside a first bounds in the cacheline determined using the first data bounds value, and prevent the memory access operation in response to determining that the first load address is outside the first bounds in the cacheline.

Example S5 comprises the subject matter of any one of Examples S3-S4, and the integrity circuitry is further to determine a size of a slot of memory to which the memory allocation is assigned, and calculate a midpoint of the slot of memory based on the size of the slot.

Example S6 comprises the subject matter of Example S5, and the integrity circuitry is further to determine that the slot of memory includes at least two cachelines, and in response to determining that the first load address is located after the midpoint of the slot of memory, determine that the metadata region is located at a beginning of the cacheline.

Example S7 comprises the subject matter of Example S5, and the integrity circuitry is further to determine that the slot of memory includes at least two cachelines, and in response to determining that the first load address is located before the midpoint of the slot of memory, determine that the metadata region is located at an end of the cacheline.

Example S8 comprises the subject matter of Example S5, and the integrity circuitry is further to determine that the metadata region is located at the midpoint based on the size of the slot of memory being less than or equal to a size of the cacheline, wherein the first portion of the cacheline corresponds to all data in the memory allocation.

Example S9 comprises the subject matter of Example S8, and the metadata region includes the first data bounds value, a second data bounds value, and the second integrity value, and the first portion of the cacheline is to be identified based, in part, on the second data bounds value.

Example S10 comprises the subject matter of any one of Examples S1-S9, and to generate the first integrity value is to include encrypting the first portion of the cacheline based on at least a portion of an encoded pointer to the memory allocation.

Example S11 comprises the subject matter of any one of Examples S1-S10, and the first integrity value is to be generated based, in part, on the first data bounds value in the metadata region.

Example S12 comprises the subject matter of any one of Examples S1-S11, and the processor circuitry is further to in response to a memory allocation request to allocate the memory circuitry based on a first allocation size, perform a memory allocation operation including calculating an increased allocation size based on the first allocation size and a number of metadata regions to be included in the memory allocation per cacheline, increasing the first allocation size to the increased allocation size, and obtaining the memory allocation based on the increased allocation size Example S13 comprises the subject matter of Example S12, and the processor circuitry is further to determine the first data bounds value for the cacheline, initialize the first portion of the cacheline with initialization data, store the first data bounds value in the metadata region in the cacheline, generate the second integrity value based, at least in part, on the initialization data in the first portion of the cacheline, and store the second integrity value in the metadata region.

Example S14 comprises the subject matter of any one of Examples S1-S13, and the first portion of the cacheline includes data or code.

Example S15 comprises the subject matter of any one of Examples S1-S14, and to generate the first integrity value is to include selectively encrypting the first portion of the cacheline based on a length of the first portion to produce a ciphertext output.

Example S16 comprises the subject matter of Example S15, and to generate the first integrity value is to include selectively encrypting the first portion of the cacheline based on a length of the first portion to produce a ciphertext output.

Example C1 provides one or more machine readable storage media comprising instructions stored thereon, the instructions when executed by a machine, cause the machine to receive a first request to perform a memory access operation for an address range in a memory allocation, determine a location of a metadata region within a cacheline that includes at least some of the address range, identify a first portion of the cacheline based at least in part on a first data bounds value stored in the metadata region, generate a first integrity value based on the first portion of the cacheline, and prevent the memory access operation in response to determining that the first integrity value does not correspond to a second integrity value stored in the metadata region.

Example C2 comprises the subject matter of Example C1, and the first data bounds value is to indicate a size corresponding to the first portion of the cacheline.

Example C3 comprises the subject matter of any one of Examples C1-C2, and the instructions, when executed by the one or more processors, cause the one or more processors further to determine a first load address in the address range by decoding an encoded pointer to the address range.

Example C4 comprises the subject matter of Example C3, and the instructions, when executed by the one or more processors, cause the one or more processors further to determine whether the first load address is outside a first bounds in the cacheline determined using the first data bounds value, and prevent the memory access operation in response to determining that the first load address is outside the first bounds in the cacheline.

Example C5 comprises the subject matter of any one of Examples C3-C4, and the instructions, when executed by the one or more processors, cause the one or more processors further to determine a size of a slot of memory to which the memory allocation is assigned, and calculate a midpoint of the slot of memory based on the size of the slot.

Example C6 comprises the subject matter of Example C5, and the instructions, when executed by the one or more processors, cause the one or more processors further to determine that the slot of memory includes at least two cachelines, and in response to determining that the first load address is located after the midpoint of the slot of memory, determine that the metadata region is located at a beginning of the cacheline.

Example C7 comprises the subject matter of Example C5, and the instructions, when executed by the one or more processors, cause the one or more processors further to determine that the slot of memory includes at least two cachelines, and in response to determining that the first load address is located before the midpoint of the slot of memory, determine that the metadata region is located at an end of the cacheline.

Example C8 comprises the subject matter of Example C5, and the instructions, when executed by the one or more processors, cause the one or more processors further to determine that the metadata region is located at the midpoint based on the size of the slot of memory being less than or equal to a size of the cacheline, wherein the first portion of the cacheline corresponds to all data in the memory allocation.

Example C9 comprises the subject matter of Example C8, and the metadata region includes the first data bounds value, a second data bounds value, and the second integrity value, and the first portion of the cacheline is to be identified based, in part, on the second data bounds value.

Example C10 comprises the subject matter of any one of Examples C1-C9, and to generate the first integrity value is to include encrypting the first portion of the cacheline based on at least a portion of an encoded pointer to the memory allocation.

Example C11 comprises the subject matter of any one of Examples C1-C10, and the first integrity value is to be generated based, in part, on the first data bounds value in the metadata region.

Example C12 comprises the subject matter of any one of Examples C1-C11, and the instructions, when executed by the one or more processors, cause the one or more processors further to in response to a memory allocation request to allocate the memory circuitry based on a first allocation size, perform a memory allocation operation including calculating an increased allocation size based on the first allocation size and a number of metadata regions to be included in the memory allocation per cacheline, increasing the first allocation size to the increased allocation size, and obtaining the memory allocation based on the increased allocation size.

Example C13 comprises the subject matter of Example C12, and the instructions, when executed by the one or more processors, cause the one or more processors further to determine the first data bounds value for the cacheline, initialize the first portion of the cacheline with initialization data, store the first data bounds value in the metadata region in the cacheline, generate the second integrity value based, at least in part, on the initialization data in the first portion of the cacheline, and store the second integrity value in the metadata region.

Example C14 comprises the subject matter of any one of Examples C1-C13, and the first portion of the cacheline includes data or code.

Example C15 comprises the subject matter of any one of Examples C1-C14, and to generate the first integrity value is to include selectively encrypting the first portion of the cacheline based on a length of the first portion to produce a ciphertext output.

Example C16 comprises the subject matter of Example C14-C15, and selectively encrypting the first portion of the cacheline is to include a number of encryptions to be performed varying based on the length of the first portion of the cacheline.

Example M1 provides a method comprising receiving a first request to perform a memory access operation for an address range in a memory allocation of memory circuitry, determining a location of a metadata region within a cacheline that includes at least some of the address range, identifying a first portion of the cacheline based at least in part on a first data bounds value stored in the metadata region, generating a first integrity value based on the first portion of the memory allocation, and allowing the memory access operation to continue in response to determining that the first integrity value corresponds to a second integrity value stored in the metadata region.

Example M2 comprises the subject matter of Example M1, and the first data bounds value indicates a size corresponding to the first portion of the cacheline.

Example M3 comprises the subject matter of any one of Examples M1-M2, and further comprises determining a first load address in the address range by decoding an encoded pointer to the address range.

Example M4 comprises the subject matter of Example M3, and further comprises determining whether the first load address is outside a first bounds in the cacheline determined using the first data bounds value, and preventing the memory access operation in response to determining that the first load address is outside the first bounds in the cacheline.

Example M5 comprises the subject matter of any one of Examples M3-M4, and further comprises determining a size of a slot of memory to which the memory allocation is assigned, and calculating a midpoint of the slot of memory based on the size of the slot.

Example M6 comprises the subject matter of Example M5, and further comprises determining that the slot of memory includes at least two cachelines, and in response to determining that the first load address is located after the midpoint of the slot of memory, determining that the metadata region is located at a beginning of the cacheline.

Example M7 comprises the subject matter of Example M5, and further comprises determining that the slot of memory includes at least two cachelines, and in response to determining that the first load address is located before the midpoint of the slot of memory, determining that the metadata region is located at an end of the cacheline.

Example M8 comprises the subject matter of Example M5, and further comprises determining that the metadata region is located at the midpoint based on the size of the slot of memory being less than or equal to a size of the cacheline, wherein the first portion of the cacheline corresponds to all data in the memory allocation.

Example M9 comprises the subject matter of Example M8, and the metadata region includes the first data bounds value, a second data bounds value, and the second integrity value, and the first portion of the cacheline is identified based, in part, on the second data bounds value.

Example M10 comprises the subject matter of any one of Examples M1-M9, and generating the first integrity value includes encrypting the first portion of the cacheline based on at least a portion of an encoded pointer to the memory allocation.

Example M11 comprises the subject matter of any one of Examples M1-M10, and the first integrity value is generated based, in part, on the first data bounds value in the metadata region.

Example M12 comprises the subject matter of any one of Examples M1-M11, and further comprises in response to receiving a memory allocation request to allocate the memory circuitry based on a first allocation size, performing a memory allocation operation including calculating an increased allocation size based on the first allocation size and a number of metadata regions to include in the memory allocation per cacheline increasing the first allocation size to the increased allocation size, and obtaining the memory allocation based on the increased allocation size.

Example M13 comprises the subject matter of Example M12, and further comprises determining the first data bounds value for the cacheline, initializing the first portion of the cacheline with initialization data, storing the first data bounds value in the metadata region in the cacheline, generating the second integrity value based, at least in part, on the initialization data in the first portion of the cacheline, and storing the second integrity value in the metadata region.

Example M14 comprises the subject matter of any one of Examples M1-M13, and further comprises the first portion of the cacheline includes data or code.

Example M15 comprises the subject matter of any one of Examples M1-M14, and generating the first integrity value includes selectively encrypting the first portion of the cacheline based on a length of the first portion to produce a ciphertext output.

Example M16 comprises the subject matter of Example M15, and selectively encrypting the first portion of the cacheline includes a number of encryptions to be performed varying based on the length of the first portion of the cacheline.

Example N1 provides an apparatus, the apparatus comprising means for receiving a first request to perform a memory access operation for an address range in a memory allocation of memory circuitry, means for determining a location of a metadata region within a cacheline that includes at least some of the address range, means for identifying a first portion of the cacheline based at least in part on the first data bounds value stored in the metadata region, means for generating a first integrity value based on the first portion of the memory allocation means for allowing the memory access operation to continue in response to determining that the first integrity value corresponds to a second integrity value stored in the metadata region.

Example AX1 provides a system or apparatus or processor, comprising circuitry to circuitry to receive a first request associated with an application to perform a store operation for an address range in a memory allocation of memory circuitry, and receive a cacheline corresponding to at least part of address range in a memory allocation, store first buffered contents in the cacheline based on a first memory address of the address range, determine a location of a metadata region within the cacheline, identify a first portion of the cacheline based at least in part on a first data bounds value stored in the metadata region, generate a first integrity value based on the first portion of the cacheline, the first portion including the first buffered contents stored in the cacheline, and store the first integrity value in the metadata region of the cacheline.

Example AX2 comprises the subject matter of Example AX1, and the circuitry further to determine a size of a slot of memory to which the memory allocation is assigned, and calculate a midpoint of the slot of memory based on the size of the slot.

Example AX3 comprises the subject matter of Example AX2, and the circuitry further to determine that the slot of memory includes at least two cachelines, and in response to determining that the first memory address is located after the midpoint of the slot of memory, determine that the metadata region is located at a beginning of the cacheline.

Example AX4 comprises the subject matter of Example AX2, and the circuitry further to determine that the slot of memory includes at least two cachelines, and in response to determining that the first memory address is located before the midpoint of the slot of memory, determine that the metadata region is located at an end of the cacheline.

Example AX5 comprises the subject matter of Example AX2, and the circuitry further to determine that the metadata region is located at the midpoint based on the size of the slot of memory being less than or equal to a size of the cacheline, wherein the first portion of the cacheline corresponds to all of the memory allocation.

Example AX6 comprises the subject matter of Example AX5, and the metadata region includes the first data bounds value, a second data bounds value, and the stored integrity value, and the first portion of the memory allocation is to be identified based, in part, on the second data bounds value.

Example AX7 comprises the subject matter of any one of Examples AX1-AX6, and to generate the first integrity value is to include encrypting the first portion of the cacheline based on at least a portion of an encoded pointer to the memory allocation.

Example AX8 comprises the subject matter of any one of Examples AX1-AX7, and the first data bounds value is to indicate a size corresponding to the first portion of the cacheline.

Example AX9 comprises the subject matter of Example AX8, and the circuitry further to prior to storing the first buffered contents in the cacheline, generate a second integrity value based on the first portion of the allocation, and allow the store operation in response to determining that the second integrity value corresponds to a third integrity value stored in the metadata region.

Example AX10 comprises the subject matter of any one of Examples AX1-AX9, and the first buffered contents comprise data or code.

Example CX1 provides one or more machine readable storage media comprising instructions stored thereon, the instructions when executed by a machine, cause the machine to receive a first request associated with an application to perform a store operation for an address range in a memory allocation of memory circuitry, receive a cacheline corresponding to at least part of address range in a memory allocation, store first buffered contents in the cacheline based on a first memory address of the address range, determine a location of a metadata region within the cacheline, identify a first portion of the cacheline based at least in part on a first data bounds value stored in the metadata region, generate a first integrity value based on the first portion of the cacheline, the first portion including the first buffered contents stored in the cacheline, and store the first integrity value in the metadata region of the cacheline.

Example CX2 comprises the subject matter of Example CX1, and the instructions, when executed by the one or more processors, cause the one or more processors further to determine a size of a slot of memory to which the memory allocation is assigned, and calculate a midpoint of the slot of memory based on the size of the slot.

Example CX3 comprises the subject matter of Example CX2, and the instructions, when executed by the one or more processors, cause the one or more processors further to determine that the slot of memory includes at least two cachelines, and in response to determining that the first memory address is located after the midpoint of the slot of memory, determine that the metadata region is located at a beginning of the cacheline.

Example CX4 comprises the subject matter of Example CX2, and the instructions, when executed by the one or more processors, cause the one or more processors further to determine that the slot of memory includes at least two cachelines, and in response to determining that the first memory address is located before the midpoint of the slot of memory, determine that the metadata region is located at an end of the cacheline.

Example CX5 comprises the subject matter of Example CX2, and the instructions, when executed by the one or more processors, cause the one or more processors further to determine that the metadata region is located at the midpoint based on the size of the slot of memory being less than or equal to a size of the cacheline, wherein the portion of the cacheline corresponds to all of the memory allocation.

Example CX6 comprises the subject matter of Example CX5, and the metadata region includes the first data bounds value, a second data bounds value, and the stored integrity value, and the first portion of the memory allocation is to be identified based, in part, on the second data bounds value.

Example CX7 comprises the subject matter of any one of Examples CX1-CX6, and to generate the first integrity value is to include encrypting the first portion of the cacheline based on at least a portion of an encoded pointer to the memory allocation.

Example CX8 comprises the subject matter of any one of Examples CX1-CX7, and the first data bounds value is to indicate a size corresponding to the first portion of the cacheline.

Example CX9 comprises the subject matter of Example AX8, and the instructions, when executed by the one or more processors, cause the one or more processors further to prior to storing the first buffered contents in the cacheline, generate a second integrity value based on the first portion of the allocation, and allow the store operation in response to determining that the second integrity value corresponds to a third integrity value stored in the metadata region.

Example CX10 comprises the subject matter of any one of Examples CX1-CX9, and the first buffered contents comprise data or code.

Example MX1 provides a method comprising receiving a first request associated with an application to perform a store operation for an address range in a memory allocation of memory circuitry, and receiving a cacheline corresponding to at least part of address range in a memory allocation, storing first buffered contents in the cacheline based on a first memory address of the address range, determining a location of a metadata region within the cacheline, identifying a first portion of the cacheline based at least in part on a first data bounds value stored in the metadata region, generating a first integrity value based on the first portion of the cacheline, the first portion including the first buffered contents stored in the cacheline, and storing the first integrity value in the metadata region of the cacheline.

Example MX2 comprises the subject matter of Example MX1, and further comprises determining a size of a slot of memory to which the memory allocation is assigned, and calculating a midpoint of the slot of memory based on the size of the slot.

Example MX3 comprises the subject matter of Example MX2, and further comprises determining that the slot of memory includes at least two cachelines, and in response to determining that the first memory address is located after the midpoint of the slot of memory, determining that the metadata region is located at a beginning of the cacheline.

Example MX4 comprises the subject matter of Example MX2, and further comprises determining that the slot of memory includes at least two cachelines, and in response to determining that the first memory address is located before the midpoint of the slot of memory, determining that the metadata region is located at an end of the cacheline.

Example MX5 comprises the subject matter of Example MX2, and further comprises determining that the metadata region is located at the midpoint based on the size of the slot of memory being less than or equal to a size of the cacheline, wherein the first portion of the cacheline corresponds to all of the memory allocation.

Example MX6 comprises the subject matter of Example MX5, and the metadata region includes the first data bounds value, a second data bounds value, and the stored integrity value, and the first portion of the memory allocation is identified based, in part, on the second data bounds value.

Example MX7 comprises the subject matter of any one of Examples MX1-MX6, and generating the first integrity value includes encrypting the first portion of the cacheline based on at least a portion of an encoded pointer to the memory allocation.

Example MX8 comprises the subject matter of any one of Examples MX1-MX7, and the first data bounds value indicates a size corresponding to the first portion of the cacheline.

Example MX9 comprises the subject matter of Example MX8, and further comprises prior to storing the first buffered contents in the cacheline, generating a second integrity value based on the first portion of the allocation, and allowing the store operation in response to determining that the second integrity value corresponds to a third integrity value stored in the metadata region.

Example MX10 comprises the subject matter of any one of Examples MX1-MX9, and the first buffered contents comprise data or code.

Example NX1 provides an apparatus, the apparatus comprising means for receiving a first request associated with an application to perform a store operation for an address range in a memory allocation of memory circuitry, means for receiving a cacheline corresponding to at least part of address range in a memory allocation, means for storing first buffered contents in the cacheline at a first memory address of the address range, means for determining a location of a metadata region within the cacheline, means for generating a first integrity value based, at least in part, on the first buffered contents stored in the cacheline, and means for storing the first integrity value in the metadata region of the cacheline.

An Example Y1 provides an apparatus, the apparatus comprising means for performing the method of any one of the Examples M1-M16 or MX1-MX10.

Example Y2 comprises the subject matter of Example Y1, and the means for performing the method comprises processing circuitry and memory circuitry.

Example Y3 comprises the subject matter of Example Y2, and the memory circuitry comprises machine readable instructions that when executed, cause the apparatus to perform the method of any one of Examples M1-M16 or MX1-MX10.

Example Y4 comprises the subject matter of any one of Examples Y1-Y3, and the apparatus is a computing system or a system-on-a-chip.

An Example X1 provides at least one machine readable storage medium comprising instructions that, when executed, realize a system, implement a method, or realize a processor as in any one of Examples S1-816, M1-M16, AX1-AX10 or MX1-MX10.

What is claimed:

1. A system, comprising:
    processor circuitry to receive a first request associated with an application to perform a memory access operation for an address range in a memory allocation containing data contents or code contents, wherein the address range includes at least one address in a first cacheline of memory and at least one address in a second cacheline of the memory; and
    integrity circuitry to:
        identify a first portion of the first cacheline, wherein the first portion of the first cacheline is to include some of the address range and is to be identified based at least in part on a first data bounds value stored in a metadata region located within the first cacheline, wherein the first data bounds value indicates a size of first data of the data contents or first code of the code contents contained within the first portion of the first cacheline;
        generate a first integrity value based on the first portion of the first cacheline; and
        prevent the memory access operation based on the first integrity value not corresponding to a second integrity value stored in the metadata region.

2. The system of claim 1, the integrity circuitry further to:
    determine a first load address in the address range by decoding an encoded pointer to the address range.

3. The system of claim 2, the integrity circuitry further to:
    determine a first bounds in the first cacheline using the first data bounds value; and
    prevent the memory access operation based on the first load address being outside the first bounds in the first cacheline.

4. The system of claim 2, the integrity circuitry further to:
    calculate a midpoint of a slot of memory to which the memory allocation is assigned, the midpoint to be calculated based on a size of the slot.

5. The system of claim 4, the integrity circuitry further to:
    based on the slot of memory including at least two cachelines and the first load address being located after the midpoint of the slot of memory, the metadata region is located at a beginning of the first cacheline.

6. The system of claim 4, the integrity circuitry further to:
    based on the slot of memory including at least two cachelines and the first load address being located before the midpoint of the slot of memory, the metadata region is located at an end of the first cacheline.

7. The system of claim 1, wherein to generate the first integrity value is to include encrypting the first portion of the first cacheline based on at least a portion of an encoded pointer to the memory allocation.

8. The system of claim 1, wherein the first integrity value is to be generated based, in part, on the first data bounds value in the metadata region.

9. The system of claim 1, wherein the processor circuitry is further to:
    in response to a memory allocation request to allocate the memory based on a first allocation size, perform a memory allocation operation including:
        calculating an increased allocation size based on the first allocation size and a number of metadata regions to be included in the memory allocation per cacheline;
        increasing the first allocation size to the increased allocation size; and
        obtaining the memory allocation based on the increased allocation size.

10. The system of claim 9, wherein the processor circuitry is further to:
    determine the first data bounds value for the first cacheline;
    initialize the first portion of the first cacheline with initialization data;
    store the first data bounds value in the metadata region in the first cacheline;
    generate the second integrity value based, at least in part, on the initialization data in the first portion of the first cacheline; and
    store the second integrity value in the metadata region.

11. The system of claim 1, wherein to generate the first integrity value is to include:
    selectively encrypting the first portion of the first cacheline based on a length of the first portion to produce a ciphertext output.

12. The system of claim 11, wherein selectively encrypting the first portion of the first cacheline is to include a number of encryptions to be performed varying based on the length of the first portion of the first cacheline.

13. A non-transitory machine-readable storage medium including instructions that, when executed by one or more processors, causes the one or more processors to:
    receive a first request to perform a memory access operation for an address range in a memory allocation containing data contents or code contents, wherein the address range includes at least one address in a first cacheline and at least one address in a second cacheline;
    identify a first portion of the first cacheline, wherein the first portion of the first cacheline is to include some of the address range and is to be identified based at least in part on a first data bounds value stored in a metadata region located within the first cacheline, wherein the first data bounds value indicates a size of first data of the data contents or first code of the code contents contained within the first portion of the first cacheline;
    generate a first integrity value based on the first portion of the first cacheline; and
    prevent the memory access operation based on the first integrity value not corresponding to a second integrity value stored in the metadata region.

14. The non-transitory machine-readable storage medium of claim 13, wherein the instructions, when executed by the one or more processors, cause the one or more processors further to:
    calculate a midpoint of a slot of memory to which the memory allocation is assigned, the midpoint to be calculated based on a size of the slot.

15. The non-transitory machine-readable storage medium of claim 14, wherein the instructions, when executed by the one or more processors, cause the one or more processors further to:
based on the slot of memory including at least two cachelines and a first load address in the address range being located after the midpoint of the slot of memory, the metadata region is located at a beginning of the first cacheline.

16. The non-transitory machine-readable storage medium of claim 14, wherein the instructions, when executed by the one or more processors, cause the one or more processors further to:
based on the slot of memory including at least two cachelines and a first load address in the address range being located before the midpoint of the slot of memory, the metadata region is located at an end of the first cacheline.

17. The non-transitory machine-readable storage medium of claim 13, wherein the first integrity value is to be generated based, in part, on the first data bounds value in the metadata region.

18. A method comprising:
receiving a first request to perform a memory access operation for an address range in a memory allocation containing data or code, wherein the memory allocation is contained in one cacheline of memory;
identifying a first portion of the cacheline, wherein the first portion of the cacheline includes at least a first address of the address range and is identified based at least in part on a first data bounds value stored in a metadata region located within the cacheline;
identifying a second portion of the cacheline, wherein the second portion of the cacheline includes at least a second address of the address range and is identified based at least in part on a second data bounds value stored in the metadata region located within the cacheline;
generating a first integrity value based on at least the first portion of the cacheline and the second portion of the cacheline; and
allowing the memory access operation to continue based on the first integrity value corresponding to a second integrity value stored in the metadata region.

19. The method of claim 18, further comprising:
calculating a midpoint of a slot of memory to which the memory allocation is assigned, the midpoint to be calculated based on a size of the slot; and
determining that the metadata region is located at the midpoint based on the size of the slot being less than or equal to a cacheline size of the cacheline.

20. The method of claim 18, wherein the first integrity value is to be generated based, in part, on the first data bounds value in the metadata region.

21. An apparatus, comprising circuitry to:
receive a first request associated with an application to perform a store operation for an address range in a memory allocation, wherein the address range includes at least one address in a first cacheline of memory and at least one address in a second cacheline of the memory;
receive the first cacheline of stored data from memory;
store first buffered contents in the first cacheline beginning at a first memory address of the address range;
identify a first portion of the first cacheline, wherein the first portion of the first cacheline includes some of the address range and is to be identified based at least in part on a first data bounds value stored in a metadata region located within the first cacheline, wherein the first data bounds value indicates a size of the first buffered contents contained within the first portion of the first cacheline;
generate a first integrity value based on the first portion of the first cacheline; and
store the first integrity value in the metadata region of the first cacheline.

22. The apparatus pre of claim 21, the circuitry further to:
calculate a midpoint of a slot of memory to which the memory allocation is assigned, the midpoint to be calculated based on a size of the slot.

23. The apparatus of claim 22, the circuitry further to:
based on the slot of memory including at least two cachelines and the first memory address being located after the midpoint of the slot of memory, the metadata region is located at a beginning of the first cacheline.

24. The apparatus of claim 22, the circuitry further to:
based on the slot of memory including at least two cachelines and the first memory address being located before the midpoint of the slot of memory, the metadata region is located at an end of the first cacheline.

25. The apparatus of claim 21, wherein the first integrity value is to be generated based, in part, on the first data bounds value in the metadata region.

* * * * *